United States Patent [19]

Natori

[11] Patent Number: 5,792,824
[45] Date of Patent: Aug. 11, 1998

[54] CYCLIC CONJUGATED DIENE POLYMER AND METHOD OF PRODUCING SAME

[75] Inventor: Itaru Natori, Kanagawa-ken, Japan

[73] Assignee: Asahi Kasei Kogyo Kabushiki Kaisha, Osaka, Japan

[21] Appl. No.: 569,482

[22] Filed: Dec. 8, 1995

Related U.S. Application Data

[63] Continuation-in-part of Ser. No. 507,444, filed as PCT/JP94/00822 May 23, 1994, abandoned.

[30] Foreign Application Priority Data

May 21, 1993 [JP] Japan ................................ 5-141281

[51] Int. Cl.$^6$ ...................... C08F 297/04; C08F 297/02; C08F 32/06
[52] U.S. Cl. .................... 526/309; 526/180; 526/308; 526/329.1; 526/347; 525/272; 525/297; 525/299; 525/314
[58] Field of Search ................................ 526/180, 181, 526/308, 309, 329.1, 347; 525/272, 297, 314, 299

[56] References Cited

U.S. PATENT DOCUMENTS

| | | | |
|---|---|---|---|
| 3,321,479 | 5/1967 | Eberhardt et al. | 526/180 X |
| 3,328,372 | 6/1967 | Thomas et al. | 526/308 X |
| 3,541,149 | 11/1970 | Langer, Jr. | 526/180 X |
| 3,821,331 | 6/1974 | Foss | 525/366 X |
| 4,020,251 | 4/1977 | Hsieh . | |
| 4,051,199 | 9/1977 | Udipi et al. . | |
| 4,113,930 | 9/1978 | Moczygemba . | |
| 4,127,710 | 11/1978 | Hsieh . | |
| 4,131,653 | 12/1978 | Hsieh et al. . | |
| 4,138,536 | 2/1979 | Hsieh . | |
| 4,153,773 | 5/1979 | Buckley et al. | 526/308 |
| 4,179,480 | 12/1979 | Hsieh . | |
| 4,223,116 | 9/1980 | Moczygemba et al. . | |
| 4,237,246 | 12/1980 | Hsieh . | |
| 5,260,394 | 11/1993 | Tazaki et al. | 526/308 X |
| 5,422,409 | 6/1995 | Brekner et al. . | |

FOREIGN PATENT DOCUMENTS

| | | |
|---|---|---|
| 2848964 | 5/1980 | Germany . |
| 378193 | 7/1962 | Japan . |
| 1042625 | 9/1966 | United Kingdom . |

OTHER PUBLICATIONS

Nagi, K. et al. *Kobunshi Ronbunshu*, "Copolymeriation 1,3–Cyclohexadiene . . . ", vol. 34, No. 5, 333–340, 1977.
Horne et al., Ind. Eng. Chem., 48:784–91 (1956).
Zhiquan et al., J. Plym. Sci., Polym. Chem. Ed., 18:3345–57 (1980).
Jihua et al., Scientia Sinica, vol. 23, No. 6:734–43 (1980).
Mazzei, Makromol. Chem. Suppl. 4:61–72 (1981).
Hsieh et al., Rubber Chem. Technol., 58:117–145 (1985).
Witte, Angew. Makromol. chem., 94:119–146 (1981).
Yang et al., Macromolecules, 15:230–233 (1982).
Marvel et al., J. Am. Chem. Soc., 81:448–452 (1959).
Lefebvre et al., J. Polym. Sci., Pt. A, 2: 3277–3295 (1964).
Cassidy et al., J. Polym. Sci., Pt. A, 3:1553–1565 (1965).
Mango et al., Polym. Prepr. (Amer. Chem. Soc., Div. Polym. Chem.) 12:402–409 (1971).
Mango et al., Die Makromolekulare Chemie., 163:13–36 (1973).
Dolgopolosk et al., European Polymer J., 9:895–908 (1973).
Sharaby et al., J. Polym. Sci., Polym. Chem. Ed., 20:901–915 (1982).
Francois et al., Makromol. Chem., 191:2743–2753 (1990).
Langer, N.Y. Acad. Sci. 27:741–745 (1965).
"Polymer Chemistry . . . " (2nd ed.) Marcel Dekker, Inc., N.Y., 93–95 (1988).

*Primary Examiner*—Fred Teskin
*Attorney, Agent, or Firm*—Birch, Stewart, Kolasch & Birch, LLP

[57] ABSTRACT

Disclosed is a cyclic conjugated diene polymer comprising a main chain represented by the formula (I):

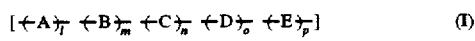

$$[(-A-)_l (-B-)_m (-C-)_n (-D-)_o (-E-)_p] \quad (I)$$

wherein A to E are monomer units constituting the main chain in which A to E are arranged in any order, and l to p are, respectively, weight percentages of A to E, based on the total weight of A to E; A is selected from cyclic conjugated diene monomer units, B is selected from chain conjugated diene monomer units, C is selected from vinyl aromatic monomer units, D is selected from polar monomer units, and E is selected from an ethylene monomer unit and α-olefin monomer units; and l to p satisfy the following requirements: $0.5 \leq l \leq 100$, $0 \leq m, n, o, p < 100$, wherein when $l=100$ and the A monomer units are comprised of monomer units which are the same, the polymer has a number average molecular weight $\overline{Mn}$ of from 40,000 to 5,000,000, wherein when $l=100$ and the A monomer units are comprised of monomer units which are different, the polymer has an $\overline{Mn}$ of from 25,000 to 5,000,000, and wherein when $0.5 \leq l < 100$, the polymer has an $\overline{Mn}$ of from 500 to 5,000,000. The cyclic conjugated diene polymer has excellent thermal and mechanical properties. The polymer can be advantageously produced using a catalyst comprised of a complex of an organometallic compound containing a Group IA metal with a complexing agent, especially an amine.

33 Claims, 12 Drawing Sheets

CYCLIC CONJUGATED DIENE POLYMER AND METHOD OF PRODUCING SAME

This application is a continuation-in-part of application Ser. No. 08/507,444 filed on Sep. 7, 1995, now abandoned, the entire contents of which are hereby incorporated by reference.

BACKGROUND OF THE INVENTION

1. Technical Field

The present invention relates to a novel cyclic conjugated diene polymer and a method for producing the same. More particularly, the present invention is concerned with a novel cyclic conjugated diene polymer comprising at least one type of cyclic conjugated diene monomer unit, or comprising at least one type of cyclic conjugated diene monomer unit and a monomer unit derived from at least one type of monomer other than the above-mentioned cyclic conjugated diene monomer, which other monomer is copolymerizable with the cyclic conjugated diene monomer, and wherein the cyclic conjugated diene polymer has a high number average molecular weight, so that it has not only excellent thermal properties in respect of, for example, a melting temperature, a glass transition temperature and a heat distortion temperature, but also excellent mechanical properties, such as high tensile modulus and high flexural modulus, and is also concerned with a method for producing such an excellent cyclic conjugated diene polymer. The present invention is further concerned with a novel polymerization catalyst useful for production of such a polymer as mentioned above, which catalyst has an excellent catalytic activity for not only achieving a desired high polymerization degree, but also effectively and efficiently performing a living anionic polymerization which enables a copolymerization (especially, a block copolymerization) of a cyclic conjugated diene monomer and at least one type of monomer other than the cyclic conjugated diene monomer, which other monomer is copolymerizable with the cyclic conjugated diene monomer.

2. Prior Art

Heretofore, various proposals have been made with respect to conjugated diene polymers. Some of the polymers produced by the techniques of such proposals have been widely used as commercially important materials.

Representative examples of known conjugated diene polymers include homopolymers, such as a polybutadiene and a polyisoprene; copolymers of block, graft, taper and random configurations, such as a butadiene-isoprene copolymer, a styrene-butadiene copolymer, a propylene-butadiene copolymer, a styrene-isoprene copolymer, an α-methylstyrene-butadiene copolymer, an α-methylstyrene-isoprene copolymer, an acrylonitrile-butadiene copolymer, an acrylonitrile-isoprene copolymer, a butadiene-methyl methacrylate copolymer and an isoprene-methyl methacrylate copolymer; and hydrogenated polymers derived therefrom. These polymers have been used for various purposes in various fields. For example, these conventional polymers have been used as plastics; elastomers; fibers; sheets; films; materials for parts for machines, containers for food, packing materials, tires and belts; insulating materials; adhesives; modifiers for other resins; and the like.

For example, in the field of thermoplastic elastomers, a block copolymer has conventionally been used which comprises a polymer chain composed of an agglomeration phase (i.e., hard segment) which is of a polymer block having a Tg (glass transition temperature) of higher than room temperature, and an elastomer phase (i.e., soft segment) which is of a polymer block having a Tg of lower than room temperature.

Representative examples of such block copolymers include a styrene-butadiene (isoprene)-styrene block copolymer and a hydrogenated product thereof.

Further, for improving various properties (such as heat resistance, flowability and adhesion properties) of the styrene-butadiene (isoprene)-styrene block copolymer or a hydrogenated product thereof, it has been widely practiced to use the block copolymer or a hydrogenated polymer thereof in the form of a block copolymer composition which is obtained by blending the above-mentioned block copolymer or a hydrogenated product thereof with another polymer, such as a polystyrene, a polyolefin, a polyphenylene ether or a styrene-butadiene diblock copolymer, or a hydrogenated product thereof.

On the other hand, various proposals have been made with respect to the method for producing a conjugated diene polymer, which is also very important from a commercial point of view.

Particularly, various studies have been made with a view toward developing a polymerization catalyst capable of providing conjugated diene polymers having a high cis-1, 4-bond content, for the purpose of obtaining conjugated diene polymers having improved thermal and mechanical properties.

For example, a catalyst system comprised mainly of a compound of an alkali metal, such as lithium or sodium, and a composite catalyst system comprised mainly of a compound of a transition metal, such as nickel, cobalt or titanium, have been proposed. Some of these catalyst systems have already been employed for a commercial scale practice of polymerization of butadiene, isoprene and the like (see, for example, Ing. End. Chem., 48, 784 (1956) and Examined Japanese Patent Application Publication No. 37-8193).

On the other hand, for achieving a further increased cis-1,4-bond content and an excellent polymerization activity, a number of studies have been made toward developing a composite catalyst system comprised of a rare earth metal compound and an organometallic compound containing a metal belonging to Group I, II or III of the Periodic Table. Further, in connection with the study of such a catalyst system, intensive studies have also been made with respect to highly stereospecific polymerization [see, for example, J. Polym. Sci., Polym. Chem. Ed., 18, 3345 (1980); Sci, Sinica., 2/3, 734 (1980); Makromol. Chem. Suppl., 4, 61 (1981); German Patent Application No. 2,848, 964; Rubber Chem. Technol., 58, 117 (1985)].

Among these composite catalyst systems, a composite catalyst comprised mainly of a neodymium compound and an organoaluminum compound has been confirmed to have not only the ability to provide a desired polymer having a high cis-1,4-bond content, but also exhibits a n excellent polymerization activity. Accordingly, this type of composite catalyst has already been commercially used as a catalyst for the polymerization of butadiene or the like [see, for example, Angew. Makromol., 94, 119 (1981); Macromolecules, 15, 230 (1982)].

However, in accordance with recent remarkable progress of the techniques in this field, there has been a strong demand for the development of polymer materials having further improved properties, particularly excellent thermal properties (such as melting temperature, glass transition temperature and heat distortion temperature) and excellent mechanical properties (such as tensile modulus and flexural modulus).

As one of the most practical means for meeting such a demand, it has been attempted to develop a technique of improving the structures of the polymeric molecular chains of polymers of conjugated diene monomers (in homopolymerizing or copolymerizing not only a monomer having a relatively small steric hindrance, e.g., butadiene or isoprene, but also a monomer having a large steric hindrance, e.g., a cyclic conjugated diene monomer) so as to obtain polymer materials having excellent thermal and mechanical properties.

With respect to the homopolymerization or copolymerization of a monomer having a relatively small steric hindrance, e.g., butadiene or isoprene, catalyst systems having a polymerization activity which is satisfactory to a certain extent have been successfully developed. However, a catalyst system which exhibits a satisfactory polymerization activity in the homopolymerization or copolymerization of monomers having a large steric hindrance, e.g., a cyclic conjugated diene monomer, has not yet been developed.

That is, by conventional techniques, even homopolymerization of a cyclic conjugated diene is difficult, so that a homopolymer having a desired high molecular weight cannot be obtained. Furthermore, an attempt to copolymerize a cyclic conjugated diene with a monomer other than the cyclic conjugated diene, for the purpose of obtaining a polymer having optimized thermal and mechanical properties in order to meet a wide variety of commercial needs, has been unsuccessful with the result that the products obtained are only oligomers having a low molecular weight.

As is apparent from the above, in any of the conventional techniques, it has been impossible to obtain a cyclic conjugated diene polymer which has satisfactory properties. Therefore, it has been strongly desired to develop a high molecular weight cyclic conjugated diene polymer which can satisfy the commercial demand.

J. Am. Chem. Soc., 81, 448 (1959) discloses a cyclohexadiene homopolymer and a polymerization method therefor, which homopolymer is obtained by polymerizing 1,3-cyclohexadiene (a typical example of a cyclic conjugated diene monomer), using a composite catalyst comprised of titanium tetrachloride and triisobutylaluminum. However, the polymerization method disclosed in this prior art document is disadvantageous in that the use of a large amount of the catalyst is necessary, and the polymerization reaction must be conducted for a prolonged period of time, and that the obtained polymer has only an extremely low molecular weight. Therefore, the polymer obtained by the technique of this prior art document is of no commercial value.

Further, J. Polym. Sci., Pt. A, 2,3277 (1964) discloses methods for producing a cyclohexadiene homopolymer, in which the polymerization of 1,3-cyclohexadiene is conducted by various polymerization methods, such as radical polymerization, cationic polymerization, anionic polymerization and coordination polymerization. In any of the methods disclosed in this prior art document, however, the polymers obtained have only an extremely low molecular weight. Therefore, the polymers obtained by the techniques of this prior art document are of no commercial value.

British Patent Application No. 1,042,625 discloses a method for producing a cyclohexadiene homopolymer, in which the polymerization of 1,3-cyclohexadiene is conducted using a large amount of an organolithium compound as a catalyst.

In the polymerization method disclosed in British Patent Application No. 1,042,625, the catalyst must be used in an amount as large as 1 to 2 wt %, based on the total weight of the monomers. Therefore, this method is economically disadvantageous. Further, the polymer obtained by this method has only an extremely low molecular weight. Moreover, in this prior art document, there is no teaching or suggestion of obtaining a copolymer. Furthermore, the method of this prior art document has disadvantages in that the polymer obtained contains a large amount of catalyst residue, which is very difficult to remove from the polymer, so that the polymer obtained by this method is of no commercial value.

J. Polym. Sci., Pt. A, 3, 1553 (1965) discloses a cyclohexadiene homopolymer, which is obtained by polymerizing 1,3-cyclohexadiene using an organolithium compound as a catalyst. In this prior art document, the polymerization reaction must be continued for a period as long as 5 weeks, however, the polymer obtained has a number average molecular weight of only 20,000 or less.

Polym. Prepr. (Amer. Chem. Soc., Div. Polym. Chem.) 12, 402 (1971) teaches that when the polymerization of 1,3-cyclohexadiene is conducted using an organolithium compound as a catalyst, the upper limit of the number average molecular weight of the cyclohexadiene homopolymer obtained is only from 10,000 to 15,000. Further, this document teaches that the reason for such a small molecular weight resides in that, concurrently with the polymerization reaction, not only does a transfer reaction occur, which is caused by the abstraction of a lithium cation present in the polymer terminal, but also a reaction of elimination of lithium hydride occurs.

Die Makromolekulare Chemie., 163, 13 (1973) discloses a cyclohexadiene homopolymer which is obtained by polymerizing 1,3-cyclohexadiene using a large amount of an organolithium compound as a catalyst. However, the polymer obtained in this prior art document is an oligomer having a number average molecular weight of only 6,500.

European Polymer J., 9, 895 (1973) discloses a copolymer which is obtained by copolymerizing 1,3-cyclohexadiene with butadiene and/or isoprene, using a π-allylnickel compound as a polymerization catalyst.

However, the polymer obtained in this prior art document is an oligomer having an extremely low molecular weight. Further, it has been reported that the polymer of this prior art document has a single glass transition temperature, which suggests that the polymer has a random copolymer structure.

Kobunshi Ronbun-shu (Collection of theses concerning polymers), Vol. 34, No. 5, 333 (1977) discloses a method for synthesizing a copolymer of 1,3-cyclohexadiene and acrylonitrile using zinc chloride as a polymerization catalyst. However, the alternating copolymer obtained in this prior art document is an oligomer having an extremely low molecular weight.

J. Polym. Sci., Polym. Chem. Ed., 20, 901 (1982) discloses a cyclohexadiene homopolymer which is obtained by polymerizing 1,3-cyclohexadiene using an organosodium compound as a catalyst. In this prior art document, the organosodium compound used is sodium naphthalene, and a radical anion derived from the sodium naphthalene forms a dianion which functions as a polymerization initiation site.

This means that although the cyclohexadiene homopolymer reported in this document has an apparent number average molecular weight of 38,700, this homopolymer is actually only a combination of two polymeric molecular chains, each having a number average molecular weight of 19,350, which chains respectively extend from the polymerization initiation site in two different directions.

Further, in the polymerization method disclosed in this document, the polymerization reaction needs to be conducted at an extremely low temperature. Therefore, the technique of this prior art document is of no commercial value.

Makromol. Chem., 191, 2743 (1990) discloses a method for polymerizing 1,3-cyclohexadiene using a polystyryllithium as a polymerization initiator. In this prior art document, it is described that concurrently with the polymerization reaction, not only a transfer reaction, which is caused by the abstraction of a lithium cation present in the polymer terminal, but also a reaction of elimination of lithium hydride vigorously occurs. Further, it is reported that even though the polymerization is conducted using a polystyryllithium as a polymerization initiator, a styrene-cyclohexadiene block copolymer cannot be obtained at room temperature, but the product obtained is only a cyclohexadiene homopolymer.

Further, in this prior art document, it is reported that when the polymerization reaction is conducted at $-10°$ C., a styrene-cyclohexadiene block copolymer having a molecular weight of about 20,000 is obtained in extremely low yield, together with a cyclohexadiene homopolymer.

However, the content of cyclohexadiene blocks in the obtained copolymer is extremely low. Further, this prior art document has no teaching or suggestion about not only a block copolymer of cyclohexadiene with a chain conjugated diene monomer, but also a multiblock copolymer which is an at least-tri-block copolymer of cyclohexadiene, or a radial block copolymer of cyclohexadiene.

As can be easily understood from the above, in any of the conventional techniques, it has been impossible to obtain a cyclic conjugated diene copolymer which has excellent properties so that it can be satisfactorily used as an industrial material. Needless to say, a production process for such a cyclic conjugated diene copolymer is not known.

SUMMARY OF THE INVENTION

In these situations, the present inventors have made extensive and intensive studies with a view toward developing a novel cyclic conjugated diene polymer comprising at least one type of cyclic conjugated diene monomer unit, or comprising at least one type of cyclic conjugated diene monomer unit and a monomer unit derived from at least one type of monomer other than the above-mentioned cyclic conjugated diene monomer, which other monomer is copolymerizable with the cyclic conjugated diene monomer, and wherein the cyclic conjugated diene polymer has a high number average molecular weight, so that it has not only excellent thermal properties in respect of, for example, a melting temperature, a glass transition temperature and a heat distortion temperature, but also excellent mechanical properties, such as high tensile modulus and high flexural modulus, and a method for producing such an excellent cyclic conjugated diene polymer. As a result, the present inventors have successfully developed a novel polymerization catalyst useful for production of such a polymer as mentioned above, which catalyst has an excellent catalytic activity for not only achieving a desired high polymerization degree, but also effectively and efficiently performing a living anionic polymerization which enables block copolymerization of a cyclic conjugated diene monomer and at least one type of other monomer which is copolymerizable with the cyclic conjugated diene monomer. With such a novel polymerization catalyst, it has for the first time become possible to synthesize a novel cyclic conjugated diene polymer which has never been reported. In addition, a technique to obtain a cyclic conjugated diene polymer, in which monomer units derived from cyclic conjugated diene monomers are introduced, in a desired proportion and in a desired configuration, as a part or all of monomer units constituting a main chain of the polymer, has been developed. The present invention has been completed, based on these novel findings.

Accordingly, it is an object of the present invention to provide a novel cyclic conjugated diene polymer comprising at least one type of cyclic conjugated diene monomer unit, or comprising at least one type of cyclic conjugated diene monomer unit and a monomer unit derived from at least one type of monomer other than the above-mentioned cyclic conjugated diene monomer, which other monomer is copolymerizable with the cyclic conjugated diene monomer, and wherein the cyclic conjugated diene polymer has a high number average molecular weight, so that it has not only excellent thermal properties in respect of, for example, a melting temperature, a glass transition temperature and a heat distortion temperature, but also excellent mechanical properties, such as high tensile modulus and high flexural modulus.

It is another object of the present invention to provide an effective and efficient method for producing such a novel cyclic conjugated diene polymer as mentioned above.

It is a further object of the present invention to provide a novel polymerization catalyst useful for production of such a polymer as mentioned above, which catalyst has an excellent catalytic activity for not only achieving a desired high polymerization degree, but also effectively and efficiently performing a living anionic polymerization which enables a copolymerization (especially, a block copolymerization) of a cyclic conjugated diene monomer and at least one type of other monomer which is copolymerizable with the cyclic conjugated diene monomer.

In one aspect of the present invention, there is provided a cyclic conjugated diene polymer comprising a main chain represented by the following formula (I):

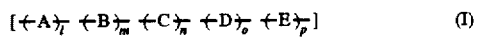   (I)

wherein A to E are monomer units constituting the main chain in which monomer units A to E are arranged in any order, and l to p are, respectively, weight percentages of monomer units A to E, based on the total weight of monomer units A to E;

wherein:
- A is selected from the class consisting of cyclic conjugated diene monomer units,
- B is selected from the class consisting of chain conjugated diene monomer units,
- C is selected from the class consisting of vinyl aromatic monomer units,
- D is selected from the class consisting of polar monomer units, and
- E is selected from the class consisting of an ethylene monomer unit and α-olefin monomer units; and wherein:
l to p satisfy the following requirements:

$l+m+n+o+p=100$, $0.5 \leq l \leq 100$, $0 \leq m < 100$, $0 \leq n < 100$ $0 \leq o < 100$, and $0 \leq p < 100$, with the proviso that when l=100 and said A monomer units are comprised of cyclic conjugated diene monomer units which are the same, said cyclic conjugated diene polymer has a number average molecular weight of from 40,000 to 5,000,000, that when l=100 and said A monomer units are comprised of cyclic conjugated diene monomer units which are different, said cyclic conjugated diene polymer has a number average molecular weight of from 25,000 to 5,000,000, and that when $0.5 \leq l < 100$, said cyclic conjugated diene polymer has a number average molecular weight of from 500 to 5,000,000.

In a further aspect of the present invention, there is provided a method for producing a cyclic conjugated diene polymer comprising a main chain represented by the following formula (I):

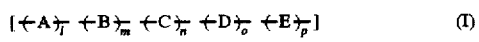

wherein A to E are monomer units constituting the main chain in which monomer units A to E are arranged in any order, and l to p are, respectively, weight percentages of monomer units A to E, based on the total weight of monomer units A to E;

wherein:

A is selected from the class consisting of cyclic conjugated diene monomer units, B is selected from the class consisting of chain conjugated diene monomer units, C is selected from the class consisting of vinyl aromatic monomer units, D is selected from the class consisting of polar monomer units, and E is selected from the class consisting of an ethylene monomer unit and α-olefin monomer units; and wherein:

l to p satisfy the following requirements:

$l+m+n+o+p=100$, $0.5 \leq l \leq 100$, $0 \leq m < 100$, $0 \leq n < 100$ $0 \leq o < 100$, and $0 \leq p < 100$, which comprises polymerizing at least one cyclic conjugated diene monomer, or at least one cyclic conjugated diene monomer and at least one comonomer copolymerizable therewith in the presence of a catalyst comprised of a complex of at least one organometallic compound containing a metal belonging to Group IA of the Periodic Table with at least one complexing agent, the at least one comonomer being selected from the class consisting of chain conjugated diene monomers, vinyl aromatic monomers, polar monomers, an ethylene monomer, and α-olefin monomers.

DETAILED DESCRIPTION OF THE INVENTION

Figure 1:
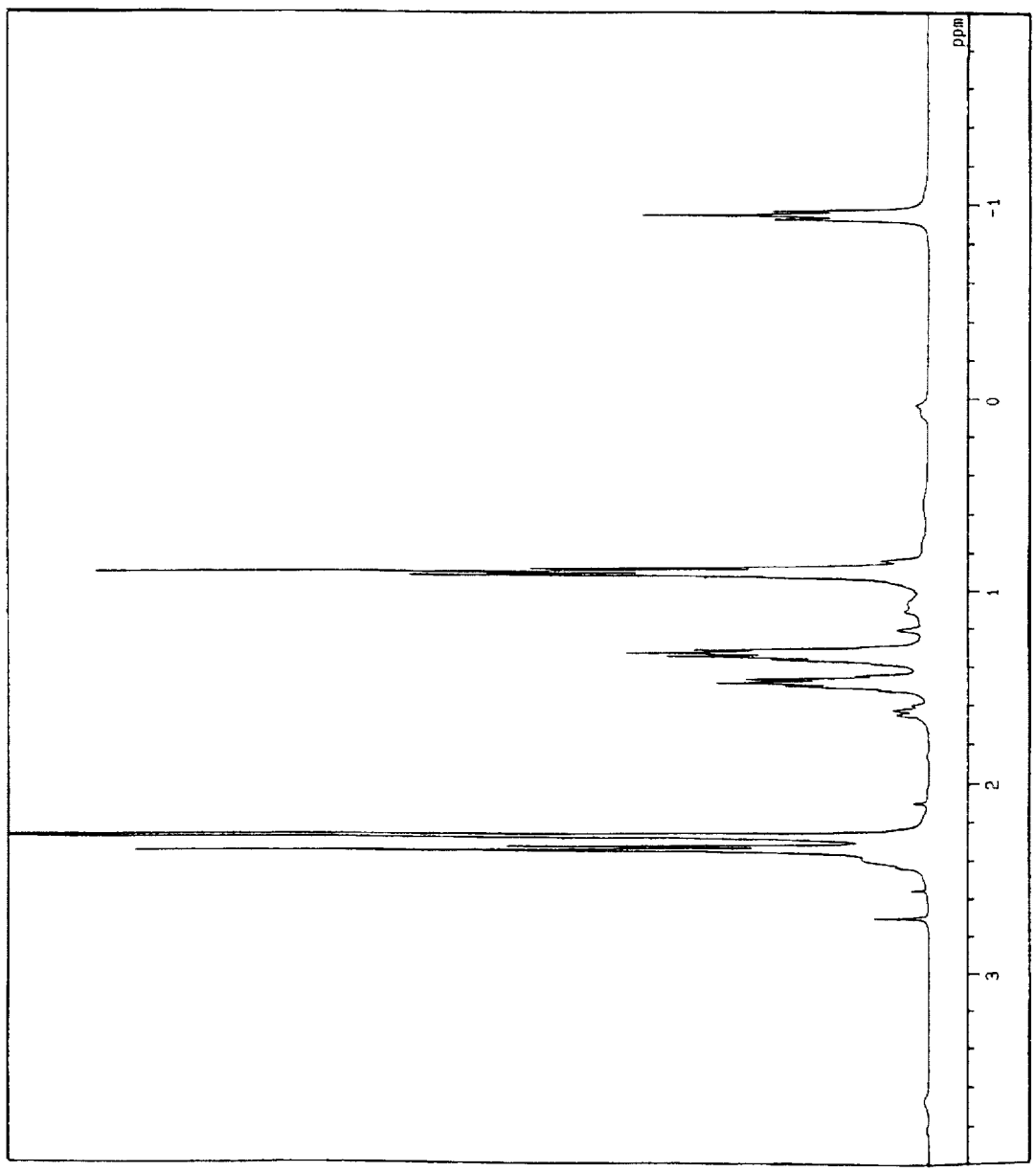
FIG. 1 is a chart showing the $^1$H-NMR spectrum of complex No. 2 having a Li [in n-butyl lithium (n-Buli)]/tetramethylethylenediamine (TMEDA) molar ratio of 4/2, obtained in Example 2.
Figure 2:
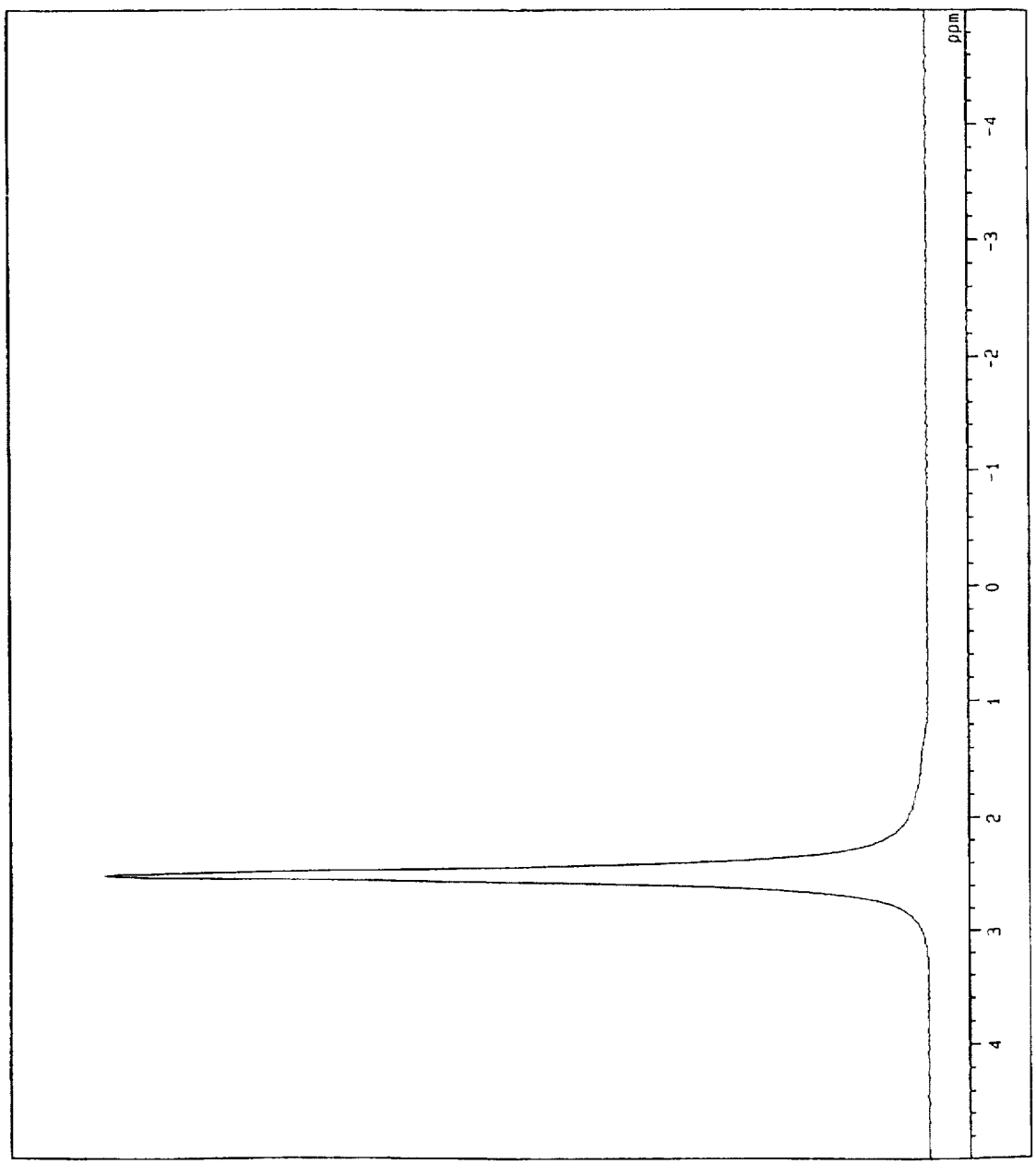
FIG. 2 is a chart showing the $^7$Li-NMR spectrum of complex No. 2 having a Li (in n-Buli)/TMEDA molar ratio of 4/2, obtained in Example 2.
Figure 3:
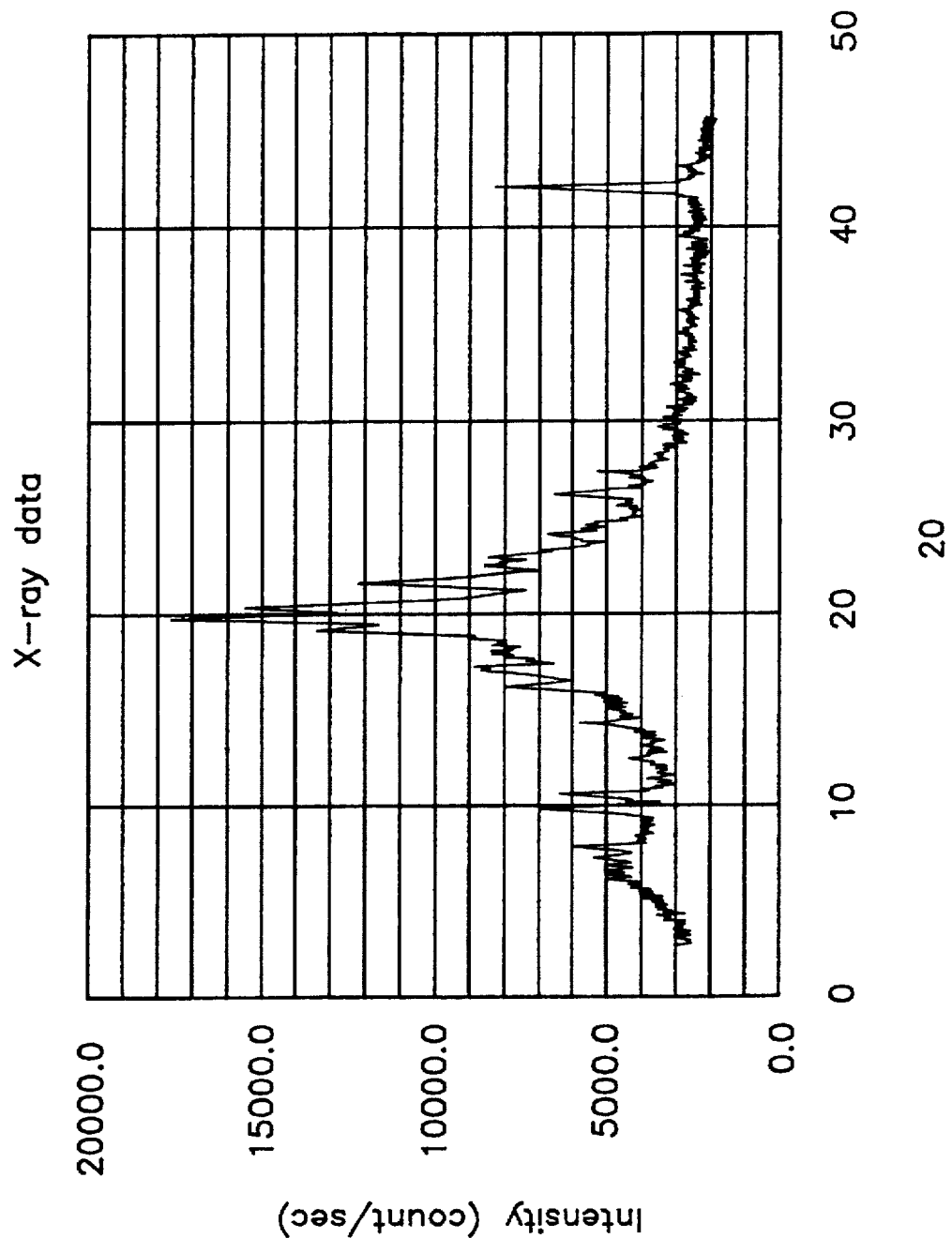
FIG. 3 is a chart showing the X-ray diffraction spectrum of the complex having a Li (in n-Buli)/TMEDA molar ratio of 4/2, obtained in Example 2, which was measured in an atmosphere of a dried argon gas (wherein peaks observed at 40° C. or more are ascribed to a sample holder used in the measurement)
Figure 4:
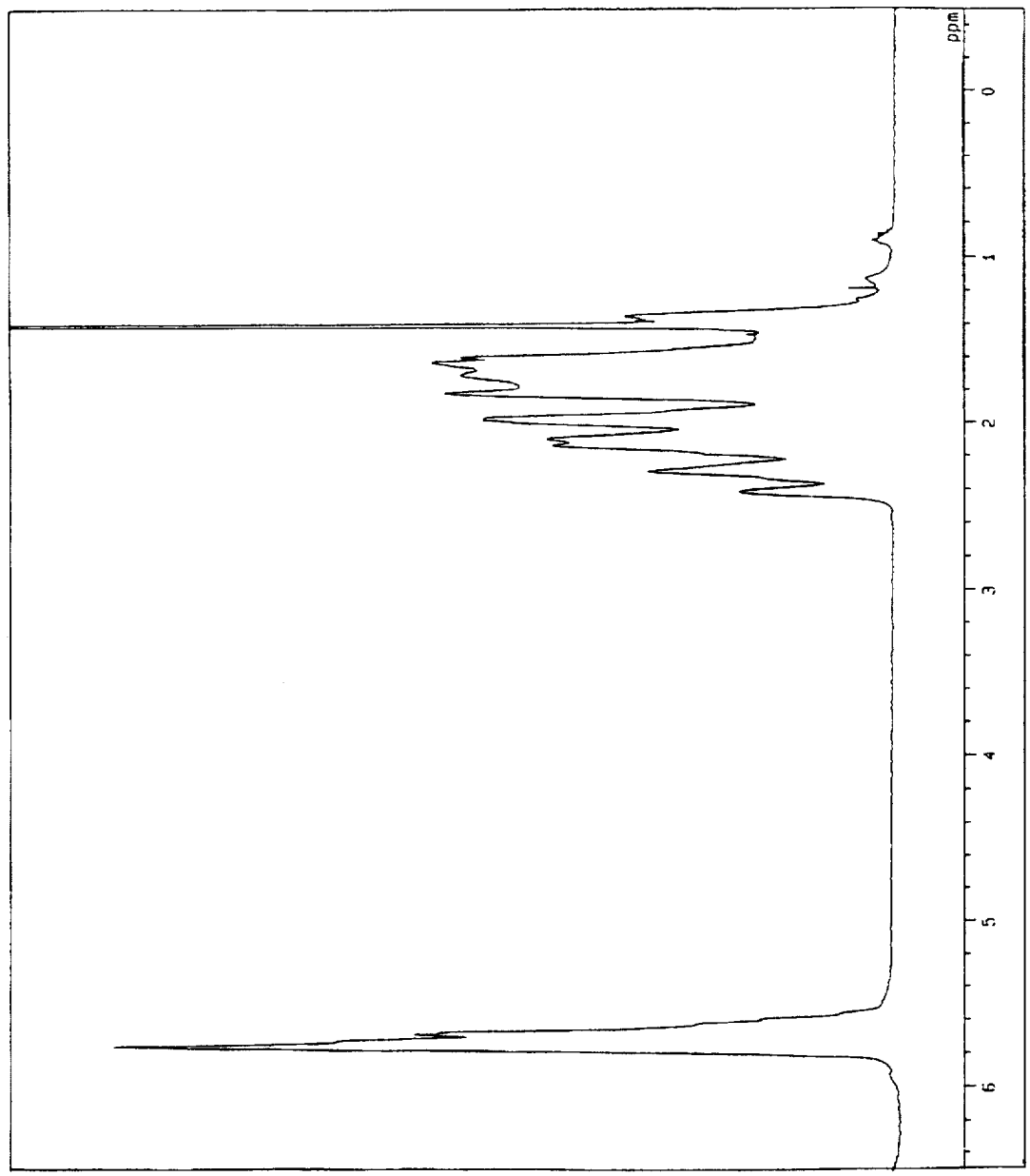
FIG. 4 is a chart showing the $^1$H-NMR spectrum of the cyclic conjugated diene homopolymer of the present invention, obtained in Example 4.
Figure 5:
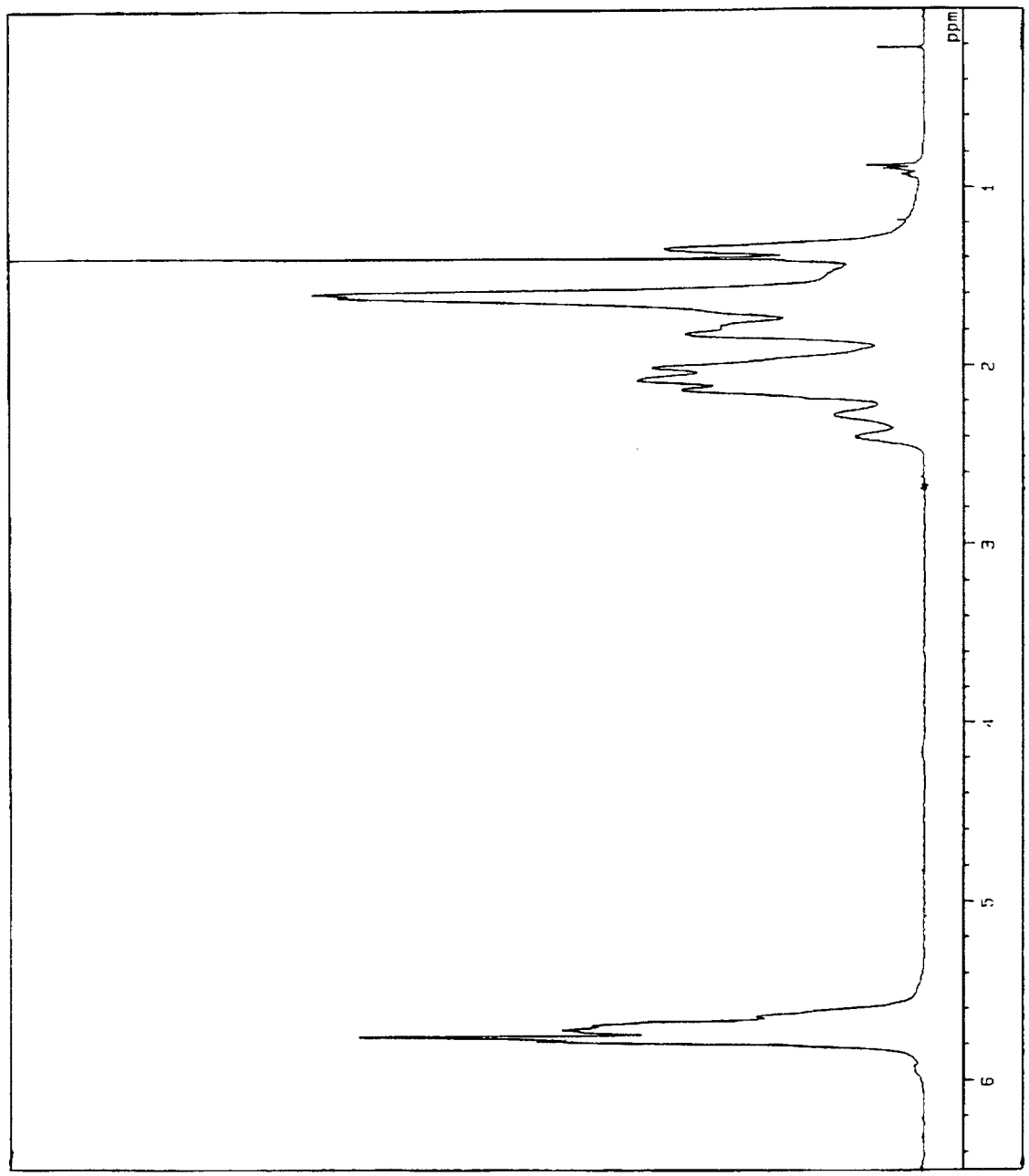
FIG. 5 is a chart showing the $^1$H-NMR spectrum of the cyclic conjugated diene homopolymer of the present invention, obtained in Example 11.
Figure 6:
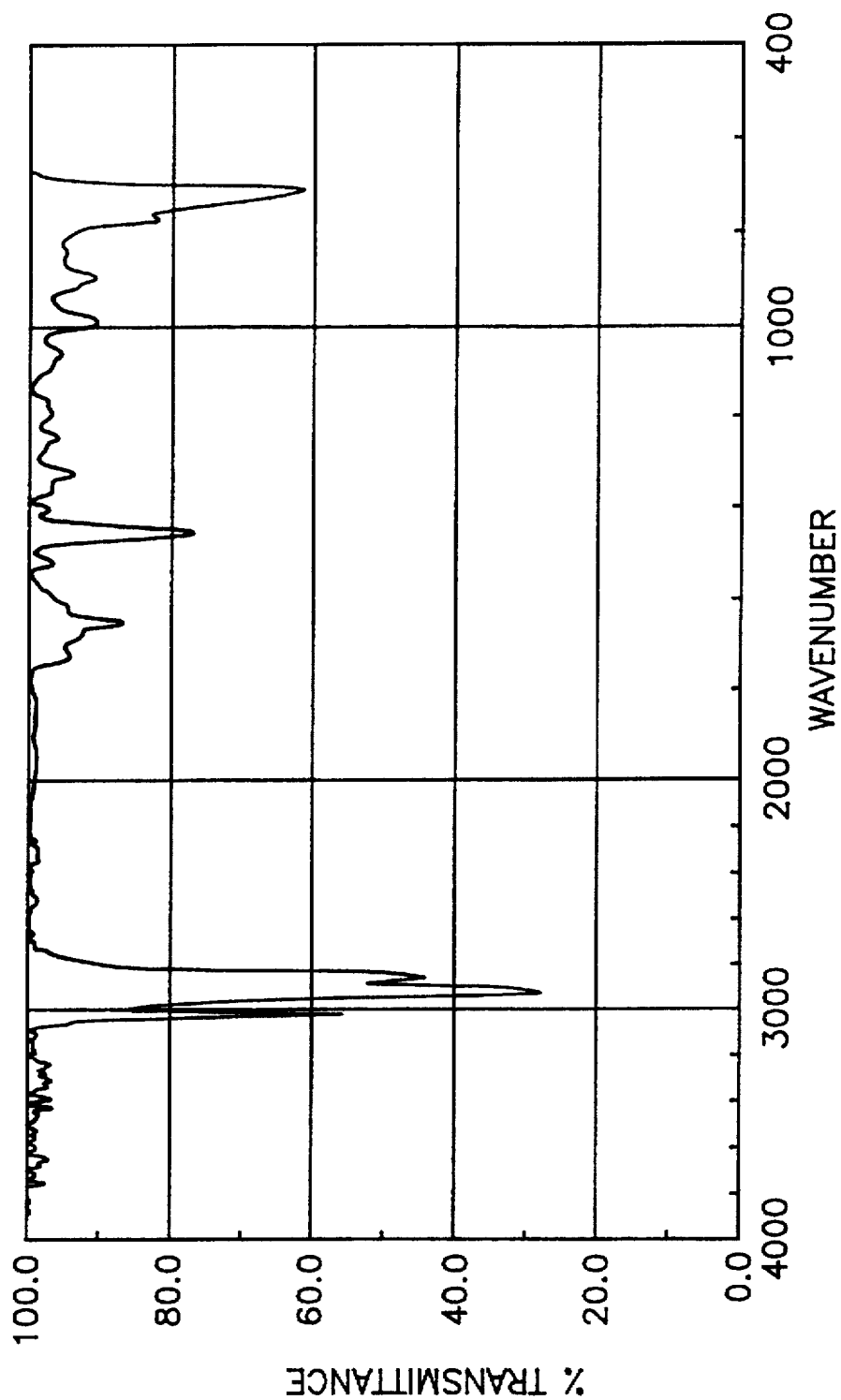
FIG. 6 is a chart showing the IR spectrum of the cyclic conjugated diene homopolymer of the present invention, obtained in Example 5.
Figure 7:
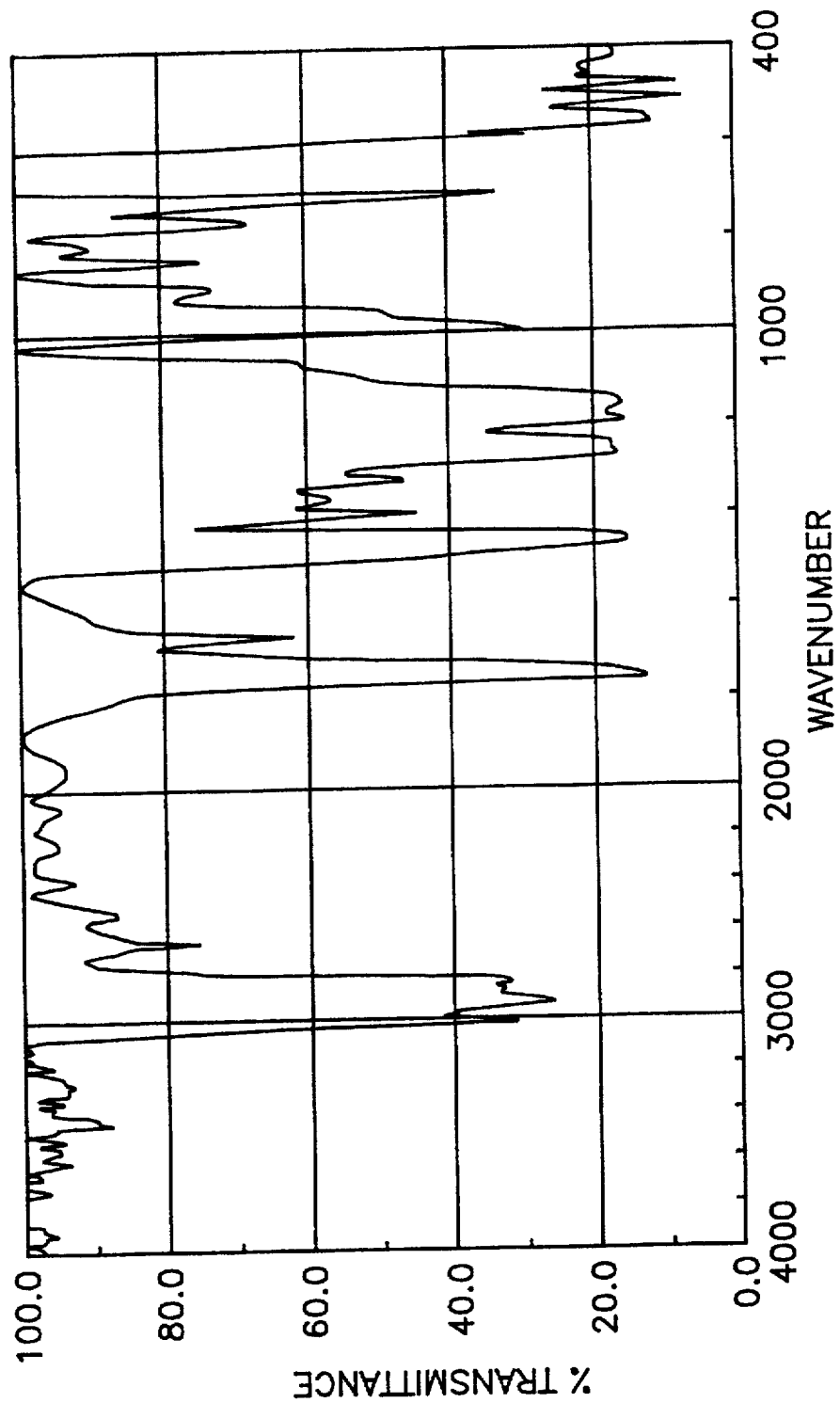
FIG. 7 is a chart showing the IR spectrum of the polycyclohexadiene-polymethyl methacrylate diblock copolymer of the present invention, obtained in Example 9.
Figure 8:
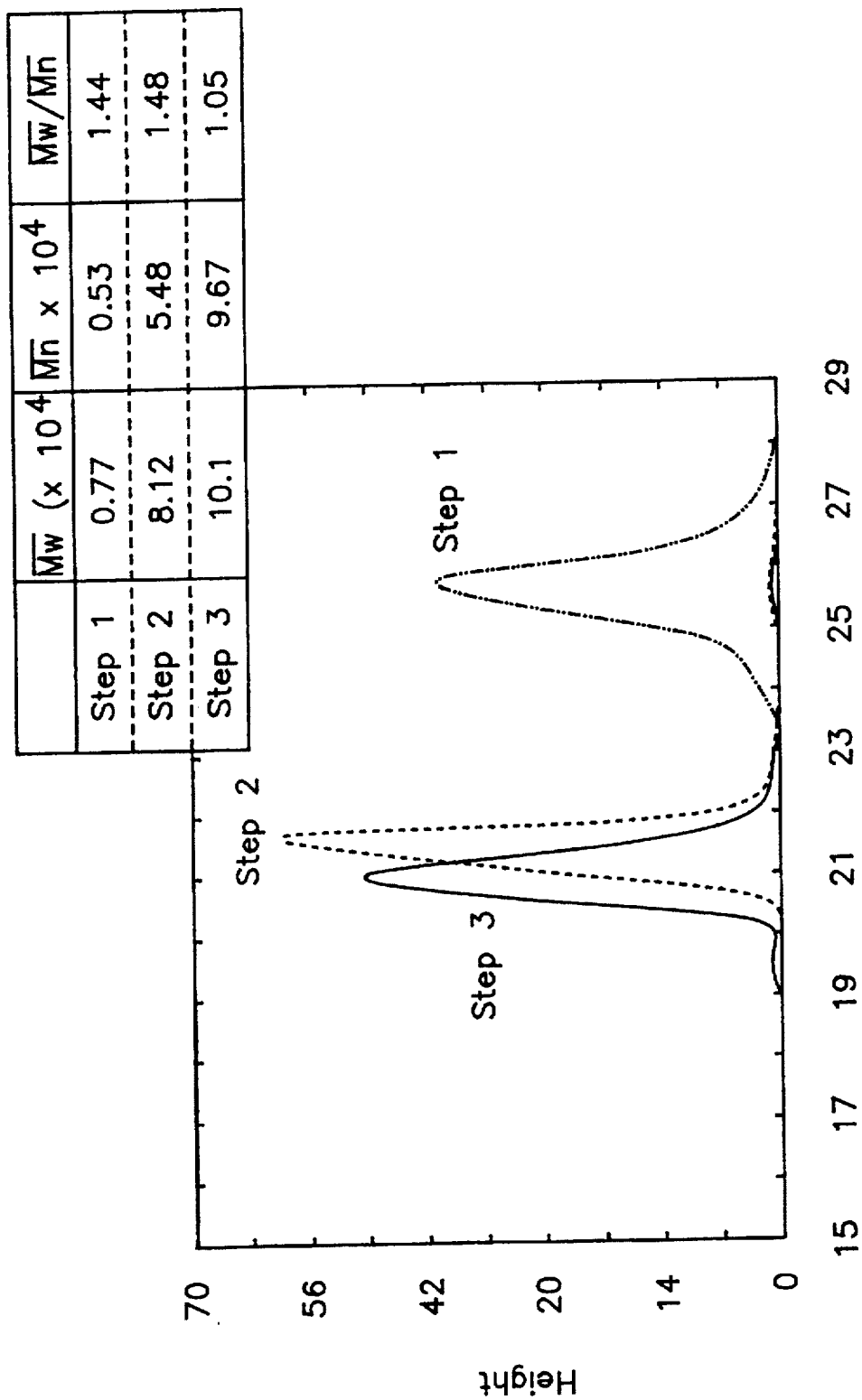
FIG. 8 is a GPC chart of the polycyclohexadiene-polybutadien-polycyclohexadiene triblock copolymer of the present invention, obtained in Example 53.
Figure 9:
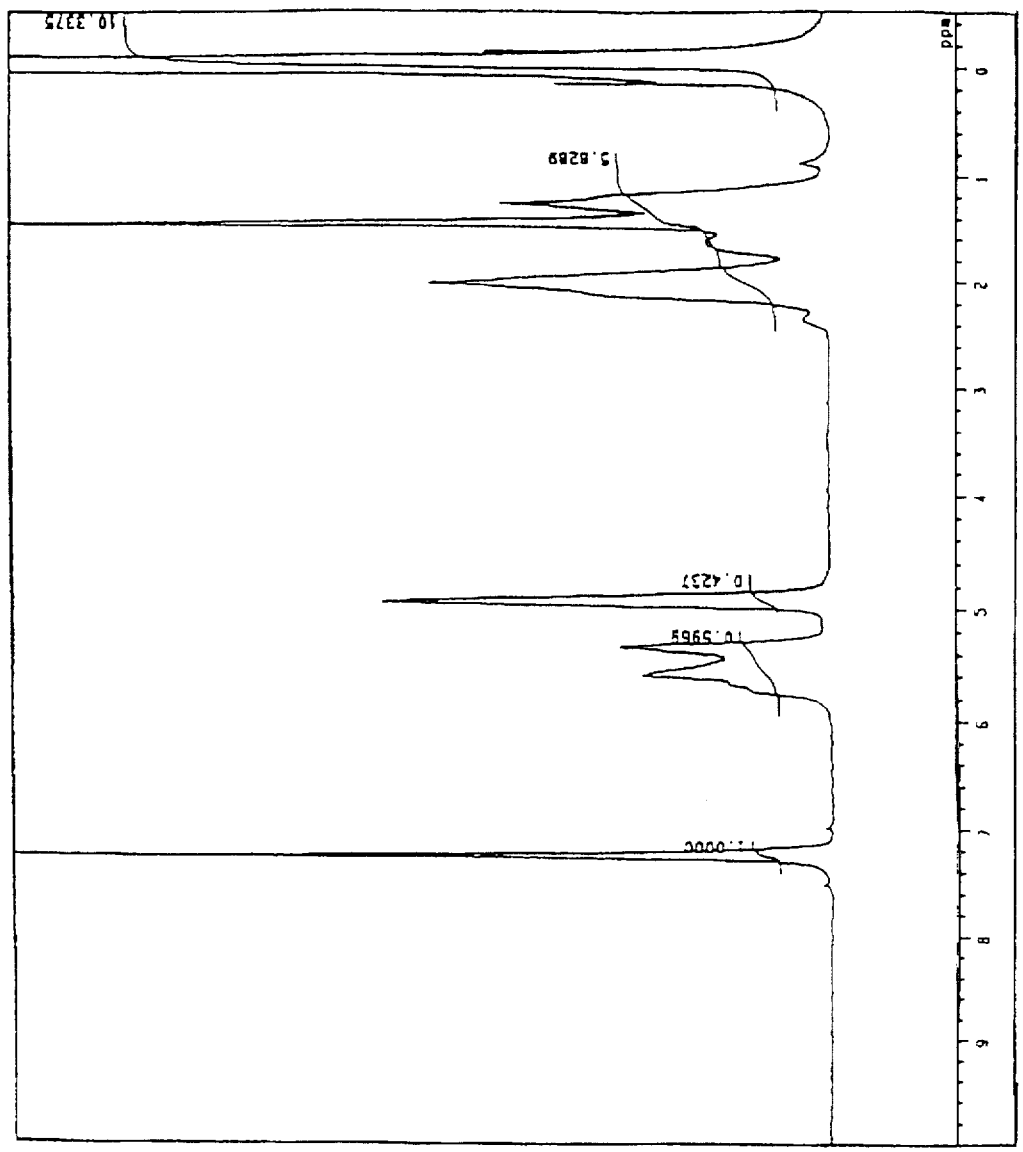
FIG. 9 is a chart showing the $^1$H-NMR spectrum of the polycyclohexadiene-polybutadien-polycyclohexadiene triblock copolymer of the present invention, obtained in Example 53.
Figure 10:
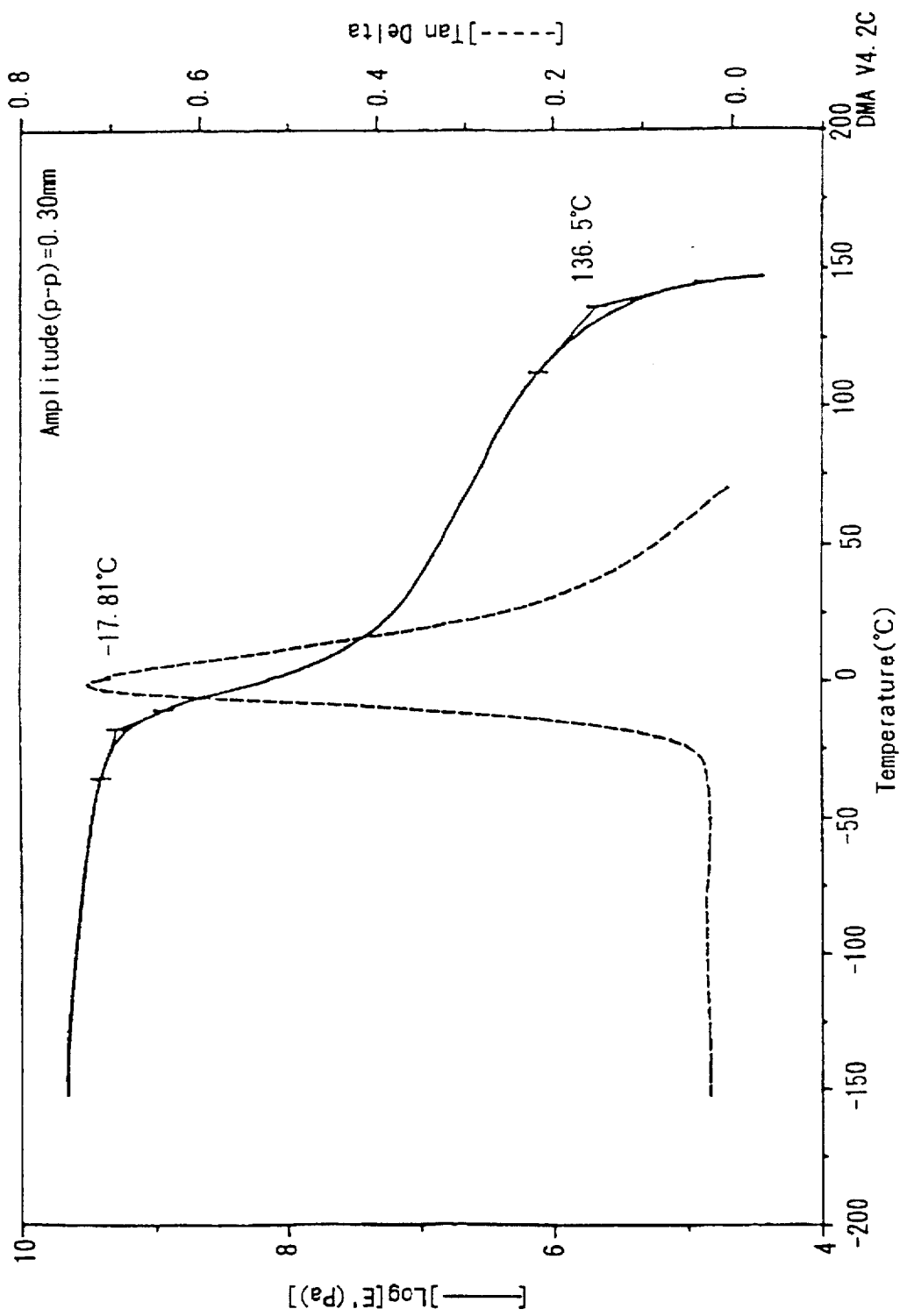
FIG. 10 is a chart showing the viscoelasticity spectra of the polycyclohexadiene-polybutadiene-polycyclohexadiene triblock copolymer of the present invention, obtained in Example 53.
Figure 11:
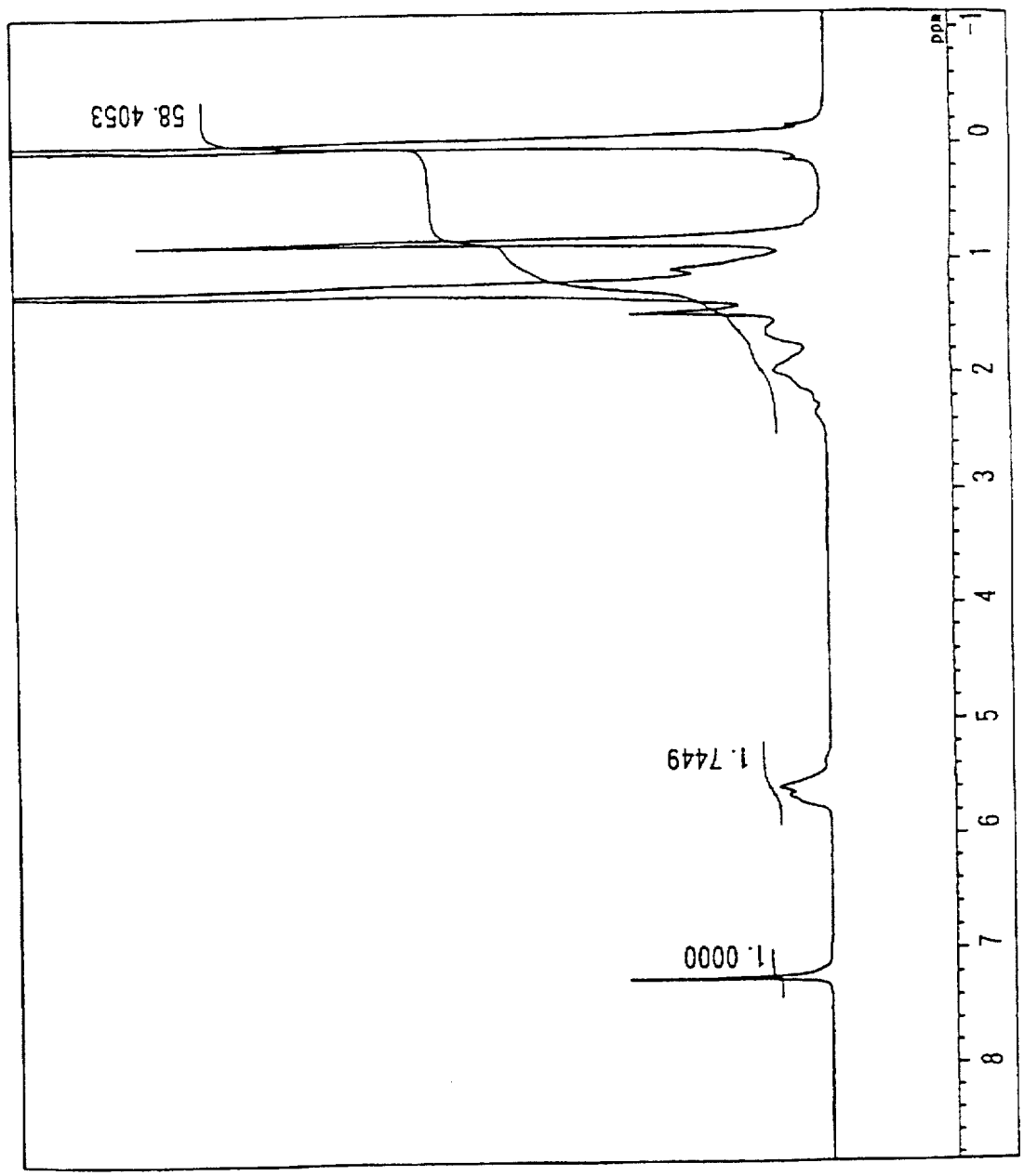
FIG. 11 is a chart showing the $^1$H-NMR spectrum of the polycyclohexadiene-hydrogenated polybutadiene-cyclohexadiene triblock copolymer of the present invention, obtained in Example 55.
Figure 12:
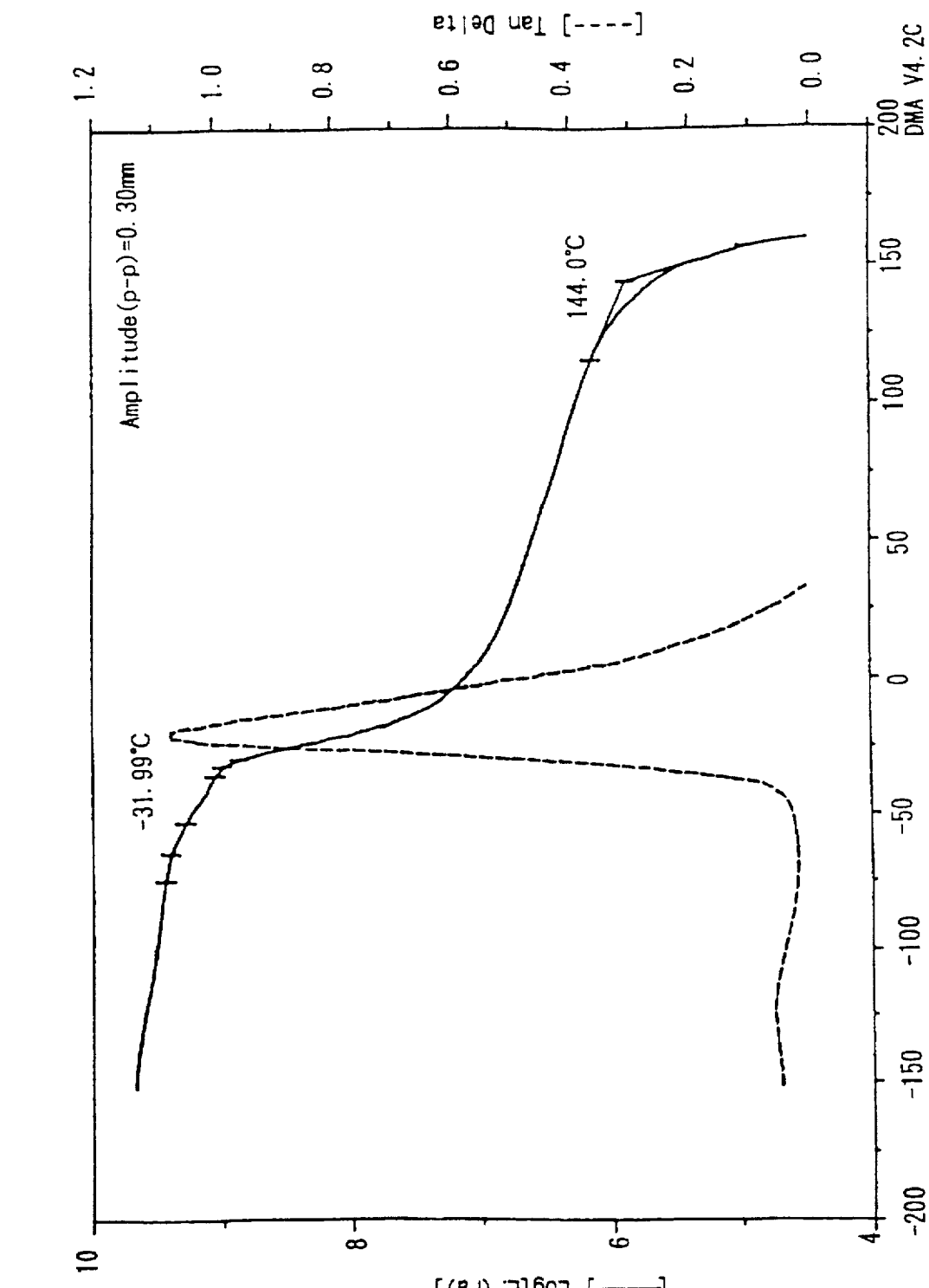
FIG. 12 is a chart showing the viscoelasticity spectra of the polycyclohexadiene-hydrogenated polybutadiene-cyclohexadiene triblock copolymer of the present invention, obtained in Example 55.

For easy understanding of the present invention, the essential features and various embodiments of the present invention are enumerated below.

1. A cyclic conjugated diene polymer comprising a main chain represented by the following formula (I):

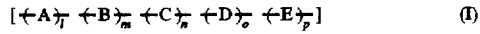

wherein A to E are monomer units constituting the main chain in which monomer units A to E are arranged in any order, and l to p are, respectively, weight percentages of monomer units A to E, based on the total weight of monomer units A to E;

wherein:

A is selected from the class consisting of cyclic conjugated diene monomer units, B is selected from the class consisting of chain conjugated diene monomer units, C is selected from the class consisting of vinyl aromatic monomer units, D is selected from the class consisting of polar monomer units, and E is selected from the class consisting of an ethylene monomer unit and α-olefin monomer units; and wherein:

l to p satisfy the following requirements:

$l+m+n+o+p=100$, $0.5 \leq l \leq 100$, $0 \leq m < 100$, $0 \leq n < 100$ $0 \leq o < 100$, and $0 \leq p < 100$, with the proviso that when $l=100$ and the A monomer units are comprised of cyclic conjugated diene monomer units which are the same, the cyclic conjugated diene polymer has a number average molecular weight of from 40,000 to 5,000,000, that when $l=100$ and the A monomer units are comprised of cyclic conjugated diene monomer units which are different, the cyclic conjugated diene polymer has a number average molecular weight of from 25,000 to 5,000,000, and that when $0.5 \leq l < 100$, the cyclic conjugated diene polymer has a number average molecular weight of from 500 to 5,000,000.

2. The cyclic conjugated diene polymer according to item 1 above, wherein $l=100$, and wherein the A monomer units are comprised of cyclic conjugated diene monomer units which are the same or different.

3. The cyclic conjugated diene polymer according to item 1 above, wherein $0.5 \leq l < 100$, and wherein the A monomer units are comprised of cyclic conjugated diene monomer units which are the same or different.

4. The cyclic conjugated diene polymer according to item 3 above, which is a random copolymer having a number average molecular weight of from 25,000 to 5,000,000.

5. The cyclic conjugated diene polymer according to item 3 above, which is an alternating copolymer having a number average molecular weight of from 25,000 to 5,000,000.

6. The cyclic conjugated diene polymer according to item 3 above, which is a block copolymer having at least one polymer block containing at least one A monomer unit and having a number average molecular weight of from 500 to 5,000,000.

7. The cyclic conjugated diene polymer according to item 6 above, which is an at least-tri-block copolymer.

8. The cyclic conjugated diene polymer according to item 6 above, which is a block copolymer having at least two polymer blocks each containing at least one A monomer unit.

9. The cyclic conjugated diene polymer according to item 6 above, which is a block copolymer having at least two polymer blocks each consisting of at least two A monomer units.

10. The cyclic conjugated diene polymer according to item 6 above, which is an at least-di-block copolymer comprising at least one polymer block consisting of at least two A monomer units, and at least one polymer block consisting of monomer units of at least one type selected from the group consisting of the B to the E.

11. The cyclic conjugated diene polymer according to item 6 above, which is an at least-di-block copolymer comprising at least one α polymer block containing at least one A monomer unit, and at least one β polymer block comprised mainly of monomer units of at least one type selected from the B and the E, wherein the weight ratio of the α block to the β block is from 1/99 to 99/1.

12. The cyclic conjugated diene polymer according to item 6 above, which is an at least-tri-block copolymer comprising at least two Y blocks each containing at least one A monomer unit, and at least one Z block comprised mainly of monomer units of at least one type selected from the B, the C and the E, wherein the weight ratio of the at least two Y blocks to the at least one Z block is from 1/99 to 99/1.

13. The cyclic conjugated diene polymer according to item 6 above, which is a triblock copolymer comprising two Y blocks each containing at least one A monomer unit, and one Z block comprised mainly of monomer units of at least one type selected from the B, the C and the E.

14. The cyclic conjugated diene polymer according to item 12 above, wherein the at least-tri-block copolymer has a configuration represented by a formula selected from the group consisting of $Y-(Z-Y)_q$, $(Y-Z)_r$, $Z-(Y-Z)_r$, $[(Z-Y)_q\text{-}]_r$, $[(Y-Z)_q\text{-}]_r$, $[(Z-Y)_q-Z\text{-}]_r$, and $[(Y-Z)_q-Y\text{-}]_r$ in which Y and Z are as defined above, q is an integer of 1 or more, and r is an integer of 2 or more.

15. The cyclic conjugated diene polymer according to any one of items 1 to 14 above, wherein the A monomer unit is selected from the class consisting of monomer units represented by the following formula (II):

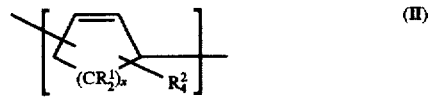

wherein x is an integer of from 1 to 4, each $R^1$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, and each $R^2$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, or each $R^2$ independently represents a bond or a group such that two $R^2$ groups together form a bridge represented by formula $-(CR_2^3)_y$- in which $R^3$ has the same meaning as defined for $R^1$ and y is an integer of from 1 to 10.

16. The cyclic conjugated diene polymer according to item 15 above, wherein the A monomer unit is selected from the class consisting of monomer units represented by the following formula (III):

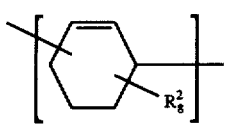

wherein each $R^2$ is as defined for formula (II).

17. The cyclic conjugated diene polymer according to item 15 above, wherein the A monomer unit is at least one member selected from the class consisting of a 1,3-cyclopentadiene monomer unit, a 1,3-cyclohexadiene monomer unit, a 1,3-cyclooctadiene monomer unit, and derivatives thereof.

18. A cyclic conjugated diene polymer according to item 16 above, wherein the A monomer unit is a 1,3-cyclohexadiene monomer unit or a derivative thereof.

19. The cyclic conjugated diene polymer according to item 16 above, wherein the A monomer unit is a 1,3-cyclohexadiene monomer unit.

20. A method for producing a cyclic conjugated diene polymer comprising a main chain represented by the following formula (I):

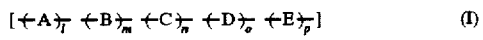

wherein A to E are monomer units constituting the main chain in which monomer units A to E are arranged in any order, and l to p are, respectively, weight percentages of monomer units A to E, based on the total weight of monomer units A to E;
wherein:
A is selected from the class consisting of cyclic conjugated diene monomer units,
B is selected from the class consisting of chain conjugated diene monomer units,
C is selected from the class consisting of vinyl aromatic monomer units,
D is selected from the class consisting of polar monomer units, and
E is selected from the class consisting of an ethylene monomer unit and α-olefin monomer units; and
wherein:
l to p satisfy the following requirements:

$l+m+n+o+p=100$, $0.5 \leq l \leq 100$, $0 \leq m < 100$, $0 \leq n < 100$ $0 \leq o < 100$, and $0 \leq p < 100$, which comprises polymerizing at least one cyclic conjugated diene monomer, or at least one cyclic conjugated diene monomer and at least one comonomer copolymerizable therewith in the presence of a catalyst comprised of a complex of at least one organometallic compound containing a metal belonging to Group IA of the Periodic Table with at least one complexing agent, the at least one comonomer being selected from the class consisting of chain conjugated diene monomers, vinyl aromatic monomers, polar monomers, an ethylene monomer, and α-olefin monomers.

21. The method according to item 20 above, wherein the metal belonging to Group IA of the Periodic Table is present in the complex in the form of an association of 2 metal atoms or more.

22. The method according to item 20 above, wherein the metal belonging to Group IA of the Periodic Table is present in the complex in the form of an association of 4 metal atoms or more.

23. The method according to item 20 above, wherein the at least one complexing agent comprises an amine.

24. The method according to item 20 above, wherein the at least one complexing agent is an aliphatic amine.

25. The method according to item 20 above, wherein the at least one complexing agent is a diamine.

26. The method according to item 20 above, wherein the at least one complexing agent is an aliphatic diamine.

27. The method according to item 20 above, wherein the at least one complexing agent is a tertiary amine.

28. The method according to item 25 above, wherein the diamine is at least one member selected from the group consisting of tetramethylethylenediamine (TMEDA) and 1,4-diazabicyclo[2.2.2]-octane (DABCO).

29. The method according to item 20 above, wherein the at least one organometallic compound containing a metal belonging to Group IA of the Periodic Table is an organolithium compound.

30. The method according to item 20 above, wherein the at least one organometallic compound containing a metal belonging to Group IA of the Periodic Table is an organolithium compound selected from the group consisting of normal butyllithium (n-BuLi), secondary butyllithium (s-BuLi) and tertiary butyllithium (t-BuLi), and the at least one complexing agent is selected from the group consisting of tetramethylethylenediamine (TMEDA) and 1,4-diazabicyclo[2.2.2]-octane (DABCO).

31. The method according to any one of items 20 to 30 above, wherein the polymerization is a homopolymerization of one cyclic conjugated diene monomer, thereby producing a cyclic conjugated diene homopolymer.

32. The method according to any one of items 20 to 30 above, wherein the polymerization is a copolymerization of at least two cyclic conjugated diene monomers or a copolymerization of at least one cyclic conjugated diene monomer and at least one comonomer, thereby producing a cyclic conjugated diene copolymer.

33. The method according to item 32 above, wherein the cyclic conjugated diene copolymer is a random copolymer.

34. The method according to item 32 above, wherein cyclic conjugated diene copolymer is an alternating copolymer.

35. The method according to item 32 above, wherein the cyclic conjugated diene copolymer is a block copolymer.

36. The method according to item 32 above, wherein the cyclic conjugated diene copolymer is an at least-di-block copolymer.

37. The method according to item 32 above, wherein the cyclic conjugated diene copolymer is an at least-tri-block copolymer.

38. The method according to item 32 above, wherein the cyclic conjugated diene copolymer is a triblock copolymer.

39. The method according to item 20 above, wherein the complex is formed prior to the polymerization of the at least one cyclic conjugated diene monomer.

40. A polymerization catalyst comprising at least one organometallic compound containing a metal belonging to Group IA of the Periodic Table with at least one complexing agent, wherein the metal belonging to Group IA of the Periodic Table is present in the complex in the form of an association of 2 metal atoms or more.

41. The polymerization catalyst according to item 40 above, wherein the at least one complexing agent comprises an amine.

42. A polymerization catalyst for use in producing a cyclic conjugated diene polymer, which comprises at least one organometallic compound containing a metal belonging to Group IA of the Periodic Table with at least one complexing agent, the cyclic conjugated diene polymer comprising a main chain represented by the following formula (I):

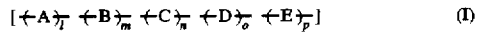

$$[{+A}_{l}{+B}_{m}{+C}_{n}{+D}_{o}{+E}_{p}] \quad (I)$$

wherein A to E are monomer units constituting the main chain in which monomer units A to E are arranged in any order, and l to p are, respectively, weight percentages of monomer units A to E, based on the total weight of monomer units A to E;

wherein:
- A is selected from the class consisting of cyclic conjugated diene monomer units,
- B is selected from the class consisting of chain conjugated diene monomer units,
- C is selected from the class consisting of vinyl aromatic monomer units,
- D is selected from the class consisting of polar monomer units, and
- E is selected from the class consisting of an ethylene monomer unit and α-olefin monomer units; and wherein:
l to p satisfy the following requirements:

$l+m+n+o+p=100$, $0.5 \leq l \leq 100$, $0 \leq m < 100$, $0 \leq n < 100$ $0 \leq o < 100$, and $0 \leq p < 100$.

43. The polymerization catalyst according to item 42 above, wherein the metal belonging to Group IA of the Periodic Table is present in the complex in the form of an association of 2 metal atoms or more.

44. The polymerization catalyst according to item 43 above, wherein the metal belonging to Group IA of the Periodic Table is present in said complex in the form of an association of 2 to 4 metal atoms.

45. The polymerization catalyst according to item 43 above, the said metal belonging to Group IA of the Periodic Table is present in said complex in the form of an association of 2 or 4 metal atoms.

In the present invention, the monomer units of the polymer are named in accordance with a nomenclature such that the names of the original monomers from which the monomer units are derived, as such, are used with the term "unit" attached thereto. For example, the term "cyclic conjugated diene monomer unit" means a monomer unit which is formed in a polymer obtained by the polymerization of a cyclic conjugated diene monomer and which has a molecular structure such that a cycloolefin corresponding to the cyclic conjugated diene monomer is bonded at two carbon atoms of a skeleton thereof.

As mentioned above, the cyclic conjugated diene polymer of the present invention is a polymer comprising a main chain which is comprised partly or entirely of monomer units derived from the cyclic conjugated diene monomers.

Representative examples of cyclic conjugated diene polymers of the present invention include a polymer comprising a main chain which is comprised solely of at least one monomer unit selected from the class consisting of cyclic conjugated diene monomer units, and a polymer comprising a main chain which is comprised of at least one monomer unit selected from the class consisting of cyclic conjugated diene monomer units and a monomer unit derived from at least one comonomer copolymerizable with the conjugated diene monomer.

More specific examples of the cyclic conjugated diene polymer of the present invention include a homopolymer of a cyclic conjugated diene monomer, a copolymer of at least two types of cyclic conjugated diene monomers, and a copolymer of at least one cyclic conjugated diene monomer and at least one comonomer copolymerizable with the cyclic conjugated diene monomer.

Most preferred examples of the cyclic conjugated diene polymer of the present invention include a polymer comprising a main chain which is comprised of at least one monomer unit selected from the class consisting of cyclic conjugated diene monomer units having a cyclohexene ring in a molecular structure thereof.

In the present invention, the term "cyclic conjugated diene monomer" means a cyclic conjugated diene having an at least-5-membered carbocyclic structure.

It is preferred that the cyclic conjugated diene monomer be a cyclic conjugated diene having a 5 to 8-membered carbocyclic structure.

It is more preferred that the cyclic conjugated diene monomer be a cyclic conjugated diene having a 6-membered carbocyclic structure.

Examples of cyclic conjugated diene monomers include 1,3-cyclopentadiene, 1,3-cyclohexadiene, 1,3-cyclooctadiene, and derivatives thereof. Preferred examples of cyclic conjugated diene monomers include 1,3-cyclohexadiene and 1,3-cyclohexadiene derivatives. Of these, 1,3-cyclohexadiene is most preferred.

In the present invention, as examples of comonomers copolymerizable with the cyclic conjugated diene monomer, there can be mentioned monomers which can be polymerized by anionic polymerization.

Examples of such monomers include chain conjugated diene monomers, such as 1,3-butadiene, isoprene, 2,3-dimethyl-1,3-butadiene, 1,3-pentadiene, 1,3-hexadiene and derivatives thereof; vinyl aromatic monomers, such as styrene, α-methylstyrene, o-methylstyrene, p-methylstyrene, p-tert-butylstyrene, 1,3-dimethylstyrene, divinylbenzene, vinylnaphthalene, vinylanthracene, 1,1-diphenylethylene, m-diisopropenylbenzene, vinylpyridine and derivatives thereof; polar vinyl monomers, is such as methyl methacrylate, methyl acrylate, acrylonitrile, methyl vinyl ketone, methyl α-cyanoacrylate and derivatives thereof; polar monomers, such as ethylene oxide, propylene oxide, cyclohexene oxide, lactone, lactam, cyclosiloxane and derivatives thereof; ethylene monomer and derivatives thereof; and α-olefin monomers and derivatives thereof. Each of these monomers can be used individually or in combination.

In the present invention, a copolymer of the cyclic conjugated diene monomer with the above-mentioned comonomer may be of any configuration.

For example, the copolymer may be a block copolymer, such as a diblock, a triblock, a tetrablock, a multiblock, a radial block, an asymmetry radial block, a graft block, a star block or a comb block copolymer, a graft copolymer, a taper copolymer, a random copolymer or an alternating copolymer.

In the cyclic conjugated diene polymer of the present invention, the monomer unit derived from at least one comonomer copolymerizable with the cyclic conjugated diene monomer may be a monomer unit which is formed by a post-polymerization treatment, such as hydrogenation, halogenation, alkylation, arylation or the like.

In the cyclic conjugated diene polymer of the present invention, the content of the cyclic conjugated diene monomer unit is not particularly limited and may vary depending on the intended use of the polymer. However, the content of the cyclic conjugated diene monomer unit is generally within the range of from 0.1 to 100 wt %, preferably from 0.5 to 100 wt %, more preferably from 1 to 100 wt %, based on the weight of the main chain of the cyclic conjugated diene polymer.

Further, for obtaining a cyclic conjugated diene polymer of the present invention which can be used in a field where the polymer is required to have high thermal and mechanical properties, it is recommended that the content of the cyclic conjugated diene monomer unit in the cyclic conjugated diene polymer be within the range of from 5 to 100 wt %, more preferably from 10 to 100 wt %, most preferably from 15 to 100 wt %, based on the weight of the main chain of the cyclic conjugated diene polymer.

In the present invention, the cyclic conjugated diene polymer can be produced by living anionic polymerization, so that the molecular weight of the polymer can be appropriately controlled. However, the number average molecular weight of the polymer is controlled within the range of from 500 to 5,000,000.

From the viewpoint of productivity in the commercial scale production of such a polymer, it is recommended that the number average molecular weight of the polymer be within the range of from 1,000 to 5,000,000, more preferably within the range of from 1,000 to 4,000,000, still more preferably from 1,500 to 3,000,000. The most preferred range is from 2,000 to 2,000,000.

For example, when the polymer is used as a functional material, the number average molecular weight of the polymer is within the range of from 500 to 2,000,000, preferably from 1,000 to 1,000,000, more preferably from 2,000 to 800,000, most preferably from 3,000 to 500,000.

On the other hand, when the polymer is used as a structural material, the number average molecular weight of the polymer is generally within the range of from 20,000 to 5,000,000, preferably from 25,000 to 4,000,000, more preferably from 30,000 to 3,000,000, still more preferably from 35,000 to 3,000,000, most preferably from 40,000 to 2,000,000.

When the cyclic conjugated diene polymer of the present invention is a homopolymer comprising a main chain which is comprised of only one type of cyclic conjugated diene monomer unit, it is preferred that the number average molecular weight of the polymer be 40,000 or more in terms of the value obtained using a calibration curve of a standard polystyrene.

From the viewpoint of productivity in the commercial scale production of such a homopolymer, the number average molecular weight of the homopolymer is preferably within the range of from 40,000 to 5,000,000, more preferably from 40,000 to 4,000,000, still more preferably from 40,000 to 3,000,000, further more preferably from 40,000 to 2,000,000. The most preferred range is from 40,000 to 1,000,000.

When the number average molecular weight of such a homopolymer is less than 40,000, the homopolymer is likely to become markedly brittle, so that the commercial value of the homopolymer as a structural material becomes extremely low.

On the other hand, when the number average molecular weight of such a homopolymer is more than 5,000,000, the homopolymer is disadvantageous in various aspects from the commercial viewpoint. For example, a cyclic conjugated diene homopolymer having such a high molecular weight has disadvantages in that a prolonged period of time is needed for the polymerization reaction, and that the melt viscosity of the homopolymer obtained becomes high.

With respect to the cyclic conjugated diene polymer of the present invention which is comprised only of cyclic conjugated diene monomer units which are different, there is no particular limitation with respect to the molecular weight thereof, and the molecular weight of the polymer can be appropriately selected according to the intended use of the polymer. However, the number average molecular weight of such a polymer in terms of the value obtained using a calibration curve of a standard polystyrene is generally within the range of from 25,000 to 5,000,000, preferably from 25,000 to 4,000,000, more preferably from 30,000 to 3,000,000, still more preferably from 35,000 to 2,000,000, further more preferably from 35,000 to 2,000,000. The most preferred range is from 40,000 to 1,000,000.

With respect to the cyclic conjugated diene polymer of the present invention which is a copolymer comprising at least one monomer unit selected from the class consisting of cyclic conjugated diene monomer units and a monomer unit derived from at least one comonomer copolymerizable with the cyclic conjugated diene monomer, there is no particular limitation with respect to the molecular weight thereof, and the molecular weight of the copolymer can be appropriately selected according to the intended use of the copolymer. However, the number average molecular weight of such a copolymer in terms of the value obtained using a calibration curve of a standard polystyrene is generally within the range of from 500 to 5,000,000, preferably 25,000 to 5,000,000, more preferably from 25,000 to 4,000,000, still more preferably from 30,000 to 3,000,000, still more preferably from 35,000 to 2,000,000, still more preferably from 35,000 to 2,000,000. The most preferred range is from 40,000 to 1,000,000.

When such a copolymer is of a configuration other than block configuration (such as a random or alternating configuration), the number average molecular weight of such a copolymer is preferably from 25,000 to 5,000,000.

When the number average molecular weight of such a copolymer is less than 25,000, the copolymer is likely to become markedly brittle, so that the commercial value of the copolymer as a structural material becomes low.

On the other hand, when the number average molecular weight of such a copolymer is more than 5,000,000, the polymer is disadvantageous in various aspects from the commercial viewpoint. For example, a cyclic conjugated diene copolymer having such a high molecular weight has disadvantages in that a prolonged period of time is needed for the polymerization reaction, and that the melt viscosity of the copolymer obtained becomes high.

Further, when such a copolymer is a block copolymer having a polymer block containing at least one cyclic conjugated diene monomer unit, there is no particular limitation with respect to the molecular weight thereof, and the molecular weight of the block copolymer can be appropriately selected according to the intended use of the block copolymer. However, the number average molecular weight of such a block copolymer in terms of the value obtained using a calibration curve of a standard polystyrene is generally within the range of from 500 to 5,000,000, preferably from 1,000 to 4,000,000, more preferably from 2,000 to 3,000,000, still more preferably from 3,000 to 2,000,000. The most preferred range is from 4,000 to 1,000,000.

When the number average molecular weight of such a block copolymer is less than 500, the block copolymer is likely to become thermally unstable, so that the commercial value of the block copolymer as an industrial material becomes low.

On the other hand, when the number average molecular weight of such a block copolymer is more than 5,000,000, the block copolymer is disadvantageous in various aspects from the commercial viewpoint. For example, a cyclic conjugated diene block copolymer having such a high molecular weight has disadvantages in that a prolonged period of time is needed for the polymerization reaction, and that the melt viscosity of the block copolymer obtained becomes high.

With respect to the cyclic conjugated diene polymer of the present invention, for controlling the molecular weight of the polymer or for obtaining it in the form of a star shaped polymer, it can assume a configuration such that the terminals of a plurality of polymeric molecular chains are bonded using a conventional at least-bi-functional coupling agent, such as dimethyldichlorosilane, methyltrichlorosilane, dimethyldibromosilane, methyltribromosilane, titanocene dichloride, methylene chloride, methylene bromide, chloroform, carbon tetrachloride, silicon tetrachloride, titanium tetrachloride, tin tetrachloride, an epoxidized soybean oil, or an ester.

In the present invention, the number average molecular weight ($\overline{Mn}$) is measured by gel permeation chromatography, using a calibration curve obtained with respect to a standard polystyrene samples.

In the present invention, the $\overline{Mw}/\overline{Mn}$ value (criterion of the molecular weight distribution) of the cyclic conjugated diene polymer is within the range of from 1.01 to 10, preferably from 1.03 to 7.0, more preferably from 1.05 to 5.0, most preferably from 1.05 to 2.00.

In the cyclic conjugated diene polymer of the present invention, the polymeric molecular chain thereof has a structure such that the monomer units A are bonded by a 1,2-bond or a 1,4-bond.

When the cyclic conjugated diene polymer of the present invention is a cyclic conjugated diene block copolymer containing a plurality of different polymer blocks in the polymeric molecular chain thereof, examples of polymer blocks include a polymer block comprised of monomer units derived solely from at least one type of cyclic conjugated diene monomer, a polymer block comprised of a monomer unit derived from at least one type of cyclic conjugated diene monomer and a monomer unit derived from at least one type of comonomer copolymerizable with the cyclic conjugated diene, or a polymer block comprised of monomer units derived solely from at least one comonomer copolymerizable with the cyclic conjugated diene monomer. For attaining various purposes, various types of polymer blocks can be designed and polymerized. By an appropriate choice and combination of such polymer blocks, a cyclic conjugated diene block copolymer having suitable properties for the intended use can be obtained.

In the present invention, when a part or all of a polymer block is comprised of monomer units selected from the class consisting of cyclic conjugated diene monomer units, it is necessary that the polymer block contain at least 1 cyclic conjugated diene monomer unit. Further, in this case, it is recommended that the polymer block contain a contiguous arrangement of at least 2 cyclic conjugated diene monomer units, preferably 5 or more cyclic conjugated diene monomer units, more preferably 10 or more cyclic conjugated diene monomer units, from the viewpoint of improvement of thermal and mechanical properties of the cyclic conjugated diene block copolymer of the present invention.

As a method for producing a cyclic conjugated diene block copolymer of the present invention, there can be mentioned a method which comprises preparing a block unit polymer comprised of monomer units derived from at least one type of cyclic conjugated diene monomer, a block unit polymer comprised of monomer units derived from at least one cyclic conjugated diene monomer and a monomer unit derived from at least one type of comonomer copolymerizable with the cyclic conjugated diene monomer, and a block unit polymer comprised of monomer units derived from at least one type of comonomer copolymerizable with the cyclic conjugated diene monomer; choosing an appropriate combination of these block unit polymers; and polymerization-bonding the combination of block unit polymers together, thereby obtaining a cyclic conjugated diene block copolymer having suitable properties for the intended use of the polymer. If desired, the cyclic conjugated diene block copolymer can be subjected to an addition reaction, with the proviso that the carbon-to-carbon double bond contained in the molecular structure of the cyclic conjugated diene monomer unit should not be saturated by hydrogenation or the like.

Specific examples of preferred modes of the method of the present invention include the following modes.

One mode of the method comprises the steps of forming by polymerization a block unit polymer containing a monomer unit derived from at least one type of cyclic conjugated diene monomer, or a block unit polymer derived solely from the cyclic conjugated diene monomer; and polymerizing the block unit polymer with at least one type of comonomer copolymerizable with the cyclic conjugated diene monomer, wherein the comonomer is successively bonded to one or both terminals of the block unit polymer by polymerization. If desired, the block copolymer obtained may be subjected to an addition reaction.

Another mode of the method comprises the steps of polymerizing at least one type of comonomer copolymerizable with a cyclic conjugated diene monomer to obtain a block unit polymer; and polymerizing the block unit polymer with at least one cyclic conjugated diene monomer, and optionally with at least one type of comonomer copolymerizable with the cyclic conjugated diene monomer, wherein the cyclic conjugated diene monomer and the optional comonomer are successively bonded to one or both terminals of the block unit polymer by polymerization. If desired, the block copolymer obtained may be subjected to an addition reaction.

A further mode of the method comprises the steps of forming by polymerization a block unit polymer containing a monomer unit derived from at least one cyclic conjugated diene monomer, or a block unit polymer derived solely from the cyclic conjugated diene monomer; polymerizing the block unit polymer with at least one type of comonomer copolymerizable with the cyclic conjugated diene monomer to obtain a polymer; and successively bonding to the polymer by polymerization a block unit polymer containing a monomer unit derived from at least one cyclic conjugated diene monomer or a block unit polymer derived solely from the cyclic conjugated diene monomer. If desired, the block copolymer obtained may be subjected to an addition reaction.

Still a further mode of the method comprises the steps of polymerizing at least one type of comonomer copolymerizable with the cyclic conjugated diene monomer to obtain a block unit polymer; polymerizing the block unit polymer with a block unit polymer containing a monomer unit derived from at least one cyclic conjugated diene monomers or a block unit polymer derived solely from the cyclic conjugated diene polymer; and successively bonding to the resultant polymer by polymerization at least one type of comonomer copolymerizable with the cyclic conjugated diene monomer. If desired, the block copolymer obtained may be subjected to an addition reaction.

Still a further mode of the method comprises polymerizing at least one cyclic conjugated diene monomer with at least one type of comonomer copolymerizable with the cyclic conjugated diene monomer, wherein the at least one comonomer has a different polymerization rate from that of the cyclic conjugated diene monomer, to thereby obtain a taper block copolymer. If desired, the block copolymer obtained may be subjected to an addition reaction.

Still a further mode of the method comprises the steps of forming by polymerization a block unit polymer containing a monomer unit derived from at least one cyclic conjugated diene monomer or a block unit polymer derived only from the cyclic conjugated diene monomer; polymerizing the block unit polymer with at least one type of comonomer copolymerizable with the cyclic conjugated diene monomer to obtain a polymer; and bonding the terminals of the polymeric molecular chain of the polymer using a conventional at least-bi-functional coupling agent (such as dimethyldichlorosilane, methyltrichlorosilane, dimethyldibromosilane, methyltribromosilane, titanocene dichloride, methylene chloride, methylene bromide, chloroform, carbon tetrachloride, silicon tetrachloride, titanium tetrachloride, tin tetrachloride, an epoxidized soybean oil, or an ester). If desired, the block copolymer obtained may be subjected to an addition reaction.

Still a further mode of the method comprises the steps of forming by polymerization a block unit polymer containing a monomer unit derived from at least one cyclic conjugated diene monomer or a block unit polymer derived only from the cyclic conjugated diene monomer; introducing a functional group to one or both terminals of the block unit polymer using a terminal modifier, to obtain a functional block unit polymer (if desired, the obtained functional block unit polymer may be subjected to an addition reaction); and bonding the functional block unit polymer thus obtained to another polymer having a functional group which can be bonded to the functional group of the above-obtained functional block unit polymer.

Still a further mode of the method comprises steps of forming by polymerization a block unit polymer containing a monomer unit derived from at least one cyclic conjugated diene monomer or a block unit polymer derived only from the cyclic conjugated diene monomer; polymerizing the block unit polymer with at least one type of comonomer copolymerizable with the cyclic conjugated diene monomer to obtain a polymer; introducing a functional group to one or both terminals of the thus obtained polymer using a terminal modifier to obtain a functional polymer (if desired, the functional polymer may be subjected to an addition reaction); and bonding the thus obtained functional polymer to another polymer having a functional group which can be bonded to the functional group of the above functional polymer.

Still a further mode of the method comprises polymerizing a cyclic conjugated diene monomer and at least one type of comonomer copolymerizable with the cyclic conjugated diene monomer, wherein the ratio of the cyclic conjugated diene monomer to the at least one comonomer is not a unity. If desired, the block copolymer obtained may be subjected to an addition reaction.

Still a further mode of the method comprises the steps of forming by polymerization a block unit polymer containing a monomer unit derived from at least one cyclic conjugated diene monomer or a block unit polymer derived only from the cyclic conjugated diene monomer, wherein the polymerization is conducted until a desired certain conversion is achieved, so that a certain amount of a cyclic conjugated diene monomer remains unreacted; and polymerizing the above-mentioned certain amount of the unreacted cyclic conjugated diene monomer, to thereby obtain a block copolymer. If desired, the block copolymer obtained may be subjected to an addition reaction.

In the present invention, the block unit polymer comprised of at least one monomer unit selected from the class consisting of cyclic conjugated diene monomer units may further comprise a monomer unit derived from at least one comonomer copolymerizable with the cyclic conjugated diene monomer.

Further, in the present invention, the block unit polymer comprised of a monomer unit derived from at least one comonomer copolymerizable with the cyclic conjugated diene monomer may further comprise at least one monomer unit selected from the class consisting of cyclic conjugated diene monomer units.

In the present invention, with respect to monomer units derived from at least one type of cyclic conjugated diene monomer and to polymer blocks comprised of such monomer units, it is most preferred to use, respectively, a monomer unit comprised of a cyclohexene ring and a polymer block comprising a monomer unit comprised of a cyclohexene ring or consisting of monomer units each comprised of a cyclohexene ring.

In the present invention, the above-mentioned addition reaction is at least one reaction selected from the group consisting of hydrogenation, halogenation, hydrohalogenation, alkylation and arylation, wherein the addition reaction is effected on a monomer unit other than the cyclic conjugated diene monomer unit.

With respect to the cyclic conjugated diene monomer units which are contained as a part or all of the monomer units constituting the main chain of the cyclic conjugated diene polymer of the present invention, preferred examples thereof are those which are represented by the following formula (II), and most preferred examples thereof are those which are represented by the following formula (III):

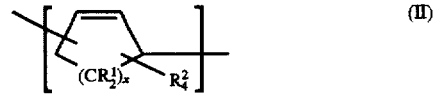
(II)

wherein x is an integer of from 1 to 4, each $R^1$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, and each $R^2$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, or each $R^2$ independently represents a bond or a group such that two $R^2$ groups form a bridge represented by formula $-(CR_2^3)_y$ in which $R^3$ has the same meaning as defined for $R^1$ and y is an integer of from 1 to 10; and

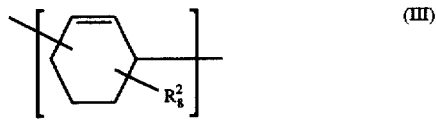

(III)

wherein each $R^2$ is as defined for formula (II).

In each of the above formulae (II) and (III), it is preferred that the alkyl group have 2 to 10 carbon atoms, the unsaturated aliphatic hydrocarbon group have 2 to 10 carbon atoms, the aryl group have 5 to 10 carbon atoms, the cycloalkyl group have 5 to 10 carbon atoms, the cyclodienyl group have 5 to 10 carbon atoms, and the heterocyclic group have a 5 to 8-membered ring structure.

Specific examples of substituents $R^1$ and $R^2$ include a methyl group, an ethyl group, an n-propyl group, an isopropyl group, an n-butyl group, a sec-butyl group, a tert-butyl group, a pentyl group, a hexyl group, a cyclopentyl group, a cyclohexyl group, a vinyl group, a phenyl group, a tolyl group, a naphthyl group, a cyclopentadienyl group, an indenyl group, a pyridyl group, and a piperidyl group.

In the present invention, for obtaining a cyclic conjugated diene block copolymer which has an elastomeric properties (rubber elasticity), it is necessary that the block copolymer be comprised of at least two polymer blocks having a glass transition temperature (Tg) higher than room temperature (agglomeration phases i.e., hard segments) and at least one polymer block having a Tg lower than room temperature (an elastomer phase, i.e., a soft segment), and that these two types of blocks form a microdomain structure.

In the polymeric molecular chain of such a block copolymer, the agglomeration phase functions as a physical crosslinking site at a temperature lower than Tg, so that the block copolymer has elastomeric properties.

On the other hand, at Tg or a temperature higher than Tg, the agglomeration phase becomes fluid, so that the block copolymer is imparted with flowability. Therefore, in this case, it becomes possible to perform a melt molding (such as injection molding, blow molding or injection molding) or a cast molding (such as cast film molding).

In the present invention, it is possible to crosslink the polymeric molecular chain of the cyclic conjugated diene copolymer, so as to impart the copolymer with elastomeric properties (rubber elasticity).

Hereinbelow, the preferred embodiments of the cyclic conjugated diene block copolymer of the present invention are enumerated.

(1) A cyclic conjugated diene block copolymer, which has at least one polymer block containing at least one A monomer unit.

(2) A cyclic conjugated diene block copolymer which is an at least-tri-block copolymer.

(3) A cyclic conjugated diene block copolymer, which has at least two polymer blocks each containing at least one A monomer unit.

(4) A cyclic conjugated diene block copolymer, which has at lest two polymer blocks each consisting of at least two A monomer units.

(5) A cyclic conjugated diene block copolymer, which is an at least-di-block copolymer comprising at least one polymer block consisting of at least two A monomer units, and at least one polymer block consisting of monomer units of at least one type selected from the group consisting of the B to the E.

(6) A cyclic conjugated diene polymer block copolymer, which is an at least-di-block copolymer comprising at least one α polymer block containing at least one A monomer unit, and at least one β polymer block comprised mainly of monomer units of at least one type selected from the B and the E, wherein the weight ratio of the α block to the β block is from 1/99 to 99/1.

(7) A cyclic conjugated diene block copolymer, which is an at least-tri-block copolymer comprising at least two Y blocks each containing at least one A monomer unit, and at least one Z block comprised mainly of monomer units of at least one type selected from the B, the C and the E, wherein the weight ratio of the at least two Y blocks to the at least one Z block is from 1/99 to 99/1.

(8) A cyclic conjugated diene block copolymer, which is a triblock copolymer comprising two Y blocks each containing at least one A monomer unit, and one Z block comprised mainly of monomer units of at least one type selected from the B, the C and the E.

(9) A cyclic conjugated diene block copolymer, which is an at least-tri-block copolymer, wherein the at least-tri-block copolymer has a configuration represented by a formula selected from the group consisting of $Y-(Z-Y)_q$, $(Y-Z)_r$, $Z-(Y-Z)_r$, $[(Z-Y)_q]_r$, $[(Y-Z)_q]_r$, $[(Z-Y)_q-Z]_r$, and $[(Y-Z)_q-Y]_r$ in which Y and Z are as defined above, q is an integer of 1 or more, and r is an integer of 2 or more.

For obtaining a cyclic conjugated diene block copolymer having elastomeric properties (rubber elasticity), it is preferred that the cyclic conjugated diene block copolymer contain at least two Y blocks [each Y block being comprised mainly of at least one type of cyclic conjugated diene monomer unit and/or a monomer unit derived from the cyclic conjugated diene monomer unit (in an amount of at least 50 wt %, based on the total weight of the monomer units constituting the Y block), or being comprised of at least one type of cyclic conjugated diene monomer unit and at least one type of vinyl aromatic monomer unit], and at least one Z block comprised mainly of at least one type of chain conjugated diene monomer unit and/or a monomer unit derived from the chain conjugated diene monomer unit (in an amount of at least 50 wt %, based on the total weight of the monomer units constituting the Z block). It is more preferred that the cyclic conjugated diene block copolymer contain at least two Y blocks (each Y block being comprised of at least one type of cyclic conjugated diene monomer unit and/or a monomer unit derived from such a cyclic conjugated diene monomer unit), and at least one Z block comprised mainly of at least one type of chain conjugated diene monomer unit and/or a monomer unit derived from the chain conjugated diene monomer unit (in an amount of at least 50 wt %, based on the total weight of the monomer units constituting the Z block). It is especially preferred that the cyclic conjugated diene block copolymer be a polymer obtained by hydrogenation of a cyclic conjugated diene block copolymer containing at least two Y blocks [each Y block being comprised mainly of at least one type of cyclic conjugated diene monomer unit and/or a monomer unit derived from such a cyclic conjugated diene monomer unit (in an amount of at least 50 wt %, based on the total weight of the monomer units constituting the Y block), or being comprised of at least one type of cyclic conjugated diene monomer unit and at least one type of vinyl aromatic monomer unit], and at least one Z block comprised mainly of at least one type of chain conjugated diene monomer unit and/or a monomer unit derived from the chain conjugated diene monomer unit (in an amount of at least 50 wt %, based on the total weight of the monomer units constituting the Z block). It is most preferred that the cyclic conjugated diene block copolymer be a polymer obtained by hydrogenation of a cyclic conjugated diene block copolymer containing at least two Y blocks (each Y block being comprised of at least one type of cyclic conjugated diene monomer unit and/or a monomer unit derived from the cyclic conjugated diene monomer unit), and at least one Z block comprised mainly of at least one type of chain conjugated diene monomer unit and/or a monomer unit derived from the chain conjugated diene monomer unit (in an amount of at least 50 wt %, based on the total weight of the monomer units constituting the Z block).

When the cyclic conjugated diene block copolymer of the present invention is used as an industrial material, it is preferred that the monomer units constituting the Y block be monomer units derived from 1,3-cyclohexadiene, monomer units derived from 1,3-cyclohexadiene, and styrene, or monomer units derived from α-methylstyrene, and that the monomer units constituting the Z block be monomer units derived from 1,3-butadiene and/or isoprene, which monomer units may be hydrogenated.

When the Z block is formed by polymerization of 1,3-butadiene monomer and/or isoprene monomer, the vinyl bond content of the monomers can be appropriately controlled without particular limitation. However, for obtaining a cyclic conjugated diene block copolymer having excellent low temperature properties, the vinyl bond content is preferably within the range of from 10 to 90 mol %, more preferably from 20 to 80 mol %, based on the total mol of cis- and trans-1,4-bonds and the vinyl bond, which are present in the Z block.

In the present invention, for obtaining block copolymers having elastomeric properties (rubber elasticity), for example, it is preferred that the block copolymers be linear block copolymers respectively represented by the formulae (IV) and radial block copolymers respectively represented by the formulae (V):

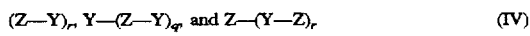

(Z—Y)$_r$, Y—(Z—Y)$_q$, and Z—(Y—Z)$_r$     (IV)

wherein q is an integer of 1 or more, and each r is an integer of 2 or more; and

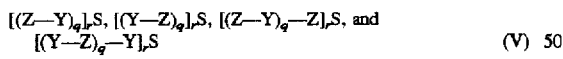

[(Z—Y)$_q$]$_r$S, [(Y—Z)$_q$]$_r$S, [(Z—Y)$_q$—Z]$_r$S, and
[(Y—Z)$_q$—Y]$_r$S     (V)

wherein each q and each r are as defined above; and each S independently represents a residue of a multifunctional coupling agent, such as dimethyldichlorosilane, methylene chloride, silicon tetrachloride, tin tetrachloride or an epoxidized soybean oil, or a residue of a polymerization initiator, such as a multifunctional organometallic compound containing a metal belonging to Group IA of the Periodic Table.

Representative examples of cyclic conjugated diene block copolymers of the present invention, which have thermoplastic elastomeric properties, include a cyclic conjugated diene block copolymer which is a triblock copolymer represented by the formula: Y—Z—Y, wherein the Y block is present in an amount of from 10 to 60 wt %, preferably from 15 to 50 wt %, and the Z block is present in an amount of from 90 to 40 wt %, preferably from 85 to 50 wt %, and wherein the triblock copolymer has a number average molecular weight of from 1,000 to 200,000.

On the other hand, representative examples of cyclic conjugated diene block copolymers of the present invention, which can be employed as a tough plastic material, include a cyclic conjugated diene block copolymer which is a triblock copolymer represented by the formula: Y—Z—Y, wherein the Y block is present in an amount of from 40 to 90 wt %, preferably from 45 to 85 wt %, and the Z block is present in an amount of from 60 to 10 wt %, preferably from 55 to 15 wt %, and wherein the triblock copolymer has a number average molecular weight of from 1,000 to 200,000.

In the present invention, it is most preferred that the above-mentioned cyclic conjugated diene block copolymer having elastomeric properties be a polymer, in which the Z block is hydrogenated.

In still another aspect of the present invention, there is provided a novel polymerization catalyst having an anionic polymerization activity, particularly a living anionic polymerization activity.

The polymerization catalyst of the present invention is a complex comprising at least one organometallic compound containing a metal belonging to Group IA of the Periodic Table (Group IA metal) with at least one complexing agent, wherein the metal belonging to Group IA of the Periodic Table is present in the complex in the form of an association of 2 metal atoms or more.

Heretofore, various types of catalysts having a living anionic polymerization activity have been proposed. For example, organometallic compounds containing a Group IA metal or complexes of the organometallic compounds containing a Group IA metal with complexing agents have already been widely used as an effective reagent in organic synthesis of monomers.

Among these complexes of organometallic compounds containing a Group IA metal, particularly with respect to a complex of an alkyllithium (R—Li) with TMEDA (tetramethylethylenediamine) as a complexing agent, extensive studies have been made.

N.Y. Acad. Sci. 27, 741 (1965) teaches that such a complex as the polymerization active species has a mononuclear alkyllithium—TMEDA complex structure represented by the formula (VI) shown below, which is characterized by containing one metal atom in one complex.

(VI)

wherein R represents a C$_1$–C$_{20}$ alkyl group.

With respect to such a complex, it has been generally considered that, when a complexing agent is added to a system of associated molecules of a Group IA metal-containing organometallic compound, the complexing agent reacts with the organometallic compound to form a complex, thereby destroying the association of the organometallic compound molecules, so that a mononuclear complex is formed, which exhibits a high polymerization activity.

However, generally, in the field of polymer chemistry, it has been considered that a complex of an organometallic compound containing a Group IA metal is not preferable for use in a polymerization reaction, because the reactivity of the complex is likely to be extremely enhanced by ionization of the organometallic compound containing a Group IA metal, or by degradation of the association of the Group IA metal atoms, thus leading to an occurrence of disadvantageous side reactions, such as metalation and abstraction of an acidic proton.

In these situations, the present inventor has made extensive and intensive studies toward developing an excellent polymerization catalyst which not only has a high polymerization activity, but also is free from occurrence of the above-mentioned disadvantageous side reactions.

As a result, the present inventor has found a surprising fact which is contrary to the conventional recognition of a living anionic polymerization catalyst. That is, the present inventors have surprisingly, unexpectedly found that a complex of at least one organometallic compound containing a Group IA metal with at least one complexing agent, wherein the metal belonging to Group IA of the Periodic Table is present in the complex in the form of an association of 2 metal atoms or more, can be used as a stable polymerization catalyst which has high polymerization activity and does not cause disadvantageous side reactions, such as metallation and abstraction of an acidic proton, during polymerization. Based on this novel finding, the polymerization catalyst of the present invention has been successfully developed.

The novel polymerization catalyst of the present invention is a complex of an organometallic compound containing a Group IA metal with a complexing agent, wherein the metal belonging to Group IA of the Periodic Table is present in the complex in the form of an association of 2 metal atoms or more, which complex has a complex structure capable of self-stabilizing an association of the molecules of the organometallic compound and self-maintaining the complex structure even in the presence of monomers.

In the present invention, with respect to the complex, as long as two or more atoms of the Group IA metal are associated together, the association form of the atoms may be varied depending on the respective types of the organometallic compound and the complexing agent, and the intended use of the complex, and a most stable association form can be appropriately selected.

The polymerization catalyst of the present invention has not only a satisfactory polymerization activity for use in a commercial scale practice of polymerization of monomers, which have a large steric hindrance and therefore are difficult to polymerize, such as a cyclic conjugated diene monomer, but also the capability to self-maintain the complex structure thereof even in the presence of monomers to be polymerized. The polymerization reaction using the polymerization catalyst of the present invention is a living anionic polymerization reaction. Despite this, however, the reaction proceeds like a coordination polymerization, that is, by virtue of the specific structure of the catalyst of the present invention, a monomer to be polymerized is inserted to the complex as a polymerization active species as in a coordination polymerization. Therefore, even when the catalyst of the present invention is used for polymerization of other known monomers which can be polymerized by anionic polymerization, the molecular structure of the resultant polymer can be satisfactorily controlled.

By using such a catalyst for polymerization of at least one type of cyclic conjugated diene monomer, or for polymerization of at least one type of cyclic conjugated diene monomer and at least one comonomer copolymerizable with the cyclic conjugated diene monomer (selected from the class consisting of chain conjugated diene monomers, vinyl aromatic monomers, polar monomers, an ethylene monomer, and α-olefin monomer), the cyclic conjugated diene polymer can be synthesized by anion polymerization, especially by living anion polymerization, from cyclic conjugated diene monomers under commercially advantageous temperature conditions, to thereby obtain a cyclic conjugated diene polymer having a desired configuration and a desired molecular weight distribution.

Examples of metals belonging to Group IA of the Periodic Table (hereinafter, frequently simply referred to as "Group IA metals") which can be used in the present invention include lithium, sodium, potassium, rubidium, cesium and francium. Among these, lithium, sodium and potassium are preferred. Of these, lithium and sodium are especially preferred, and lithium is most preferred.

In the present invention, examples of organometallic compounds containing a Group IA metal include an organometallic compound containing lithium, sodium, potassium, rubidium, cesium or francium.

Among these, an organometallic compound containing lithium, sodium or potassium is preferred.

Of these, an organometallic compound containing lithium or sodium is especially preferred, and an organometallic compound containing lithium is most preferred.

Preferable examples of organometallic compounds to be used in the present invention include an organolithium compound, an organosodium compound and an organopotassium compound.

Among these, an organolithium compound and the organosodium compound are especially preferred, and an organolithium compound is most preferred.

The organolithium compound, which is preferably used in the present invention, is an organic compound having a structure such that at least one lithium atom (or lithium ion) is bonded to an organic molecule containing at least one carbon atom or an organic polymer having a structure such that at least one lithium atom (or lithium ion) is bonded to an organic polymer.

Examples of organic molecules include a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group and the like.

Examples of organic polymers include polybutadiene, polyisoprene, polystyrene, poly-α-methylstyrene, polyethylene and the like.

Examples of organolithium compounds usable in the present invention include methyllithium, ethyllithium, n-propyllithium, isopropyllithium, n-butyllithium, sec-butyllithium, tert-butyllithium, pentyllithium, hexyllithium, allyllithium, cyclohexyllithium, phenyllithium, hexamethylenedilithium, cyclopentadienyllithium, indenyllithium, 9-fluorenyllithium, 9-anthrylmethyllithium, 1,1-diphenyl-n-hexyllithium, 1,1-diphenyl-3-methylpentyllithium, lithiumnaphtalene, butadienyldilithium, and isoprenyldilithium. Further, known oligomeric or polymeric organolithium compounds, each containing a lithium atom in a polymeric molecular chain thereof, such as polybutadienyllithium, polybutadienyldilithium, polyisoprenyllithium, polyisoprenyldilithium, polystyryllithium, polystyryldilithium, and poly-α-methyldilithium can also be used.

There is no particular limitation with respect to the type of the organolithium compound, as long as a stable complex can be formed. Representative examples of such an organolithium compound include methyllithium, ethyllithium, n-propyllithium, iso-propyllithium, n-butyllithium, sec-butyllithium, tert-butyllithium, and cyclohexyllithium.

From the commercial point of view, preferable examples of organolithium compounds include n-butyllithium (n-BuLi), sec-butyllithium (s-BuLi), and tert-butyllithium (t-BuLi), and of these, n-butyllithium (n-BuLi) is most preferred.

In the present invention, each of the above-mentioned organometallic compounds containing a Group IA metal can be used individually or, if desired, in combination.

As mentioned above, the polymerization catalyst of the present invention comprises a complex of at least one Group IA metal-containing organometallic compound with at least one complexing agent.

There is no particular limitation with respect to the type of the complexing agent. However, it is preferred that the complexing agent be an organic compound having an element which has a non-covalent electron pair capable of coordinating with a metal atom or metal ion in an organometallic compound containing the above-mentioned Group IA metal. Examples of such organic compounds include an organic compound containing at least one element selected from the group consisting of oxygen (O), nitrogen (N), sulfur (S) and phosphorus (P).

Preferred examples of such organic compounds include an ether, a metal alkoxide, an amine, and a thioether. Especially preferred examples of organic compounds include a cyclic ether, such as tetrahydrofuran, clown ether or the like, a metal alkoxide, and an amine. Of these, an amine is most preferred.

Specifically, examples of such amines include an organic amine or an organic polymeric amine, which contains at least one $R^1R^2N—$ group (wherein each of $R^1$ and $R^2$ independently represents an alkyl group, an aryl group, or a hydrogen atom) which is a polar group having a non-covalent electron pair capable of coordinating with the organometallic compound containing a Group IA metal to thereby form a complex.

Among these amines, a tert-amine is especially preferred, and a tert-diamine is most preferred.

Specific examples of complexing agents usable in the present invention include diethyl ether, dibutyl ether, 1,2-dimethoxyethane, tetrahydrofuran, 2-methyltetrahydrofuran, tetrahydropyran, 18-crown-6, dibenzo-18-crown-6, 15-crown-5, dibenzo-24-crown-8, cryptand, lithium-t-butoxide, potassium-t-butoxide di-t-butoxybarium, porphyrin, 1,2-dipiperazinoethane, trimethylamine, triethylamine, tri-n-butylamine, quinuclidine, pyridine, 2-methylpyridine, 2,6-dimethylpyridine, dimethylaniline, diethylaniline, tetramethyldiaminomethane, tetramethylethylenediamine, tetramethyl-1,3-propanediamine, tetramethyl-2-butene-1,4-diamine, tetramethyl-1,4-butanediamine, tetramethyl-1,6-hexanediamine, tetramethyl-1,4-phenylenediamine, tetramethyl-1,8-naphthalenediamine, tetramethylbenzidine, tetraethylethylenediamine, tetraethyl-1,3-propanediamine, tetramethyldiethylenetriamine, tetraethyldiethylenetriamine, pentamethyldiethylenetriamine, pentaethyldiethylenetriamine, 1,4-diazabicyclo[2.2.2]-octane, 1,5-diazabicyclo[4.3.0]-5-nonene, 1,8-diazabicyclo[5.4.0]-7-undecene, 1,4,8,11-tetramethyl-1,4,8,11-tetraazacyclotetradecane, tetrakis(dimethylamino)ethylene, tetraethyl-2-butene-1,4-diamine, (−)-2,3-dimethoxy-1,4-bis(dimethylamino)butane (DBB), (+)-1-(2-pyrrolidinylmethyl)pyrrolidine, 2,2'-bipyridyl, 4,4'-bipyridyl, 1,10-phenanthroline, hexamethylphosphoramide (HMPA), and hexamethylphosphoric triamide (HMPT).

Preferred examples of tert-amines usable in the present invention include trimethylamine, triethylamine, tri-n-butylamine, quinuclidine, pyridine, 2-methylpyridine, 2,6-dimethylpyridine, dimethylaniline, diethylaniline, tetramethyldiaminomethane (tetramethylmethylenediamine), tetramethylethylenediamine, tetramethyl-1,3-propanediamine(tetramethylpropyrenediamine), tetramethyl-2-butene-1,4-diamine, tetramethyl-1,4-butanediamine (tetramethylbutylenediamine), tetramethyl-1,6-hexanediamine (tetramethylhexanediamine), tetramethyl-1,4-phenylenediamine, tetramethyl-1,8-naphthalenediamine, tetramethylbenzidine, tetraethylethylenediamine, tetraethyl-1,3-propanediamine, tetramethyldiethylenetriamine, tetraethyldiethylenetriamine, pentamethyldiethylenetriamine, pentaethyldiethylenetriamine, 1,4-diazabicyclo[2.2.2] octane, 1,5-diazabicyclo[4.3.0]-5-nonene, 1,8-diazabicyclo[5.4.0]-7-undecene, 1,4,8,11-tetramethyl-1,4,8,11-tetraazacyclotetradecane, tetrakis(dimethylamino)ethylene, tetraethyl-2-butene-1,4-diamine, (−)-2,3-dimethoxy-1,4-bis(dimethylamino)butane (DDB), (+)-1-(2-pyrrolidinylmethyl)pyrrolidine, 2,2'-bipyridyl, 4,4'-bipyridyl, 1,10-phenanthroline, hexamethylphosphoramide (HMPA), and hexamethylphosphoric triamide (HMPT).

Especially preferred examples of complexing agents usable in the present invention include aliphatic amines, and of these, an aliphatic diamine is most preferred.

Most preferred examples of aliphatic diamines include tetramethylmethylenediamine (TMMDA), tetraethylmethylenediamine (TEMDA), tetramethylethylenediamine (TMEDA), tetraethylethylenediamine (TEEDA), tetramethyl-1,3-propanediamine (TMPDA), tetraethyl-1,3-propanediamine (TEPDA), tetramethylbutylenediamine (TMBDA), tetraethylbutylenediamine (TEBDA), tetramethylpentanediamine, tetraethylpentanediamine, tetramethyl-1,6-hexanediamine (TMHDA), tetraethyl-1,6-hexanediamine (TEHDA), and 1,4-diazabicyclo[2.2.2] octane (DABCO).

From the commercial point of view, it is most preferred to use an aliphatic diamine represented by formula (VI) shown below, which forms a stable complex in cooperation with an organolithium compound:

$$R^1R^2N(CH_2)_nNR^3R^4 \quad \text{(VI)}$$

wherein each of $R^1$, $R^2$, $R^3$ and $R^4$ independently represents a $C_1–C_{20}$ alkyl group, and n represents an integer of from 1 to 20.

It is preferred that such an aliphatic diamine be a diamine having, between two nitrogen atoms thereof, 1 to 6 carbon atoms, preferably 1 to 3 carbon atoms, most preferably 2 carbon atoms.

Especially preferred examples of complexing agents usable in the present invention include tetramethylethylenediamine (TMEDA) and 1,4-diazabicyclo[2.2.2]octane (DABCO). Of these, tetramethylethylenediamine (TMEDA) is most preferred.

The above-mentioned complexing agents, preferably amines, may be used individually or, if desired, in combination.

From the commercial point of view, it is preferred that the catalyst to be used in the present invention be one which is prepared from an organometallic compound (especially an organolithium compound), containing at least one Group IA metal, selected from the group consisting of methyllithium (MeLi), ethyllithium (EtLi), n-propyllithium (n-PrLi), iso-propyllithium (i-PrLi), n-butyllithium (n-BuLi), sec-butyllithium (s-BuLi), tert-butyllithium (t-BuLi), and cyclohexyllithium, and at least one complexing agent (especially an amine) selected from the group consisting of tetramethylmethylenediamine (TMMDA), tetramethylethylenediamine (TMEDA), tetramethyl-1,3-propanediamine (TMPDA), tetramethyl-1,6-hexanediamine (TMHDA), and 1,4-diazabicyclo[2.2.2]octane (DABCO).

In the present invention, it is most preferred that the catalyst be one which is prepared from an organolithium compound selected from the group consisting of n-butyllithium (n-BuLi), sec-butyllithium (s-BuLi), and tert-butyllithium (t-BuLi), and at least one amine selected from the group consisting of tetramethylethylenediamine (TMEDA) and 1,4-diazabicyclo[2.2.2]octane (DABCO).

In the present invention, there is no particular limitation with respect to the method of synthesizing the complex. The synthesis can be conducted by conventional techniques.

Examples of such conventional techniques include a method comprising dissolving the organometallic compound containing a Group IA metal in an organic solvent in an atmosphere of a dried inert gas, and adding thereto a solution of the complexing agent, and a method comprising dissolving the complexing agent in an organic solvent in an atmosphere of a dried inert gas, and adding thereto a solution of the organometallic compound containing a Group IA metal. Of these methods, a preferable method can be appropriately selected.

With respect to the above-mentioned organic solvent, it is preferred that an organic solvent to be used be appropriately selected depending on the type and amount of the organometallic compound and the type and amount of the complexing agent, and be well deaerated and dried prior to use. Further, it is preferred that such organic solvent be inert to the Group IA metal-containing organometallic compound and the complexing agent.

Preferable examples of organic solvents include aliphatic hydrocarbons, such as butane, n-pentane, n-hexane, n-heptane, n-octane, iso-octane, n-nonane and n-decane; alicyclic hydrocarbons, such as cyclopentane, methylcyclopentane, cyclohexane, methylcyclohexane, ethylcyclohexane, cycloheptane, cyclooctane, decalin, and norbornane; aromatic hydrocarbons, such as benzene, toluene, xylene, ethylbenzene, and cumene; and ethers, such as diethyl ether, tetrahydrofuran, and tetrahydropyran. An appropriate solvent can be selected according to the reaction conditions and the like.

These organic solvents may be used individually or, if desired, in combination.

Preferred examples of organic solvents include aliphatic hydrocarbons, alicyclic hydrocarbons, and aromatic hydrocarbons.

Most preferred organic solvents are aliphatic hydrocarbons, alicyclic hydrocarbons, and a combination of these solvents.

Specific examples of most preferred organic solvents usable in the present invention are at least one organic solvent selected from n-hexane, cyclohexane and methylcyclohexane.

Further, it is preferred that the reaction for obtaining the complex of at least one organometallic compound with at least one complexing agent be conducted at −100° to 100° C. From the commercial point of view, it is preferred that the reaction for obtaining the complex be conducted at −20° C. to 80° C., more preferably from −10° C. to 60° C.

Examples of inert gases include helium, nitrogen and argon. Of these, from the commercial point of view, nitrogen and argon are preferred.

In the present invention, the above-mentioned complex is formed by reacting at least one Group IA metal-containing organometallic compound with at least one complexing agent.

Further, in the present invention, it is preferred that the Group IA metal in the complex be present in the form of an association of 2 to 10 metal atoms, more preferably 2 to 8 metal atoms, still more preferably 2 to 6 metal atoms, most preferably 2 or 4 metal atoms.

In the present invention, the above-mentioned complex may be in the form of a condensation product of a plurality of complexes.

With respect to the above-mentioned complex of at least one Group IA metal-containing organometallic compound with at least one complexing agent, the the structural composition thereof may vary depending on the types of each of the Group IA metal-containing compound, the complexing agent and the monomers to be used. However, for obtaining a stable complex, so as to achieve a high polymerization activity, it is preferred that the complex have the following molar ratio of the Group IA metal contained in the organometallic compound to the complexing agent. The molar ratio is:

generally,
 $A/B=60/1$ to $1/60$,
preferably,
 $A/B=50/1$ to $1/50$,
more preferably,
 $A/B=30/1$ to $1/30$,
still more preferably,
 $A/B=20/1$ to $1/20$,
most preferably,
 $A/B=10/1$ to $1/10$, wherein A is the molar amount of the Group IA metal contained in the organometallic compound, and B is the molar amount of the first complexing agent.

The catalyst satisfying the above-mentioned molar ratio A/B can be advantageously used for producing a polymer or a copolymer in high yield.

When the molar ratio A/B is outside the range as defined above, various disadvantages are likely to be caused in that the production process for the complex becomes costly, and that the complex becomes unstable, so that concurrently with the polymerization reaction, an undesirable side reaction, such as a transfer reaction or an unintended termination of the polymerization, is likely to occur.

Representative examples of polymerization catalysts of the present invention include a catalyst comprising a complex of $A_1$ mol of an organolithium compound selected from the group consisting of methyllithium (MeLi), ethyllithium (EtLi), n-propyllithium (n-PrLi), iso-propyllithium (i-PrLi), n-butyllithium (n-BuLi), sec-butyllithium (s-BuLi), tert-butyllithium (t-BuLi), and cyclohexyllithium, and tert-butyllithium (t-BuLi), with $B_1$ mol of at least one amine selected from the group consisting of tetramethylmethylenediamine (TMMDA), tetramethylethylenediamine (TMEDA), tetramethyl-1,3-propanediamine (TMPDA), tetramethyl-1,6-hexanediamine (TMHDA), and 1,4-diazabicyclo[2.2.2]octane (DABCO), wherein the molar ratio is: (TMEDA) and 1,4-diazabicyclo-(2.2.2]octane (DABCO), wherein the molar ratio is:

generally,
 $A_1/B_1=10/1$ to $1/10$,
preferably,
 $A_1/B_1=8/1$ to $1/8$,
more preferably,
 $A_1/B_1=6/1$ to $1/6$,
most preferably,
 $A_1/B_1=4/1$ to $1/4$.

In the preparation of the above-mentioned complex of at least one Group IA metal-containing organometallic compound with at least one complexing agent, it is preferred to employ the following molar ratio of the Group IA metal contained in the organometallic compound to the complexing agent. The molar ratio is:

generally,
A/B=1000/1 to 1/1000,
preferably,
A/B=100/1 to 1/100,
more preferably,
A/B=60/1 to 1/60,
still more preferably,
A/B=50/1 to 1/50,
further more preferably,
A/B=30/1 to 1/30,
most preferably,
A/B=20/1 to 1/20 wherein A is the molar amount of the Group IA metal contained in the organometallic compound, and B is the molar amount of the first complexing agent.

The catalyst satisfying the above-mentioned molar ratio A/B can be advantageously used not only for producing a polymer or a copolymer in high yield, but also producing a polymer or copolymer having a desired molecular weight, molecular weight distribution and molecular structure.

When the molar ratio A/B is outside the range as defined above, various disadvantages are likely to be caused in that the production process for the complex becomes costly, and that the complex becomes unstable, so that concurrently with the polymerization reaction, an undesirable side reaction, such as a transfer reaction or an unintended termination of the polymerization reaction, is likely to occur.

In the present invention, for example, a preferred form of the complex has a structure which can be represented, for example, by the following formula (VII):

$$[(G)_g \cdot (J)_j]_k \qquad (VII)$$

wherein G represents at least one type of organometallic compound containing a Group IA metal; J represents at least one type of the first complexing agent; and each of g, j and k is an integer of 1 or more.

The complex obtained by any of the above-mentioned methods is thermally unstable. Therefore, by the use of such a catalyst, it has become possible to perform a living anionic polymerization of the cyclic conjugated diene monomer even under relatively high temperature conditions, such as room temperature or more, especially 30° C. or more. Furthermore, by the use of such a catalyst, it has become possible to produce a cyclic conjugated diene polymer having a narrow molecular weight distribution even under relatively high temperature conditions, such as room temperature or more.

Further, when the catalyst of the the present invention is used for producing a cyclic conjugated diene polymer, even if a large amount of the complexing agent is present in the polymerization system, unfavorable side reactions, such as metalation and abstraction of an acidic proton, are not likely to occur, so that it is possible to efficiently produce a cyclic conjugated diene polymer having excellent heat resistance.

The polymerization catalyst of the present invention can be used not only for polymerization of cyclic conjugated diene monomers, but also for polymerization of other monomers which can be polymerized by anionic polymerization.

Examples of other monomers than the cyclic conjugated diene monomers include chain conjugated diene monomers, such as 1,3-butadiene, isoprene, 2,3-dimethyl-1,3-butadiene, 1,3-pentadiene, 1,3-hexadiene and derivatives thereof; vinyl aromatic monomers, such as styrene, α-methylstyrene, o-methylstyrene, p-methylstyrene, p-tert-butylstyrene, 1,3-dimethylstyrene, divinylbenzene, vinylnaphthalene, vinylanthracene, 1,1-diphenylethylene, m-diisopropenylbenzene, vinylpyridine and derivatives thereof; polar vinyl monomers, such as methyl methacrylate, methyl acrylate, acrylonitrile, methyl vinyl ketone, methyl α-cyanoacrylate and derivatives thereof; polar monomers, such as ethylene oxide, propylene oxide, a lactone, a lactam, a cyclic siloxane and derivatives thereof; ethylene and derivatives thereof; and α-olefin monomers and derivatives thereof. The above-mentioned monomers may be used individually or, if desired, in combination.

With respect to the configuration of a polymer obtained using the polymerization catalyst of the present invention, there is no particular limitation, and the configuration of the polymer may be appropriately selected. Examples of polymer configurations include a homopolymer; a block copolymer, such as a diblock, a triblock, a tetrablock, a multiblock, a radial block, an asymmetry radial block, a graft block, a star block or a comb block copolymer, a graft copolymer, a taper copolymer, a random copolymer or an alternating copolymer.

Further, there is no particular limitation with respect to a polymerization method. Examples of polymerization methods include a gaseous phase polymerization, a bulk polymerization, or a solution polymerization. Further, the polymerization reactions can be conducted in various manners, such as a batchwise, a semi-batchwise or a continuous manner.

For performing the polymerization reaction, the polymerization catalyst of the present invention may be used individually or in combination with other types of polymerization catalyst.

For example, for the purpose of improving a flowability or the like of the polymer, the above-mentioned catalyst may be used in combination with a Group IA metal-containing organometallic compound which is not complexed with a complexing agent. Further, if desired, the polymerization catalyst of the present invention may be supported by an inorganic compound, such as silica or a zeolite.

In a further aspect of the present invention, there is provided a preferred method for obtaining the novel cyclic conjugated diene polymer of the present invention.

There is no particular limitation with respect to the method for producing the novel cyclic conjugated diene polymer of the present invention, and any conventional method can be used as long as a polymer satisfying the requirements of the present invention can be obtained. However, a preferable polymerization method for obtaining the cyclic conjugated diene polymer of the present invention consists in using, as a polymerization catalyst, a complex of at least one organometallic compound containing a Group IA metal with at least one complexing agent.

In the preferable polymerization method of the present invention for obtaining the novel cyclic conjugated diene polymer, a complex of an organometallic compound containing a Group IA metal with an amine (a complexing agent), which is the novel polymerization catalyst disclosed in the present invention, is used.

In the most preferable polymerization method of the present invention for obtaining the novel cyclic conjugated diene polymer, a complex of an organolithium compound with an aliphatic diamine, especially, an alphatic tertiary diamine, which is the novel polymerization catalyst disclosed in the present invention, is used.

Further, in the polymerization method of the present invention, it is preferred that the Group IA metal in the complex be present in the form of an association of 2 metal atoms or more, more preferably 2 to 10 metal atoms, still more preferably 2 to 8 metal atoms, still more preferably 2 to 6 metal atoms, most preferably 2 or 4 metal atoms.

The polymerization method of the present invention for producing the cyclic conjugated diene polymer is advantageous in that it has become possible to polymerize or copolymerize a cyclic conjugated diene monomer, which exhibits a large steric hindrance, so that it has been recognized to be difficult to polymerize by conventional techniques, into a homopolymer or copolymer having a high degree of polymerization.

Particularly, in the polymerization method of the present invention, by using a specific complex of a Group IA metal, it becomes possible to suppress the occurrence of unfavorable side reactions at polymer terminals (which side reactions are caused by cyclic conjugated diene monomers themselves), such as a transfer reaction caused by the abstraction of a Group IA metal cation present in the polymer terminal, and a reaction of elimination of lithium hydride, so that it has for the first time become possible to polymerize or copolymerize a cyclic conjugated diene monomer into a homopolymer or copolymer having a high degree of polymerization.

Examples of metals belonging to Group IA of the Periodic Table, which can be used in a polymerization catalyst to be used in the polymerization method of the present invention, include lithium, sodium, potassium, rubidium, cesium, and francium. Of these, lithium, sodium and potassium are preferred, and lithium is most preferred. These metals may be used individually or, if desired, in combination.

Preferable examples of complexes which can be used in the polymerization method of the present invention include complexes of organometallic compounds containing a Group IA metal, such as complexes of an organolithium compound, an organosodium compound, or an organopotassium compound.

The complex which can be most preferably used in the polymerization method of the present invention is the polymerization catalyst of the present invention, i.e., a complex of at least one organometallic compound containing a Group IA metal with at least one complexing agent, wherein the metal belonging to Group IA of the Periodic Table is present in the complex in the form of an association of 2 metal atoms or more.

There is no particular limitation with respect to the type and amount of the complexing agent to be used for forming a complex with an organometallic compound containing a Group IA metal. One or more types of complexing agents can be appropriately selected depending on the reaction conditions, so as for the cation of the Group IA metal of the organometallic compound to be most effectively protected.

From a commercial point of view, preferable examples of complexing agents to be used for forming organometallic compounds containing a Group IA metal include an amine and an ether. Of these, an amine is most preferred.

That is, in the polymerization method of the present invention for producing the cyclic conjugated diene polymer, it is preferred to use a polymerization catalyst comprised of a complex formed from a Group IA metal-containing organometallic compound and an amine, and it is especially preferred to use a polymerization catalyst a complex formed from an organolithium compound and a complexing agent comprising an amine.

Further, in the most preferable polymerization method of the present invention for producing the cyclic conjugated diene polymer, a complex formed from an organolithium compound and an amine, wherein the metal belonging to Group IA of the Periodic Table is present in the complex in the form of an association of 2 metal atoms or more, i.e., the novel polymerization catalyst of the present invention, is used as a polymerization catalyst.

The organolithium compound, which can be preferably used in the polymerization method of the present invention, is a known compound containing at least one lithium atom which is bonded to an organic molecule containing at least one carbon atom or to an organic polymer. Examples of organolithium compounds include methyllithium, ethyllithium, n-propyllithium, iso-propyllithium, n-butyllithium, sec-butyllithium, tert-butyllithium, pentyllithium, hexyllithium, allyllithium, cyclohexyllithium, phenyllithium, hexamethylenedilithium, cyclopentadienyllithium, indenyllithium, butadienyldilithium, and isoprenyldilithium. Further, known oligomeric or polymeric organolithium compounds, each containing a lithium atom in a polymeric molecular chain thereof, such as polybutadienyllithium, polyisoprenyllithium and polystyryllithium, can also be used.

These organolithium compounds may be used individually or, if desired, in combination.

Especially preferable examples of organolithium compounds include methyllithium, ethyllithium, n-butyllithium, sec-butyllithium, tert-butyllithium and cyclohexyllithium.

Further, from a commercial point of view, it is most preferable to use n-butyllithium as the organolithium compound.

Examples of amines, which can be used as the most preferable complexing agent to be used for forming a complex with an organometallic compound containing a Group IA metal, include the same amines as mentioned above in connection with the preparation of the polymerization catalyst of the present invention.

Specifically, examples of such amines include an organic compound or an organic polymer, which contains at least one $R^1R^2N-$ group (wherein each of $R^1$ and $R^2$ independently represents a $C_1-C_{20}$ alkyl group, a $C_5-C_{20}$ aryl group, or a hydrogen atom) which is a polar group having a non-covalent electron pair capable of coordinating with the organometallic compound containing a Group IA metal.

Among these amines, a tert-amine is most preferred.

Preferred examples of tert-amines usable in the present invention include trimethylamine, triethylamine, tri-n-butylamine, quinuclidine, pyridine, 2-methylpyridine, 2,6-dimethylpyridine, dimethylaniline, diethylaniline, tetramethyldiaminomethane (tetramethylmethylenediamine), tetramethylethylenediamine, tetramethyl-1,3-propanediamine(tetramethylpropyrenediamine), tetramethyl-2-butene-1,4-diamine, tetramethyl-1,4-butanediamine (tetramethylbutylenediamine), tetramethyl-1,6-hexanediamine (tetramethylhexanediamine), tetramethyl-1,4-phenylenediamine, tetramethyl-1,8-naphthalenediamine, tetramethylbenzidine, tetraethylethylenediamine, tetraethyl-1,3-propanediamine, tetramethyldiethylenetriamine, tetraethyldiethylenetriamine, pentamethyldiethylenetriamine, pentaethyldiethylenetriamine, 1,4-diazabicyclo[2.2.2]octane, 1,5-diazabicyclo[4.3.0]-5-nonene, 1,8-diazabicyclo[5.4.0]-7-undecene, 1,4,8,11-tetramethyl-1,4,8,11-tetraazacyclotetradecane, tetrakis(dimethylamino)ethylene, tetraethyl-2-butene-1,4-diamine, (−)-2,3-dimethoxy-1,4-bis(dimethylamino)butane (DDB), (+)-1-(2-pyrrolidinylmethyl)pyrrolidine, 2,2'-bipyridyl, 4,4'-bipyridyl, 1,10-phenanthroline, hexamethylphosphoramide (HMPA), and hexamethylphosphoric triamide (HMPT).

Especially preferred examples of complexing agents usable in the present invention include aliphatic amines, and of these, an aliphatic diamine is most preferred.

Most preferred examples of aliphatic diamines include tetramethylmethylenediamine (TMMDA), tetraethylmethylenediamine (TEMDA), tetramethylethylenediamine (TMEDA), tetraethylethylenediamine (TEEDA), tetramethyl-1,3-propanediamine (TMPDA), tetraethyl-1,3-propanediamine (TEPDA), tetramethylbutylenediamine (TMBDA), tetraethylbutylenediamine (TEBDA), tetramethylpentanediamine, tetraethylpentanediamine, tetramethyl-1,6-hexanediamine (TMHDA), tetraethyl-1,6-hexanediamine (TEHDA), and 1,4-diazabicyclo[2.2.2]octane (DABCO).

From the commercial point of view, it is most preferred to use an aliphatic diamine represented by formula (VI) shown below, which forms a stable complex in cooperation with an organolithium compound:

$$R^1R^2N(CH_2)_nNR^3R^4 \qquad (VI)$$

wherein each of $R^1$, $R^2$, $R^3$ and $R^4$ independently represents a $C_1$–$C_{20}$ alkyl group, and n represents an integer of from 1 to 20.

It is preferred that such an aliphatic diamine be a diamine having, between two nitrogen atoms thereof, 1 to 6 carbon atoms, preferably 1 to 3 carbon atoms, most preferably 2 carbon atoms.

Especially preferred examples of complexing agents usable in the present invention include tetramethylethylenediamine (TMEDA) and 1,4-diazabicyclo[2.2.2]octane (DABCO). Of these, tetramethylethylenediamine (TMEDA) is most preferred.

The above-mentioned complexing agents, preferably amines, may be used individually or, if desired, in combination.

From the commercial point of view, it is preferred that the catalyst to be used in the present invention be one which is prepared from an organometallic compound (especially an organolithium compound), containing at least one Group IA metal, selected from the group consisting of methyllithium (MeLi), ethyllithium (EtLi), n-propyllithium (n-PrLi), isopropyllithium (i-PrLi), n-butyllithium (n-BuLi), sec-butyllithium (s-BuLi), tert-butyllithium (t-BuLi), and cyclohexyllithium, and at least one complexing agent (especially an amine) selected from the group consisting of tetramethylmethylenediamine (TMMDA), tetramethylethylenediamine (TMEDA), tetramethyl-1,3-propanediamine (TMPDA), tetramethyl-1,6-hexanediamine (TMHDA), and 1,4-diazabicyclo[2.2.2]octane (DABCO).

In the present invention, it is most preferred that the catalyst be one which is prepared from an organolithium compound selected from the group consisting of n-butyllithium (n-BuLi), sec-butyllithium (s-BuLi), and tert-butyllithium (t-BuLi), and at least one amine selected from the group consisting of tetramethylethylenediamine (TMEDA) and 1,4-diazabicyclo[2.2.2]octane (DABCO).

In the present invention, there is no particular limitation with respect to the method of synthesizing the complex usable in the present invention. The synthesis can be conducted by conventional techniques.

With respect to a method for synthesizing a complex of a Group IA metal-containing organometallic compound with a complexing agent, which complex is most preferred among the polymerization catalysts usable in the polymerization method of the present invention, there is no particular limitation. The synthesis can be conducted by an appropriate conventional technique, which is selected depending on the properties of the organometallic compound and the complexing agent.

Examples of such conventional techniques include a method of dissolving an organometallic compound in an organic solvent in an atmosphere of an inert gas, and adding thereto a solution of a complexing agent in an organic solvent; a method of dissolving a complexing agent in an organic solvent in an atmosphere of an inert gas, and adding thereto a solution of an organometallic compound; and a method of simultaneously adding an organometallic compound and a complexing agent to an organic solvent in an atmosphere of an inert gas.

In the preparation of a complex of a Group IA metal-containing organometallic compound with a complexing agent, which complex is most preferred among the polymerization catalysts usable in the polymerization method of the present invention, it is preferred to employ the following molar ratio of the Group IA metal contained in the organometallic compound to the complexing agent. The molar ratio is generally:
A/B=1000/1 to 1/1000, preferably:
A/B=100/1 to 1/100, wherein A is the molar amount of the Group IA metal contained in the organometallic compound, and B is the molar amount of the complexing agent.

Especially, for obtaining a complex, wherein the metal belonging to Group IA of the Periodic Table is present in the complex in the form of an association of 2 metal atoms or more, the molar ratio is preferably:
A/B=60/1 to 1/60, more preferably:
A/B=50/1 to 1/50, still more preferably:
A/B=30/1 to 1/30, most preferably:
A/B=20/1 to 1/20, wherein A and B are as defined above.

The catalyst satisfying the above-mentioned molar ratio A/B can be advantageously used for producing a polymer or a copolymer in high yield.

When the molar ratio A/B is outside the range as defined above, various disadvantages are likely to be caused in that the production process for the complex becomes costly, and that the complex becomes unstable, so that concurrently with the polymerization reaction, an undesirable side reaction, such as a transfer reaction or a reaction of elimination of a hydride of the Group IA metal is likely to occur.

However, for the purpose of improving a flowability or the like of the polymer, the above-mentioned catalyst may be used in combination with a Group IA metal-containing organometallic compound which is not complexed with a complexing agent.

The polymerization method of the present invention can be conducted in various manner and an appropriate manner can be selected. Examples of such manners include a gaseous phase polymerization, a bulk polymerization and a solution polymerization.

The polymerization reactions can be conducted in various manners, such as a batchwise, a semi-batchwise or a continuous manner.

The reactor for conducting the polymerization can also be appropriately selected according to the properties of the polymer to be obtained, the reaction conditions and the like. Examples of reactors include an autoclave, a coil reactor, a tube reactor, a kneader, and an extruder.

When the polymerization method of the present invention is conducted by solution polymerization, suitable examples of polymerization solvents to be used include aliphatic hydrocarbons, such as butane, n-pentane, n-hexane, n-heptane, n-octane, iso-octane, n-nonane and n-decane; alicyclic hydrocarbons, such as cyclopentane, methylcyclopentane, cyclohexane, methylcyclohexane, ethylcyclohexane, cycloheptane, cyclooctane, decalin, and norbornane; aromatic hydrocarbons, such as benzene, toluene, xylene, ethylbenzene, and cumene; and ethers, such as diethyl ether, tetrahydrofuran, and tetrahydropyran. An appropriate solvent can be selected according to the properties of the polymer to be obtained, the reaction conditions and the like.

These polymerization solvents may be used individually or, if desired, in combination.

Preferred examples of polymerization solvents include aliphatic hydrocarbons, alicyclic hydrocarbons, and aromatic hydrocarbons.

Most preferred polymerization solvents are aliphatic hydrocarbons, alicyclic hydrocarbons, and a combination of these solvents.

Specific examples of most preferred polymerization solvents in the present invention are at least one polymerization solvent selected from n-hexane, cyclohexane and methylcyclohexane.

In the polymerization method of the present invention, the amount of the polymerization catalyst is not specifically limited, and may vary depending on the intended use of the polymer to be produced. However, the polymerization catalyst is generally used in an amount of from $1 \times 10^{-6}$ mol to $5 \times 10^{-1}$ mol, preferably from $5 \times 10^{-6}$ mol to $1 \times 10^{-1}$ mol, in terms of the molar amount of metal atom per mol of the monomer or monomers.

In the polymerization method of the present invention, the polymerization reaction temperature may vary according to the other polymerization reaction conditions. However, the polymerization reaction temperature is generally from $-100°$ to $150°$ C., preferably from $-80°$ to $120°$ C., more preferably from $-30°$ to $110°$ C., and most preferably from $0°$ to $100°$ C.

Further, from a commercial point of view, it is advantageous that the polymerization reaction temperature be from room temperature to $90°$ C., more preferably from $30°$ to $85°$ C., and most preferably from $40°$ to $80°$ C.

In the polymerization method of the present invention, the polymerization reaction time is not specifically limited, and the polymerization reaction time may vary depending on the intended use of the polymer and the other polymerization reaction conditions. However, from a commercial point of view, the polymerization reaction time is generally not longer than 48 hours, more preferably for 0.5 to 24 hours, and most preferably for 1 to 10 hours.

Further, it is preferred that the polymerization reaction be conducted in an atmosphere of an inert gas, such as helium, nitrogen or argon. It is especially preferred to use a highly purified, well dried inert gas containing impurities, such as oxygen and carbon dioxide, in an amount as small as possible.

From a commercial point of view, it is preferred to use highly purified, well dried nitrogen or argon, and it is most preferred to use highly purified and well-dried nitrogen.

With respect to the pressure in the polymerization reaction system, there is no particular limitation, and a widely varied pressure can be chosen as long as the pressure is sufficient to maintain the monomer or monomers and the solvent at a liquid state at a polymerization temperature within the above-mentioned range.

Further, it is preferred that care be taken to prevent the intrusion of impurities, which deactivate a polymerization catalyst or the growing (active) terminals of the polymer being formed, such as water, oxygen and carbon dioxide, into the polymerization reaction system.

The polymerization reaction can be conducted in a conventional manner, namely, in a batchwise, a semi-batchwise or a continuous manner.

In the polymerization method of the present invention for producing a cyclic conjugated diene polymer, it is preferred that a partial or entire amount of each of the components for the catalyst be subjected to a preliminary reaction to each other (and, optionally aging) to synthesize a complex to be used as the polymerization catalyst prior to the initiation of the polymerization reaction.

Particularly, in the polymerization method of the present invention, it is most preferred that the complex be formed prior to the polymerization of the cyclic conjugated diene monomer.

When the complex is formed prior to the polymerization of the cyclic conjugated diene monomer, various advantages are achieved such that occurrence of side reactions is suppressed, that the polymerization activity of the catalyst is improved, and that the polymer obtained has a narrow molecular weight distribution.

In the polymerization method of the present invention for producing the cyclic conjugated diene polymer, the above-mentioned catalysts may be used individually or, if desired, in combination.

In the polymerization method of the present invention for producing the cyclic conjugated diene polymer, when a predetermined polymerization degree has been reached, conventional additives may be added to the polymerization reaction system. Examples of such conventional additives include a terminal modifier, terminal-branching agent, a coupling agent, a polymerization terminator, a polymerization stabilizer, and an antioxidant.

In the polymerization method of the present invention, conventional polymerization stabilizers and antioxidants can be used. For example, phenol type, organic phosphate type, organic phosphite type, amine type and sulfur type polymerization stabilizers and stabilizers, such as a thermal stabilizer, an antioxidant and an ultraviolet absorbing agent, can be used.

Examples of thermal stabilizers, antioxidants and ultraviolet absorbing agents include phenol type, organic phosphate type, organic phosphite type, organic amine type and organosulfur type stabilizers.

The amount of each of the stabilizer and antioxidant to be added is generally from 0.001 to 10 parts by weight per 100 parts by weight of the cyclic conjugated diene polymer.

With respect to the polymerization terminator, any conventional polymerization terminator can be used as long as it can deactivate the polymerization activating species of the polymerization catalyst of the present invention. Preferable examples of polymerization terminators include water, a $C_{10}$–$C_{10}$ alcohol, a ketone, a polyhydric alcohol (such as ethylene glycol, propylene glycol, or glycerol), a phenol, a carboxylic acid, a halogenated hydrocarbon and a halogenated alkylsilane.

With respect to the amount of the polymerization terminator to be added, there is no particular limitation. However, the polymerization terminator is generally used in an amount as small as possible. The polymerization terminator may be added before or simultaneously with the addition of a stabilizer, such as a thermal stabilizer, an antioxidant or an ultraviolet absorber. Alternatively, the active terminals of the polymer may be deactivated by contacting the active terminals with a molecular hydrogen.

In the method of the present invention, for separating and recovering the cyclic conjugated diene polymer from a polymer solution, a conventional technique can be used which is generally used for recovering a conventional polymer from a polymer solution (polymerization reaction mixture).

Examples of such conventional methods include a steam-coagulation method comprising directly contacting a polymerization reaction mixture with steam; a precipitation method comprising adding a poor solvent for a polymer to a polymerization reaction mixture, thereby precipitating the polymer; a method comprising heating a polymerization reaction mixture in a polymerization reactor, thereby distilling off the solvent; a method comprising contacting a polymerization reaction mixture with a heating roll, thereby distilling off the solvent; a method comprising extruding a polymerization reaction mixture using an extruder having a vent, while distilling off a solvent through the vent, thereby obtaining a pelletized polymer; and a method comprising placing a polymerization reaction mixture into hot water and, then, extruding the resultant mixture using an extruder having a vent, while distilling off a solvent and water through the vent, thereby obtaining a pelletized polymer. A most appropriate method can be selected depending on the properties of the cyclic conjugated diene polymer to be obtained and the solvent used.

With respect to the method of the present invention, the polymerization reaction may optionally be followed by at least one reaction selected from hydrogenation, halogenation, hydrohalogenation, alkylation and arylation, wherein the carbon-to-carbon double bond contained in the molecular structure of the cyclic conjugated diene monomer unit should not be saturated.

The above-mentioned optional reactions can be performed in the absence or presence of a conventional catalyst.

For example, when the method of the present invention comprises the two steps of the polymerization reaction and a subsequent hydrogenation reaction, the polymerization reaction is first performed to synthesize a copolymer comprising at least one monomer unit selected from the class consisting of cyclic conjugated diene monomer units and a monomer unit derived from at least one comonomer copolymerizable with the cyclic conjugated diene monomer, and subsequently, a hydrogenation reaction of the obtained copolymer is performed in the presence of a hydrogenation catalyst to selectively hydrogenate a part or all of the carbon-to-carbon double bonds in the monomer unit derived from at least one comonomer copolymerizable with the cyclic conjugated diene monomer, thereby obtaining a selectively hydrogenated, cyclic conjugated diene copolymer.

A specific example of methods for producing such a selectively hydrogenated, cyclic conjugated diene copolymer is as follows. A polymerization reaction for obtaining a copolymer comprising at least one monomer unit selected from the class consisting of cyclic conjugated diene monomer units and a monomer unit derived from at least one comonomer copolymerizable with the cyclic conjugated diene monomer is conducted, and after a predetermined (intended) polymerization degree has been reached, the polymerization reaction is terminated. Then, a hydrogenation catalyst is added to a reactor containing the obtained cyclic conjugated diene copolymer, and hydrogen gas is introduced to the reactor thereby effecting a hydrogenation reaction on a monomer unit other than the cyclic conjugated diene monomer unit to thereby obtain a selectively hydrogenated, cyclic conjugated diene copolymer.

More specifically, there can be mentioned a method in which the polymerization reaction is terminated by a conventional method, and then a hydrogenation catalyst is added to and hydrogen gas is introduced to the same reactor as used in the polymerization reaction, thereby producing a selectively hydrogenated, cyclic conjugated diene copolymer in a batchwise manner.

There can also be mentioned a method in which the polymerization reaction is terminated by a conventional method, the reaction mixture is transferred to another reactor, and a hydrogenation catalyst is added to and hydrogen gas is introduced to the reactor containing the reaction mixture, thereby producing a selectively hydrogenated, cyclic conjugated diene copolymer in a semi-batchwise manner.

Further, a selectively hydrogenated, cyclic conjugated diene copolymer may be produced in a continuous manner by performing the polymerization reaction and hydrogenation reaction continuously in a tube type reactor.

An appropriate method can be selected from these methods according to the objective and needs.

When the method of the present invention includes a hydrogenation reaction, the hydrogenation reaction is performed in an atmosphere of hydrogen, preferably in the presence of a hydrogenation catalyst.

In the present invention, the hydrogenation reaction is generally conducted by a method in which a polymer solution is maintained at a predetermined temperature in an atmosphere of hydrogen gas or an inert gas, and a hydrogenation catalyst is added to the polymer solution while agitating or not agitating. After maintaining the solution at a reaction temperature, hydrogen gas is introduced into the reaction system until a predetermined level of pressure is reached.

The hydrogenation reaction can be conducted in a conventional manner, namely, in a batchwise, a semi-batchwise or a continuous manner. These manners can be employed individually or in combination.

The type and amount of the hydrogenation catalyst to be used in the present invention are not particularly limited as long as the catalyst used can provide a desired degree of hydrogenation of a monomer unit derived from at least one comonomer copolymerizable with the cyclic conjugated diene monomer. However, practically, the hydrogenation catalyst to be used in the present invention can be selected from a homogeneous catalyst (e.g., an organometallic compound, an organometallic complex) and a heterogeneous catalyst (e.g., a solid catalyst, a catalyst supported by a carrier) each of which contains at least one member selected from the group consisting of metals belonging to Groups IV A to VIII of the Periodic Table and rare earth metals.

A most preferred hydrogenation catalyst in the present invention is a homogeneous hydrogenation catalyst, i.e., an organometallic compound or complex which contains at least one member selected from the group consisting of Group IV A to VIII metals and rare earth metals, or a carrier-supported catalyst containing a Group VIII metal (a solid catalyst).

These organometallic compounds or complexes as homogeneous hydrogenation catalysts can be supported by an inorganic or organic compound, such as silica, a zeolite or a crosslinked polystyrene.

Examples of metals contained in the hydrogenation catalyst to be used in the present invention include titanium, zirconium, hafnium, chromium, molybdenum, tungsten, manganese, rhenium, iron, cobalt, nickel, ruthenium, rhodium, palladium, osmium, iridium, platinum, lanthanum, cerium, praseodymium, neodymium, promethium, samarium, europium, gadolinium, terbium, dysprosium, holmium, erbium, thulium, ytterbium and lutetium. Among these, titanium, zirconium, hafnium, rhenium, cobalt, nickel, ruthenium, rhodium, palladium, cerium, neodymium, samarium, europium, gadolinium and ytterbium are preferred.

From a commercial point of view, titanium, cobalt, nickel, ruthenium, rhodium and palladium are especially preferred.

In the present invention, titanium, cobalt and ruthenium are commercially most preferred.

In order for organometallic compounds or complexes, which contain the above-mentioned metals, to be soluble in a solvent used, it is requisite that a ligand, such as hydrogen, a halogen, a nitrogen compound or an organic compound, be coordinated with or bonded to such metals. These ligands can be used individually or in combination. When these ligands are used in combination, it is preferred that an appropriate combination of ligands be selected so that the resultant organometallic compound or complex becomes soluble in the solvent used.

Examples of ligands include hydrogen; fluorine; chlorine; bromine; nitrogen monoxide; carbon monoxide; an organic compound containing a functional group, such as a hydroxyl group, an ether group, an amine group, a thiol group, a phosphine group, a carbonyl group, an olefin group or a diene group, or a non-polar organic compound containing no functional group.

Examples of organic ligands include aldehydes, such as salicylaldehyde, 2-hydroxy-1-naphthalaldehyde and 2-hydroxy-3-naphthalaldehyde; hydroxyphenones, such as 2'-hydroxyacetophenone, 2'-hydroxybutyrophenone and 2'-hydroxypropiophenone; diketones, such as acetylacetone, benzoylacetone, propionylacetone, isobutylacetone, valerylacetone and ethylacetylacetone; carboxylic acids, such as isovaleric acid, caprylic acid, octanoic acid, lauric acid, myristic acid, palmitic acid, stearic acid, isostearic acid, oleic acid, linoleic acid, cyclopentanecarboxylic acid, naphthenic acid, ethylhexanoic acid, pivalic acid, Versatic acid (synthetic acid comprising a mixture of isonomers of C10 monocarboxylic acid manufactured and sold by Shell Chemical Co.), phenylacetic acid, benzoic acid, 2-naphthoic acid, maleic acid, succinic acid, hexanethiol acid, 2,2-dimethylbutane thionic acid, decane thionic acid and thiobenzoic acid; organic phosphoric acids, such as dibutyl phosphate, dipentyl phosphate, dihexyl phosphate, diheptyl phosphate, dioctyl phosphate, bis(2-ethylhexyl)phosphate, bis(1-methylheptyl)phosphate, dilauryl phosphate, dioleyl phosphate, diphenyl phosphate, bis(p-nonylphenyl) phosphate, bis[poly(ethylene glycol)-p-nonylphenyl] phosphate, (butyl)(2-ethylhexyl)-phosphate, (1-methylheptyl)(2-ethylhexyl)phosphate, (2-ethylhexyl)(p-nonylphenyl)phosphate, monobutyl 2-ethylhexylphosphonate, mono-2-ethylhexyl 2-ethylhexylphosphonate, mono-2-ethylhexyl phenylphosphonate, mono-p-nonylphenyl 2-ethylhexyl phosphonate, mono-2-ethylhexyl phosphonate, mono-1-methylheptyl phosphonate, mono-p-nonylphenyl phosphonate, dibutyl phosphinic acid, bis(2-ethylhexyl) phosphenic acid, bis(1-methylheptyl)phosphinic acid, dilauryl phosphinic acid, dioleyl phosphinic acid, diphenyl phosphinic acid, bis(p-nonylphenyl)phosphinic acid, butyl(2-ethylhexyl)phosphinic acid, (2-ethylhexyl)(1-methylheptyl) phosphinic acid, (2-ethylhexyl)(p-nonylphenyl)phosphinic acid, butyl phosphinic acid, 2-ethylhexyl phosphinic acid, 1-methylheptyl phosphinic acid, oleyl phosphinic acid, lauryl phosphinic acid, phenyl phosphinic acid, and p-nonylphenyl phosphinic acid; alcohols, phenols and thiols, such as ethyl alcohol, n-propyl alcohol, iso-propyl alcohol, tertbutyl alcohol, tert-amyl alcohol, n-hexyl alcohol, cyclohexyl alcohol, allyl alcohol, 2-butenyl alcohol, 3-hexenyl alcohol, 2,5-decadienyl alcohol, benzyl alcohol, phenol, catechol, 1-naphthol, 2-naphthol, 2,6-di-tert-butylphenol, 2,6-di-tert-butyl-4-methylphenol, 2,4,6-tri-tert-butylphenol, 4-phenylphenol, ethanethiol, 1-butanethiol, 2-pentanethiol, 2-iso-butanethiol, thiophenol, 2-naphthalenethiol, cyclohexanethiol, 3-methyl cyclohexanethiol, benzene methanethiol, and 2-naphthalene methanethiol; tetrahydrofuran, diethyl ether, dimethyl sulfoxide, pyridine, ethylene diamine, dimethyl formamide, triphenyl phosphine, a cyclopentadienyl group, a substituted cyclopentadienyl group, an indenyl group, a fluorenyl group, a n-allyl group, a substituted allyl group, a cyclooctadienyl group, a methyl group, an ethyl group, a butyl group, a phenyl group and a tolyl group.

These ligands can be used individually or in combination. When these ligands are used in combination, it is especially preferred that an appropriate combination of ligands be selected so that the resultant organometallic compound or complex becomes soluble in the solvent used.

Various types of hydrogenation catalysts can be used individually or, if desired, in combination.

Further, from a commercial point of view, it is most preferred that, as a hydrogenation catalyst, use is made of a combination of an organometallic compound or complex which contains at least one member selected from the group consisting of Group IV A to VIII metals and rare earth metals, and at least one organometallic compound containing a metal selected from the group consisting of Group IA to IIA metals and Group IIIB metals, such as alkyllithium, alkylmagnesium, and alkylaluminum.

Specific examples of organometallic compound containing a metal selected from the group consisting of Group IA to IIA metals and Group IIIB metals include an alkyllithium, such as methyllithium, ethyllithium, n-propyllithium, isopropyllithium, n-butyllithium, sec-butyllithium, tert-butyllithium, pentyllithium, hexyllithium, phenyllithium, or cyclopentadienyllithium, indenyllithium, butadienyldilithium; an alkylmagnesium, such as dimethylmagnesium, diethylmagnesium or dibutylmagnesium; and alkylaluminum, such as trimethylaluminum, triethylaluminum, triisopropylaluminum, tri-n-butylaluminum, triisobutylaluminum, trihexylaluminum, tricyclohexylaluminum, diethylaluminum hydride, diisobutylaluminum hydride, methylaluminoxane or ethylaluminoxane. These organometallic compounds can be used individually or in combination.

When the hydrogenation catalyst is a solid catalyst, the above-mentioned metals can be used as they are. However, generally, it is preferred that the metals to be used as a catalyst are in a state in which they are supported by a carrier such as carbon, alumina, silica or barium sulfate.

Preferred examples of solid catalysts include carrier-supported catalysts containing at least one metal selected from rhenium, iron, cobalt, nickel, ruthenium, rhodium, palladium and platinum. Especially preferred examples of solid catalysts include carrier-supported catalysts containing at least one metal selected from ruthenium, rhodium and palladium.

These catalysts can be used individually or in combination.

When the cyclic conjugated diene polymer obtained by the method of the present invention is a selectively hydrogenated, cyclic conjugated diene copolymer, the amount of hydrogenation catalyst to be used for a hydrogenation reaction can be appropriately determined depending on the type (e.g., a structure of the main chain and molecular weight) of the copolymer to be hydrogenated, or the hydrogenation reaction conditions (e.g., solvent, temperature, concentration, and viscosity of the solution). However, the amount of the hydrogenation catalyst is generally within the range of from 0.1 to 100,000 ppm, preferably from 1 to 50,000 ppm, more preferably from 5 to 10,000 ppm, and most preferably from 10 to 10,000 ppm, in terms of the concentration of metal atoms, based on the amount of the polymer to be hydrogenated.

When the amount of the hydrogenation catalyst is extremely small, a satisfactory rate of hydrogenation reaction cannot be obtained. When the amount of the hydrogenation catalyst is too large, the rate of hydrogenation reaction becomes high, but the use of too large an amount of the hydrogenation catalyst is disadvantageous from an economical point of view. In addition, when the amount of the hydrogenation catalyst is too large, the separation and recovery of the hydrogenation catalyst become difficult, leading to undesirable results, for example, adverse effects of the residual catalyst on the polymer.

In the method of the present invention, it is preferred that a solvent to be used for the hydrogenation reaction be inert to the hydrogenation catalyst and capable of well dissolving therein the polymer to be hydrogenated.

Examples of solvents to be used in the hydrogenation reaction include aliphatic hydrocarbons, such as n-pentane, n-hexane, n-heptane, n-octane, iso-octane, n-nonane and n-decane; alicyclic hydrocarbons, such as cyclopentane, methylcyclopentane, cyclohexane, methylcyclohexane, cycloheptane, cyclooctane, decalin, and norbornane; aromatic hydrocarbons, such as benzene, toluene, xylene, ethylbenzene and cumene; ethers, such as diethyl ether, diglyme, triglyme, tetrahydrofuran and tetrahydropyran; and hydrocarbon halogenides, such as methylene chloride, dichloroethane, chlorobenzene, dichlorobenzene and trichlorobenzene. These solvents may be used individually or in combination. Suitable solvents can be appropriately selected, depending on the properties of the copolymer to be hydrogenated or the hydrogenation reaction conditions.

From a commercial point of view, it is preferred to choose solvents to be used for the hydrogenation reaction from aliphatic hydrocarbons, alicyclic hydrocarbons, and aromatic hydrocarbons. Most preferred solvents are aliphatic hydrocarbons, alicyclic hydrocarbons, and a mixture of these solvents.

In the present invention, from a commercial point of view, it is advantageous that the polymerization reaction and the hydrogenation reaction be consecutively conducted. Therefore, it is preferred that the solvent to be used for the hydrogenation reaction be the same as the solvent used for the polymerization reaction.

In the present invention, there is no particular limitation with respect to the concentration of a polymer solution to be subjected to hydrogenation reaction. However, the polymer concentration of the polymer solution is preferably from 1 to 90 wt %, more preferably from 2 to 60 wt %, most preferably from 3 to 40 wt %.

When the polymer concentration of the polymer solution is lower than the above-mentioned range, the operation for hydrogenation reaction becomes inefficient and disadvantageous from an economic point of view. On the other hand, when the concentration of the polymer solution is higher than the above-mentioned range, the viscosity of the polymer solution becomes high, leading to a lowering of the reaction rate.

In the present invention, the reaction temperature for hydrogenation can be appropriately selected, but is generally from −78° to 500° C., preferably from −10° to 300° C., and more preferably from 20° to 250° C.

When the reaction temperature is lower than the above-mentioned range, a satisfactorily high reaction rate cannot be achieved. On the other hand, when the reaction temperature is higher than the above-mentioned range, disadvantages are likely to be caused such that not only is the hydrogenation catalyst deactivated, but also the polymer is deteriorated.

The pressure of the hydrogenation reaction system is generally from 0.1 to 500 kg/cm$^2$G, preferably from 1 to 400 kg/cm$^2$G, more preferably from 2 to 300 kg/cm$^2$G.

When the pressure of the hydrogenation reaction system is lower than the above-mentioned range, a satisfactorily high reaction rate cannot be achieved. When the pressure is higher than the above-mentioned range, the reaction rate becomes high, but an expensive pressure-resistant reaction apparatus is required, which is economically disadvantageous. Further, such a high pressure may cause a hydrocracking of the polymer during the hydrogenation reaction.

The reaction time for hydrogenation is not particularly limited, and may vary depending on the type and amount of the hydrogenation catalyst, the concentration of the polymer solution, and the temperature and pressure of the reaction system. However, the reaction time for hydrogenation is generally from 5 minutes to 240 hours, preferably from 10 minutes to 100 hours, and more preferably from 30 minutes to 48 hours.

If desired, after completion of the hydrogenation reaction, the hydrogenation catalyst can be recovered from the resultant hydrogenation reaction mixture by a conventional method, such as adsorption-separation of the catalyst by means of an adsorbent, sedimentation separation, filtration separation, or removal of the catalyst by washing with water or a lower alcohol in the presence of an organic acid and/or an inorganic acid.

The separation and recovery of the selectively hydrogenated, cyclic conjugated diene copolymer of the present invention from the hydrogenation reaction mixture can be conducted by a conventional method which is generally used for recovering a conventional polymer from a polymerization reaction mixture.

Examples of such conventional methods include a steam-coagulation method comprising directly contacting a polymerization reaction mixture with steam; a precipitation method comprising adding a poor solvent for a polymer to a polymerization reaction mixture, thereby precipitating the polymer; a method comprising heating a polymerization reaction mixture in a polymerization reactor, thereby distilling off the solvent; a method comprising contacting a polymerization reaction mixture with a heating roll, thereby distilling off the solvent; a method comprising extruding a polymerization reaction mixture using an extruder having a vent, while distilling off a solvent through the vent, thereby obtaining a pelletized polymer; and a method comprising placing a polymerization reaction mixture into hot water and, then, extruding the resultant mixture using an extruder having a vent, while distilling off a solvent and water through the vent, thereby obtaining a pelletized polymer. A most appropriate method can be selected depending on the properties of the cyclic conjugated diene copolymer to be hydrogenated and the solvent used.

If desired, depending on the intended use of the final polymer, additives, reinforcing agents and the like, which are used in conventional polymer materials, may be incorporated into the cyclic conjugated diene polymer of the present invention. Examples of such additives and reinforcing agents include stabilizers such as a thermal stabilizer, an antioxidant, and an ultraviolet absorbing agent, a lubricant, a nucleator, a plasticizer, a coloring agent, a pigment, a crosslinking agent, a foaming agent, an antistatic agent, an anti-slip agent, an antiblocking agent, a mold-release agent, a modifier, an organic reinforcing material and an inorganic reinforcing material (e.g., a glass filler, mineral fiber, and an inorganic filler).

With respect to the stabilizers, such as thermal stabilizer, an antioxidant, and an ultraviolet absorbing agent, conventional stabilizers may be employed as they are.

Examples of thermal stabilizers, antioxidants and ultraviolet absorbing agents include phenol type, organic phosphate type, organic phosphite type, organic amine type and organosulfur type stabilizers.

The amount of each of the stabilizers, such as a thermal stabilizer, an antioxidant and an ultraviolet absorbing agent, is generally from 0.001 to 10 wt %, based on the weight of the cyclic conjugated diene polymer.

The cyclic conjugated diene polymer of the present invention can be used as an excellent industrial material (e.g., a structural material or a functional material). Specifically, the cyclic conjugated diene polymer of the present invention is useful as a high-performance plastic, a plastic having a wide variety of uses, a special elastomer, a thermoplastic elastomer, an elastic fiber, a sheet, a film, a tube, a hose, an optical material, an adhesive, a sealer, a paint a coating agent, an insulating agent, a lubricant, a separation membrane, a selective-permeation membrane, a porous membrane, a functional membrane, a vibration-proof material, a noise-proof material, a damping material, a noise insulation material, a functional film (e.g., an electrically conductive film, a photosensitive film), functional beads (e.g., a molecular sieve, a polymer catalyst, a substrate for supporting a polymer catalyst), automobile parts, electric parts, aerospace parts, railroad parts, marine parts, electronic parts, battery parts, parts associated with electronics, parts associated with multi-media, a plastic material for batteries, solar battery parts, a functional fiber, a functional sheet, machine parts, medical equipment parts, a packaging material for drugs, an encapsuling material for sustained release, a substrate material for a pharmacological substance, a substrate material for a printed circuit, a container for food, a general packaging material, clothes, a material for sports and leisure equipment, a material for general sundries, a material for a tire, a material for a belt, a modifier for other resins, and the like. If desired, a crosslinking agent may be added to the cyclic conjugated diene polymer of the present invention to provide a hardening resin, such as a thermo-hardening resin, an ultraviolet-hardening resin, an electron radiation-hardening resin, or the like.

BEST MODE FOR CARRYING OUT THE INVENTION

Hereinbelow, the present invention will be described in more detail with reference to the following Examples and Comparative Examples, but they should not be construed as limiting the scope of the present invention.

In the Examples and Comparative Examples, with respect to chemicals, those which have highest purity among the commercially available ones were used. With respect to solvents, commercially available solvents were treated by a conventional method before use. That is, the solvents were degassed, dehydrated under reflux over an activated metal in an atmosphere of an inert gas, and purified by distillation.

With respect to measurement of the number average molecular weight ($\overline{Mn}$) and molecular weight distribution ($\overline{Mw}/\overline{Mn}$ ratio, wherein $\overline{Mw}$ is the weight average molecular weight) of a polymer, the measurement was conducted by gel permeation chromatography (GPC), using a liquid chromatograph (HLC-8080) manufactured and sold by Tosoh Corp. Japan, and a column (Showdex: K805+K804+K802) manufactured and sold by Showa Denko K.K., Japan. The number average molecular weight and $\overline{Mw}/\overline{Mn}$ ratio were obtained, using a calibration curve obtained with respect to a standard polystyrene.

The polymer chain structure of a polymer was analyzed using an NMR measuring device (JEOL α-400) manufactured and sold by JEOL LTD, Japan. The measurement frequencies were 400 MHz($^1$H) and 100 MHz ($^{13}$C).

The chemical shift of a polymerization catalyst (a complex) was measured using an NMR measuring device (JEOL α-400: manufactured and sold by JEOL LTD, Japan), and an X-ray diffraction device (RAD-B System; manufactured and sold by Rigaku Denki Co., Ltd., Japan).

In the measurement using the NMR measuring device, the frequencies for measurement were 400 MHz ($^1$H), 100 MHz ($^{13}$C), 155 MHz ($^7$Li) and 58.7 MHz ($^6$Li). The chemical shifts of $^7$Li and $^6$Li were measured on the assumption that a peak ascribed to 1M solution of LiCl in $D_2O$ corresponds to 0 ppm.

In the measurement using the X-ray diffraction device, the following conditions were employed.

Tube voltage: 50 kV

Tube current: 160 mA

Optical system: Convergence optical system

Diverging slit: 1°

Scattering slit: 1°

Receiving slit: 0.15 mm

Scan speed: 4°/min

The glass transition temperature (Tg) of a polymer was measured by the DSC (differential scanning calorimeter) method, using DSC200 manufactured and sold by Seiko Instruments Inc., Japan.

The viscoelastic behavior of a polymer was measured, using a dynamic viscoelasticity measuring device (938 DMA; manufactured and sold by DuPont Instrument).

The softening temperature of a polymer was measured using TMA 100 (manufactured and sold by Seiko Instruments, Inc., Japan) in which a 100 μm needle was used under a load of 50 g.

The conversion (mol %) of monomers in a polymerization reaction was calculated by the internal standard method from an absolute amount of monomers remaining in the polymerization reaction mixture using a gas chromatograph (GC14A) manufactured and sold by Shimadzu Corporation, Japan. Ethylbenzene was used as an internal standard substance.

Mechanical properties and thermal properties of a polymer were measured in accordance with the following methods.

(1) Tensile test (⅛ inch):

The tensile strength (TS) and the tensile elongation (TE) of a ⅛-inch thick specimen of a polymer were measured in accordance with ASTM D638.

(2) Flexural test (⅛ inch):

The flexural strength (FS) and the flexural modulus (FM) of a ⅛-inch thick specimen of a polymer were measured in accordance with ASTM D790.

(3) Izod impact test:

The Izod impact strength of a polymer was measured in accordance with ASTM D256 (at room temperature).

47

(4) Heat distortion temperature (HDT: °C.):

The heat distortion temperature of a polymer was measured under a load of 1.82 MPa (high load) and under a load of 0.46 MPa (low load) in accordance with ASTM D648.

(5) Surface hardness:

JIS A hardness of a specimen of a polymer was measured at 25° C. as the surface hardness of the polymer.

In the above measurements, the following is to be noted.

1 MPa=10.20 kg·f/cm$^2$;

and

1 J/m=0.102 kg·cm/cm).

In the following Examples and Comparative Examples, for example, a polycyclohexadiene-polyisoprene diblock copolymer is shown simply as a "CHD-Ip diblock copolymer". Other block copolymers are also likewise shown.

EXAMPLE 1

(Preparation of complex No. 1 as a polymerization catalyst of the present invention)

In an atmosphere of dried argon gas, a predetermined amount of N,N,N',N'-tetramethylethylenediamine (TMEDA) was dissolved in cyclohexane, to thereby obtain a 1.0M solution of TMEDA in cyclohexane.

Subsequently, the obtained cyclohexane solution of TMEDA was cooled to and maintained at −10° C. Then, in the atmosphere of dried argon gas, an n-hexane solution of n-butyllithium (n-BuLi) was gradually added to the cyclohexane solution of TMEDA in an amount such as would provide a Li (in n-BuLi)/TMEDA molar ratio of 4/1.

It was observed that, upon addition of the n-hexane solution of n-BuLi to the cyclohexane solution of TMEDA, a complex of n-BuLi with TMEDA was quickly formed.

The resultant mixture containing the complex of n-BuLi with TMEDA was heated to 70° C., thereby dissolving the complex, and then gradually cooled to −78° C. As a result, the complex was precipitated.

Subsequently, in an atmosphere of dried argon gas, the precipitated complex was separated by filtration. The separated complex was washed with cyclohexane several times, thereby obtaining complex No. 1.

The molar ratio of Li (in n-BuLi)/TMEDA in the complex No. 1 was 4/1 as measured by $^1$H-NMR.

EXAMPLE 2

(Preparation of complex No. 2 as a polymerization catalyst of the present invention)

In an atmosphere of dried argon gas, a predetermined amount of TMEDA was dissolved in cyclohexane, to thereby obtain a 1.0M solution of TMEDA in cyclohexane.

Subsequently, the obtained cyclohexane solution of TMEDA was cooled to and maintained at −10° C. Then, in the atmosphere of dried argon gas, an n-hexane solution of n-BuLi was gradually added to the cyclohexane solution of TMEDA in an amount such as would provide a Li (in n-BuLi)/TMEDA molar ratio of 4/2.

It was observed that, upon addition of the n-hexane solution of n-BuLi to the cyclohexane solution of TMEDA, a complex of n-BuLi with TMEDA was quickly formed.

The resultant mixture containing the complex of n-BuLi with TMEDA was heated to 70° C., thereby dissolving the complex, and then gradually cooled to −78° C. As a result, the complex was precipitated.

48

Subsequently, in an atmosphere of dried argon gas, the precipitated complex was separated by filtration. The separated complex was washed with cyclohexane several times, thereby obtaining complex No. 2.

The molar ratio of Li (in n-BuLi)/TMEDA in the complex No. 2 was 4/2 as measured by $^1$H-NMR.

EXAMPLE 3

(Preparation of complex No. 3 as a polymerization catalyst of the present invention)

In an atmosphere of dried argon gas, a predetermined amount of TMEDA was dissolved in cyclohexane, to thereby obtain a 1.0M solution of TMEDA in cyclohexane.

Subsequently, the obtained cyclohexane solution of TMEDA was cooled to and maintained at −10° C. Then, in the atmosphere of dried argon gas, an n-hexane solution of n-BuLi was gradually added to the cyclohexane solution of TMEDA in an amount such as would provide a Li (in n-BuLi)/TMEDA molar ratio of 2/2.

It was observed that, upon addition of the n-hexane solution of n-BuLi to the cyclohexane solution of TMEDA, a complex of n-BuLi with TMEDA was quickly formed.

The resultant mixture containing the complex of n-BuLi with TMEDA was heated to 70° C., thereby dissolving the complex, and then gradually cooled to −78° C. As a result, the complex was precipitated.

Subsequently, in an atmosphere of dried argon gas, the precipitated complex was separated by filtration. The separated complex was washed with cyclohexane several times, thereby obtaining complex No. 3.

The molar ratio of Li (in n-BuLi)/TMEDA in the complex No. 3 was 2/2 as measured by $^1$H-NMR.

EXAMPLE 4

A well dried 100 ml Schlenk tube was purged with dried argon gas by a conventional method. 27.0 g of cyclohexane was charged in the Schlenk tube. While maintaining the temperature of the cyclohexane at room temperature, complex No. 1 [Li (in n-BuLi)/TMEDA molar ratio: 4/1], which was obtained in Example 1, was added to and dissolved in the cyclohexane in an amount of 0.075 mmol in terms of the amount of lithium atom. The resultant mixture was heated to and maintained at 30° C.

Subsequently, 3.0 g of 1,3-cyclohexadiene (1,3-CHD) was added to the above mixture and, in an atmosphere of dried argon gas, a polymerization reaction was conducted at 30° C. for 6 hours.

After that period of time, a 10 wt % solution of BHT [2,6-bis(tert-butyl)-4-methylphenol] in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a cyclohexadiene (CHD) homopolymer in a yield of 98.7 wt %.

With respect to the obtained CHD homopolymer, the number average molecular weight was 41,700. The $\overline{Mw}/\overline{Mn}$ ratio (which is used as a criterion for molecular weight distribution) was 1.41.

EXAMPLE 5

A well dried 100 ml Schlenk tube was purged with dried argon gas by a conventional method. 27.0 g of cyclohexane was charged in the Schlenk tube. While maintaining the temperature of the cyclohexane at room temperature, complex No. 2 [Li (in n-BuLi)/TMEDA molar ratio: 4/2], which was obtained in Example 2, was added to and dissolved in the cyclohexane in an amount of 0.075 mmol in terms of the amount of lithium atom. The resultant mixture was heated to and maintained at 30° C.

Subsequently, 3.0 g of 1,3-cyclohexadiene 1,3-CHD was added to the above mixture and, in an atmosphere of dried argon gas, a polymerization reaction was conducted at 30° C. for 6 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a CHD homopolymer in a yield of 99.6 wt %.

With respect to the obtained CHD homopolymer, the number average molecular weight was 40,900. The $\overline{Mw}/\overline{Mn}$ ratio (which is used as a criterion for molecular weight distribution) was 1.35.

EXAMPLE 6

A well dried 100 ml Schlenk tube was purged with dried argon gas by a conventional method. 27.0 g of cyclohexane was charged in the Schlenk tube. While maintaining the temperature of the cyclohexane at room temperature, complex No. 3 [Li (in n-BuLi)/TMEDA molar ratio: 2/2], which was obtained in Example 3, was added to and dissolved in the cyclohexane in an amount of 0.075 mmol in terms of the amount of lithium atom. The resultant mixture was heated to and maintained at 30° C.

Subsequently, 3.0 g of 1,3-CHD was added to the above mixture and, in an atmosphere of dried argon gas, a polymerization reaction was conducted at 30° C. for 6 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a CHD homopolymer in a yield of 98.2 wt %.

With respect to the obtained CHD homopolymer, the number average molecular weight was 41,300. The $\overline{Mw}/\overline{Mn}$ ratio (which is used as a criterion for molecular weight distribution) was 1.39.

EXAMPLE 7

A well dried 100 ml Schlenk tube was purged with dried argon gas by a conventional method. 27.0 g of cyclohexane was charged in the Schlenk tube. While maintaining the temperature of the cyclohexane at room temperature, 0.0375 mmol of TMEDA and 0.075 mmol of n-BuLi were added to the cyclohexane. The resultant mixture was agitated at 60° C. for 10 minutes, and maintained at room temperature.

3.0 g of 1,3-CHD was added to the above mixture and, in an atmosphere of dried argon gas, a polymerization reaction was conducted at room temperature for 7 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a CHD homopolymer in a yield of 99.0 wt %.

With respect to the obtained CHD homopolymer, the number average molecular weight was 40,600. The $\overline{Mw}/\overline{Mn}$ ratio (which is used as a criterion for molecular weight distribution) was 1.28.

EXAMPLE 8

Substantially the same procedure as in Example 7 was repeated, except that TMEDA was changed to N,N,N',N'-tetramethylmethylenediamine (TMMDA), thereby obtaining a white mass of a CHD homopolymer in a yield of 97.8 wt %.

The number average molecular weight of the obtained CHD homopolymer was 42,300. The $\overline{Mw}/\overline{Mn}$ ratio (criterion for molecular weight distribution) was 1.34.

EXAMPLE 9

Substantially the same procedure as in Example 7 was repeated, except that TMEDA was changed to N,N,N',N'-tetramethyl-1,3-propanediamine (TMPDA), thereby obtaining a white mass of a CHD homopolymer in a yield of 96.5 wt %.

The number average molecular weight of the obtained CHD homopolymer was 41,900. The $\overline{Mw}/\overline{Mn}$ ratio (criterion for molecular weight distribution) was 1.43.

EXAMPLE 10

Substantially the same procedure as in Example 7 was repeated, except that TMEDA was changed to N,N,N',N'-tetramethyl-1,6-hexanediamine (TMHDA), thereby obtaining a white mass of a CHD homopolymer in a yield of 97.6 wt %.

The number average molecular weight of the obtained CHD homopolymer was 41,200. The $\overline{Mw}/\overline{Mn}$ ratio (criterion for molecular weight distribution) was 1.32.

EXAMPLE 11

Substantially the same procedure as in Example 7 was repeated, except that TMEDA was changed to 1,4-diazabicyclo[2,2,2,]octane (DABCO) and n-BuLi was changed to t-BuLi, thereby obtaining a white mass of a CHD homopolymer in a yield of 98.8 wt %.

The number average molecular weight of the obtained polymer was 41,100. The $\overline{Mw}/\overline{Mn}$ ratio (criterion for molecular weight distribution) was 1.40.

EXAMPLE 12

Substantially the same procedure as in Example 11 was repeated, except that t-BuLi was changed to s-BuLi, thereby obtaining a white mass of a CHD homopolymer in a yield of 98.2 wt %.

The number average molecular weight of the obtained polymer was 41,800. The $\overline{Mw}/\overline{Mn}$ ratio (criterion for molecular weight distribution) was 1.44.

EXAMPLE 13

A well dried 100 ml Schlenk tube was purged with dried argon gas by a conventional method. 3.0 g of 1,3-CHD and 20.0 g of cyclohexane were charged in the Schlenk tube.

While maintaining the temperature of the resultant cyclohexane solution of 1,3-CHD at room temperature, complex No. 1 was added to the cyclohexane solution in an amount of 0.07 mmol in terms of the amount of lithium atom, and, in an atmosphere of dried argon gas, a polymerization reaction was conducted at room temperature for 5 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a final white mass of a CHD homopolymer in a yield of 100 wt %.

The number average molecular weight of the obtained CHD homopolymer was 44,500. The $\overline{Mw}/\overline{Mn}$ ratio (which is used as a criterion for molecular weight distribution) was 1.36.

The glass transition temperature (Tg) of the obtained polymer was 128° C. The tensile modulus (TM) was 4,315 MPa. The heat distortion temperature (1.82 MPa) was 112° C.

EXAMPLE 14

A well dried 100 ml Schlenk tube was purged with dried argon gas by a conventional method. 3.0 g of 1,3-CHD and 20.0 g of cyclohexane were charged in the Schlenk tube.

While maintaining the temperature of the resultant cyclohexane solution of 1,3-CHD at room temperature, complex No. 1 was added to the cyclohexane solution in an amount of 0.07 mmol in terms of the amount of lithium atom, and, in an atmosphere of dried argon gas, a polymerization reaction was conducted at 40° C. for 5 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a CHD homopolymer in a yield of 100 wt %.

The number average molecular weight of the obtained CHD homopolymer was 43,200. The $\overline{Mw}/\overline{Mn}$ ratio (which is used as a criterion for molecular weight distribution) was 1.38.

The glass transition temperature (Tg) of the obtained polymer was 122° C. The tensile modulus (TM) was 4,230 MPa.

EXAMPLE 15

A well dried 100 ml Schlenk tube was purged with dried argon gas by a conventional method. 3.0 g of 1,3-CHD and 20.0 g of cyclohexane were charged in the Schlenk tube.

While maintaining the temperature of the resultant cyclohexane solution of 1,3-CHD at room temperature, complex No. 1 was added to the cyclohexane solution in an amount of 0.04 mmol in terms of the amount of lithium atom, and, in an atmosphere of dried argon gas, a polymerization reaction was conducted at room temperature for 8 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a CHD homopolymer in a yield of 98.7 wt %.

The number average molecular weight of the obtained CHD homopolymer was 81,500. The $\overline{Mw}/\overline{Mn}$ ratio (which is used as a criterion for molecular weight distribution) was 1.34.

The glass transition temperature (Tg) of the obtained polymer was 135° C. The tensile modulus (TM) was 4,800 MPa. The heat distortion temperature (1.82 MPa) was 118° C.

Comparative Example 1

A well dried 100 ml Schlenk tube was purged with dried argon gas by a conventional method. 4.02 g of 1,3-CHD and 4.30 g of toluene were charged in the Schlenk tube.

While maintaining the temperature of the resultant toluene solution of 1,3-cyclohexadiene at room temperature, n-BuLi was added to the toluene solution in an amount of 1.01 mmol in terms of the amount of lithium atom, and, in an atmosphere of dried argon gas, a polymerization reaction was conducted at 40° C. for 8 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a CHD homopolymer in a yield of 95.9 wt %.

The number average molecular weight of the obtained cyclohexadiene homopolymer was 16,800. The $\overline{Mw}/\overline{Mn}$ ratio (which is used as a criterion for molecular weight distribution) was 1.87.

The polymer was yellowish, and was very brittle, so that it was impossible to produce a molded article from the polymer.

Comparative Example 2

Substantially the same procedure as in Comparative Example 1 was repeated, except that the amount of n-BuLi was changed to 0.101 mmol, thereby obtaining a CHD homopolymer.

Although the amount (in terms of the amount of lithium atom) of the catalyst (n-BuLi) used in Comparative Example 2 was as small as 1/10 of that of the catalyst (n-BuLi) used in Comparative Example 1, a polymer having a high molecular weight was not obtained. The yield of the polymer was as low as 45.6 wt %.

The number average molecular weight of the polymer was 12,500, and the $\overline{Mw}/\overline{Mn}$ ratio (criterion for molecular weight distribution) was 2.05. The obtained polymer was yellowish.

Comparative Example 3

A well dried 100 ml Schlenk tube was purged with dried argon gas by a conventional method. 5.00 g of 1,3-CHD and 10.0 g of cyclohexane were charged in the Schlenk tube.

While maintaining the temperature of the resultant cyclohexane solution of 1,3-CHD at room temperature, n-BuLi was added to the cyclohexane solution in an amount of 0.04 mmol in terms of the amount of lithium atom, to thereby obtain a mixture. The temperature of the obtained mixture was maintained at room temperature.

After the addition of n-BuLi, the color, which is characteristic of the cyclohexadienyl anion, quickly disappeared from the mixture, so that a desired polymer was not obtained.

Comparative Example 4

A well dried 100 ml Schlenk tube was purged with dried argon gas by a conventional method. 5.00 g of 1,3-CHD, 10.0 g of cyclohexane and 0.01 mmol of TMEDA were charged in the Schlenk tube.

To the resultant mixture was added n-BuLi in an amount of 0.04 mmol in terms of the amount of lithium atom, and the temperature of the mixture was maintained at room temperature.

After the addition of n-BuLi, the color, which is characteristic of the cyclohexadienyl anion, quickly disappeared from the mixture, so that a desired polymer was not obtained.

Comparative Example 5

Substantially the same procedure as in Comparative Example 4 was repeated, except that the amount of TMEDA was changed to 0.04 mmol.

After the addition of n-BuLi, the color, which is characteristic of the cyclohexadienyl anion, quickly disappeared from the mixture, so that a desired polymer was not obtained.

EXAMPLE 16

A well dried 100 ml Schlenk tube was purged with dried argon gas by a conventional method. 5.00 g of 1,3-cyclohexadiene and 10.0 g of cyclohexane were charged in the Schlenk tube.

While maintaining the temperature of the resultant cyclohexane solution of 1,3-CHD at room temperature, complex No. 2, which was obtained in Example 2, was added to the cyclohexane solution in an amount of 0.04 mmol in terms of the amount of lithium atom, and, in an atmosphere of dried argon gas, a polymerization reaction was conducted at room temperature for 5 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a CHD homopolymer in a yield of 99.2 wt %.

The number average molecular weight of the obtained CHD homopolymer was 122,800. The $\overline{Mw/Mn}$ ratio (which is used as a criterion for molecular weight distribution) was 1.22.

The glass transition temperature (Tg) of the obtained polymer was 147° C. The tensile modulus (TM) was 4,900 MPa. The heat distortion temperature (1.82 MPa) was 128° C.

EXAMPLE 17

A well dried 100 ml Schlenk tube was purged with dried argon gas by a conventional method. 5.00 g of 1,3-CHD, 9.00 g of cyclohexane and 1.00 g of toluene were charged in the Schlenk tube.

While maintaining the temperature of the resultant mixture at room temperature, complex No. 1, which was obtained in Example 1, was added to the mixture in an amount of 0.08 mmol in terms of the amount of lithium atom, and, in an atmosphere of dried argon gas, a polymerization reaction was conducted at room temperature for 6 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a CHD homopolymer in a yield of 98.7 wt %.

The number average molecular weight of the obtained CHD homopolymer was 62,400. The $\overline{Mw/Mn}$ ratio (which is used as a criterion for molecular weight distribution) was 1.28.

The glass transition temperature (Tg) of the obtained polymer was 129° C. The tensile modulus (TM) was 4,900 MPa. The heat distortion temperature (1.82 MPa) was 108° C.

EXAMPLE 18

A well dried 100 ml Schlenk tube was purged with dried argon gas by a conventional method. 5.00 g of 1,3-CHD, 9.00 g of cyclohexane and 1.00 g of n-hexane were charged in the Schlenk tube.

While maintaining the temperature of the resultant mixture at 40° C., complex No. 2, which was obtained in Example 2, was added to the mixture in an amount of 0.11 mmol in terms of the amount of lithium atom, and, in an atmosphere of dried argon gas, a polymerization reaction was conducted at 40° C. for 5 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a CHD homopolymer in a yield of 96.9 wt %.

The number average molecular weight of the obtained CHD homopolymer was 42,400. The $\overline{Mw/Mn}$ ratio (which is used as a criterion for molecular weight distribution) was 1.26.

EXAMPLE 19

A well dried 100 ml pressure-resistant glass bottle, provided with a sealing cap, was purged with dried argon gas by a conventional method. 5.00 g of 1,3-CHD and 5.00 g of toluene were charged in the glass bottle. Then, complex No. 1, which was obtained in Example 1, was added to the resultant toluene solution of 1,3-cyclohexadiene in an amount of 0.080 mmol in terms of the amount of lithium atom, and a polymerization reaction was conducted at room temperature for 5 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white mass of a CHD homopolymer in a yield of 96.5 wt %.

The number average molecular weight of the obtained CHD homopolymer was 64,300. The $\overline{Mw}/\overline{Mn}$ ratio (criterion for molecular weight distribution) was 1.51.

EXAMPLE 20

Substantially the same procedure as in Example 19 was repeated, except that cyclohexane was used as the polymerization solvent instead of the toluene, thereby obtaining a CHD homopolymer.

The yield of the obtained CHD homopolymer was 98.8 wt %. The number average molecular weight of the obtained polymer was 61,700. The $\overline{Mw}/\overline{Mn}$ ratio (criterion for molecular weight distribution) was 1.29.

EXAMPLE 21

A well dried 100 ml pressure-resistant glass bottle, provided with a sealing cap, was purged with dried argon gas by a conventional method. 2.31 g of isoprene (Ip) and 5.00 g of toluene were charged in the glass bottle. Then, complex No. 2, which was obtained in Example 2, was added to the resultant toluene solution of Ip in an amount of 0.08 mmol in terms of the amount of lithium atom, and a polymerization reaction was conducted at room temperature for 4 hours.

Subsequently, 2.72 g of 1,3-CHD was added to the polymerization reaction system, and the polymerization reaction was further conducted at room temperature for 4 hours.

After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white elastic form of an Ip-CHD diblock copolymer in a yield of 97.6 wt %. The number average molecular weight of the obtained polymer was 59,900 as measured by GPC. The obtained chromatogram exhibited a single peak. The $\overline{Mw}/\overline{Mn}$ ratio (criterion for molecular weight distribution) was 1.22.

The polymer chain structure of the copolymer was determined by $^1$H-NMR. It was confirmed that the polymer chain of the copolymer had substantially the same ratio of monomer units as the ratio of monomers charged in the glass bottle.

Comparative Example 6

Substantially the same procedure as in Example 21 was repeated, except that n-BuLi was used as the polymerization catalyst in stead of complex No. 2.

The polymer obtained was an Ip homopolymer. Although 1,3-CHD was added to the polymerization reaction system of Ip, an Ip-CHD diblock copolymer was not obtained.

With respect to the obtained Ip homopolymer, the number average molecular weight was 30,700 as measured by GPC. $\overline{Mw}/\overline{Mn}$ ratio (criterion for molecular weight distribution) was 1.20.

EXAMPLE 22

Substantially the same procedure as in Example 21 was repeated, except that the amount of Ip was changed to 2.50 g and the amount of 1,3-CHD was changed to 2.50 g, thereby obtaining a CHD-Ip diblock copolymer.

With respect to the obtained CHD-Ip diblock copolymer, the number average molecular weight was 64,400 as measured by GPC. The obtained chromatogram exhibited a single peak. The $\overline{Mw}/\overline{Mn}$ ratio (criterion for molecular weight distribution) was 1.31.

The polymer chain structure of the copolymer was determined by $^1$H-NMR. It was confirmed that the polymer chain of the copolymer had substantially the same ratio of monomer units as the ratio of monomers charged in the glass bottle.

Comparative Example 7

A well dried 300 ml pressure-resistant glass bottle, provided with a sealing cap, was purged with dried argon gas by a conventional method. 12.2 g of 1,3-CHD and 52.9 g of toluene were charged in the glass bottle. Then, n-BuLi was added to the resultant toluene solution of 1,3-CHD in an amount of 3.03 mmol in terms of the amount of lithium atom, and a polymerization reaction was conducted at 40° C. for 4 hours.

To the polymerization reaction system was added 10.22 g of Ip, and the polymerization reaction was conducted at 40° C. for 4 hours.

The resultant polymerization reaction mixture was a mixture of an Ip homopolymer ($\overline{Mn}$=26,600) and a CHD homopolymer ($\overline{Mn}$=8,300). A CHD-Ip diblock copolymer was not obtained.

EXAMPLE 23

A well dried 300 ml pressure-resistant glass bottle, provided with a sealing cap, was purged with dried argon gas by a conventional method. 20.0 g of cyclohexane and 2.72 g of 1,3-CHD were charged in the glass bottle. Then, complex No. 2, which was obtained in Example 2, was added to the resultant cyclohexane solution of 1,3-CHD in an amount of 0.20 mmol in terms of the amount of lithium atom, and a polymerization reaction was conducted at 40° C. for 1 hour. After that period of time, the conversion of 1,3-CHD was 97.9 mol % as measured by gas chromatography.

Subsequently, 3.53 g of styrene (St) was charged in the autoclave, and a polymerization reaction was further conducted at 40° C. for 1 hour. After that period of time, the conversion of St was 99.0 mol % as measured by gas chromatography.

To the resultant polymerization reaction mixture was added 25.0 g of Ip, and a polymerization reaction was further conducted at 40° C. for 3 hours, to thereby obtain a CHD-St-Ip triblock copolymer.

The number average molecular weight of the obtained triblock copolymer was 133,000 as measured by GPC. The obtained chromatogram exhibited a single peak. The $\overline{Mw}/\overline{Mn}$ ratio (criterion for molecular weight distribution) was 1.43.

The polymer chain structure of the copolymer was determined by $^1$H-NMR. It was confirmed that the polymer chain of the copolymer had substantially the same ratio of monomer units as the ratio of monomers charged in the glass bottle.

EXAMPLE 24

A well dried 5-liter high-pressure autoclave having an electromagnetic induction agitator was purged with dried nitrogen gas by a conventional method.

In an atmosphere of dried nitrogen gas, 2,400 g of cyclohexane was charged in the autoclave. The temperature of the cyclohexane was maintained at room temperature.

Then, n-BuLi was added to the autoclave in an amount of 15.0 mmol in terms of the amount of lithium atom. To the resultant cyclohexane solution of n-BuLi was added 7.50 mmol of TMEDA, and the resultant mixture was agitated at room temperature for 10 minutes. Then, the temperature of the autoclave was elevated to 40° C.

300 g of 1,3-CHD was mixed with 300 g of Ip. The resultant mixture was charged in the autoclave, and a polymerization reaction was conducted at 40° C. for 6 hours.

In the polymerization reaction system in which both 1,3-CHD and Ip were present, a polymerization reaction of Ip proceeded in preference to a polymerization reaction of 1,3-CHD. Upon consumption of nearly all of the Ip monomers present, a polymerization reaction of 1,3-CHD started. The conversion of 1,3-CHD was 98.5 mol % as measured by gas chromatography. As a result, an Ip-CHD diblock copolymer containing portions in which Ip and 1,3-CHD are copolymerized in a tapered configuration was obtained.

The number average molecular weight of the obtained diblock copolymer was 41,000 as measured by GPC. The obtained chromatogram exhibited a single peak. The $\overline{Mw}/\overline{Mn}$ ratio was 1.50.

The polymer chain structure of the copolymer was determined by $^1$H-NMR. It was confirmed that the polymer chain of the obtained copolymer had substantially the same ratio of monomer units as the ratio of monomers charged in the autoclave.

The tensile strength (TS) of the obtained diblock copolymer was 11.4 MPa. The tensile elongation (TE) was 31%. The flexural strength (FS) was 17.5 MPa and the flexural modulus (FM) was 795 MPa.

The Izod impact strength was N.B. (no break).

EXAMPLE 25

A polymerization reaction was conducted in substantially the same manner as in Example 24, except that a monomer mixture of 480 g of 1,3-CHD and 120 g of Ip was used. After 6 hours of the polymerization reaction, the conversion of 1,3-CHD was 98.7 mol % as measured by gas chromatography.

Because the polymerization reaction system contained 1,3-CHD in a large amount, as compared to Ip, a polymerization reaction of 1,3-CHD also started at an early stage of the polymerization reaction of Ip, although the polymerization reaction of Ip proceeded in preference to the polymerization reaction of 1,3-CHD. As a result, a copolymer containing portions in which Ip and 1,3-CHD are randomly copolymerized was obtained.

The number average molecular weight of the obtained copolymer was 42,000 as measured by GPC. The obtained chromatogram exhibited a single peak. The $\overline{Mw}/\overline{Mn}$ ratio was 1.45.

The polymer chain structure of the copolymer was determined by $^1$H-NMR. It was confirmed that the polymer chain of the obtained copolymer had substantially the same ratio of monomer units as the ratio of monomers charged in the autoclave.

The tensile strength (TS) of the obtained copolymer was 40.8 MPa. The tensile elongation (TE) was 5%. The flexural strength (FS) was 86.4 MPa and the flexural modulus (FM) was 3,035 MPa.

The Izod impact strength was 79.8 J/m.

EXAMPLE 26

A well dried 5-liter high-pressure autoclave having an electromagnetic induction agitator was purged with dried nitrogen gas by a conventional method.

In an atmosphere of dried nitrogen gas, 2,000 g of cyclohexane was charged in the autoclave. The temperature of the cyclohexane was maintained at room temperature.

Then, n-BuLi was added to the autoclave in an amount of 13.56 mmol in terms of the amount of lithium atom.

Subsequently, 6.78 mmol of TMEDA was added to the autoclave. The resultant mixture was agitated at room temperature for 10 minutes.

The temperature of the autoclave was elevated to 30° C. 120 g of 1,3-CHD was charged in the autoclave, and a polymerization reaction was conducted at 30° C. for 2 hours, to thereby form a CHD homopolymer.

Subsequently, 933 g of a 30 wt % solution of butadiene (Bd) in cyclohexane (Bd: 280 g) was charged in the autoclave, and a polymerization reaction was further conducted at 30° C. for 2 hours, to thereby obtain a CHD-Bd diblock copolymer.

To the resultant polymer solution was added silicon tetrachloride (SiCl$_4$) in an amount of 3.39 mmol and then, a coupling reaction was conducted at 60° C. for 30 minutes.

To the resultant polymer solution was added Irganox B215 (0037HX)(manufactured and sold by CIBA GEIGY, Switzerland) as a stabilizer, and then, removal of the solvent was conducted by a conventional method, thereby obtaining an elastic form of a CHD-Bd-CHD triblock copolymer.

The number average molecular weight of the obtained triblock copolymer was 112,000. The $\overline{Mw}/\overline{Mn}$ ratio was 1.34.

The polymer chain structure of the copolymer was determined by $^1$H-NMR. It was confirmed that the polymer chain of the obtained copolymer had substantially the same ratio of monomer units as the ratio of monomers charged in the autoclave.

The tensile strength (TS) of the obtained triblock copolymer was 16.1 MPa. The tensile elongation (TE) was 650%.

EXAMPLE 27

A well dried 5-liter high-pressure autoclave having an electromagnetic induction agitator was purged with dried nitrogen gas by a conventional method.

In an atmosphere of dried nitrogen gas, 2,000 g of cyclohexane was charged in the autoclave. The temperature of the cyclohexane was maintained at room temperature.

Then, n-BuLi was added to the autoclave in an amount of 15.36 mmol in terms of the amount of lithium atom.

Subsequently, 7.68 mmol of TMEDA was added to the autoclave. The resultant mixture was agitated at room temperature for 10 minutes. Then, the temperature of the autoclave was elevated to 40° C.

154 g of 1,3-CHD was charged in the autoclave, and a polymerization reaction was conducted at 40° C. for 2 hours, to thereby form a CHD homopolymer.

Subsequently, 1,087 g of a 30 wt % solution of Bd in cyclohexane (Bd: 326 g) was charged in the autoclave, and a polymerization reaction was further conducted at 30° C. for 2 hours, to thereby obtain a CHD-Bd diblock copolymer.

To the resultant polymer solution was added dimethyl dichlorosilane (Me$_2$SiCl$_2$) in an amount of 7.68 mmol and then, a coupling reaction was conducted at 60° C. for 30 minutes.

To the resultant polymer solution was added Irganox B215 (0037HX)(manufactured and sold by CIBA GEIGY, Switzerland) as a stabilizer, and then, removal of the solvent was conducted by a conventional method, thereby obtaining an elastic form of a CHD-Bd-CHD triblock copolymer.

The number average molecular weight of the obtained triblock copolymer was 74,000. The $\overline{Mw}/\overline{Mn}$ ratio was 1.38.

The polymer chain structure of the copolymer was determined by $^1$H-NMR. It was confirmed that the polymer chain of the obtained copolymer had substantially the same ratio of monomer units as the ratio of monomers charged in the autoclave.

The tensile strength (TS) of the obtained triblock copolymer was 20.1 MPa). The tensile elongation (TE) was 690%.

EXAMPLE 28

A well dried 5-liter high-pressure autoclave having an electromagnetic induction agitator was purged with dried nitrogen gas by a conventional method.

In an atmosphere of dried nitrogen gas, 2,800 g of cyclohexane was charged in the autoclave. The temperature of the cyclohexane was maintained at room temperature.

Then, n-BuLi was added to the autoclave in an amount of 13.0 mmol in terms of the amount of lithium atom.

Subsequently, 6.50 mmol of TMEDA was added to the autoclave. The resultant mixture was agitated at room temperature for 10 minutes.

The temperature of the autoclave was elevated to 40° C. 120 g of 1,3-CHD was charged in the autoclave, and a polymerization reaction was conducted at 40° C. for 3 hours, to thereby form a CHD homopolymer.

Subsequently, 280 g of St was charged in the autoclave, and a polymerization reaction was further conducted at 60° C. for 2 hours, to thereby obtain a CHD-St diblock copolymer.

The number average molecular weight of the obtained diblock copolymer was 48,700. The $\overline{Mw}/\overline{Mn}$ ratio was 1.38.

The polymer chain structure of the copolymer was determined by $^1$H-NMR. It was confirmed that the polymer chain of the obtained copolymer had substantially the same ratio of monomer units as the ratio of monomers charged in the autoclave.

EXAMPLE 29

A well dried 100 ml Schlenk tube was purged with dried argon gas by a conventional method. 1.50 g of 1,3-CHD, 2.0 g of n-hexane and 18.0 g of cyclohexane were charged in the glass bottle. While maintaining the temperature of the resultant solution of 1,3-CHD at room temperature, complex No. 2, which was obtained in Example 2, was added to the mixture in an amount of 0.07 mmol in terms of the amount of lithium atom, and a polymerization reaction was conducted at room temperature for 3 hours, to thereby obtain a CHD homopolymer.

The resultant polymerization reaction system was cooled to −10° C. Then, 1.50 g methyl methacrylate (MMA) was added to the polymerization reaction system, and the polymerization reaction was further conducted at −10° C. for 3 hours. After that period of time, a 10 wt % solution of BHT in methanol was added to the polymerization reaction system, to thereby terminate the polymerization reaction. Then, a large amount of a mixed solvent of methanol and hydrochloric acid was added to the resultant polymerization reaction mixture, thereby separating a polymer formed therein. The separated polymer was washed with methanol and then, dried at 80° C. in vacuo, thereby obtaining a white CHD-MMA diblock copolymer in a yield of 81 wt %.

The number average molecular weight of the obtained diblock copolymer was 34,500 as measured by GPC. The $\overline{Mw}/\overline{Mn}$ ratio (criterion for molecular weight distribution) was 1.89.

EXAMPLE 30

A well dried 5-liter high-pressure autoclave having an electromagnetic induction agitator was purged with dried nitrogen gas by a conventional method.

In an atmosphere of dried nitrogen gas, 2,400 g of cyclohexane was charged in the autoclave. The temperature of the cyclohexane was maintained at room temperature.

Then, n-BuLi was added to the autoclave in an amount of 15.0 mmol in terms of the amount of lithium atom. To the resultant cyclohexane solution of n-BuLi was added 7.50 mmol of TMEDA, and the resultant mixture was agitated at room temperature for 10 minutes.

The temperature of the autoclave was elevated to 40° C. and then, the autoclave was purged with ethylene (Et) gas. A polymerization reaction was conducted under an ethylene pressure of 40 kg/cm$^2$·G at 40° C. for 1 hour.

Then, the Et gas was evacuated and replaced by dried nitrogen gas. 400 g of 1,3-CHD was charged in the autoclave, and a polymerization reaction was further conducted at 40° C. for 8 hours, to thereby obtain an Et-CHD diblock copolymer. After that period of time, the conversion of 1,3-CHD was 97.6 mol % as measured by gas chromatography.

Dehydrated n-heptanol was added to the resultant polymerization reaction mixture in an equimolar amount to the amount of lithium atoms present in the polymerization reaction mixture, to thereby terminate the polymerization reaction.

The ethylene content of the obtained diblock copolymer was 10 wt % as determined by $^1$H-NMR.

The number average molecular weight of the obtained diblock copolymer was 30,500. The $\overline{Mw}/\overline{Mn}$ ratio was 1.78.

EXAMPLE 31

A well dried 300 ml pressure-resistant glass bottle was purged with dried argon gas by a conventional method. 120.0 g of cyclohexane was charged in the glass bottle. While maintaining the temperature of the cyclohexane at room temperature, a 1.6M solution of n-BuLi in n-hexane was added to the cyclohexane in an amount of 3.0 mmol in terms of the amount of lithium atom. The resultant mixture was agitated for 10 minutes.

Subsequently, a 1.0M solution of TMEDA in cyclohexane was added to the above mixture so as to provide a Li (in n-BuLi)/TMEDA molar ratio of 4/2, and a reaction was conducted to thereby form a complex of n-BuLi with TMEDA. The resultant mixture containing the complex of n-BuLi with TMEDA was heated to and maintained at 40° C., to thereby obtain a complex solution.

In an atmosphere of dried argon gas, 4.5 g of 1,3-CHD was added to the obtained complex solution, and a polymerization reaction was conducted at 40° C. for 1 hour.

To the resultant polymerization reaction mixture was added 21.0 g of Ip in an atmosphere of dried argon gas, and a polymerization reaction was further conducted at 40° C. for 1 hour, to thereby form a CHD-Ip diblock copolymer.

To the resultant polymerization reaction mixture containing the CHD-Ip diblock copolymer was added 4.5 g of 1,3-CHD in an atmosphere of dried argon gas, and a polymerization reaction was further conducted at 40° C. for 2 hours to thereby form a CHD-Ip-CHD triblock copolymer.

To the resultant polymerization reaction mixture was added a 10 wt % solution of BHT in methanol, to thereby terminate the polymerization reaction. Then, a large amount of a mixed solvent of methanol and hydrochloric acid was added to the polymerization reaction mixture containing the CHD-Ip-CHD triblock copolymer, to thereby separate the triblock copolymer. The separated triblock copolymer was washed with methanol and then, dried at 60° C. in vacuo to thereby obtain a viscous form of the CHD-Ip-CHD triblock copolymer in a yield of 100 wt %.

The obtained CHD-Ip-CHD triblock copolymer had a number average molecular weight as high as 9,690 and an $\overline{Mw}/\overline{Mn}$ ratio of 1.08.

The polymer chain structure of the copolymer was determined by $^1$H-NMR. It was confirmed that the polymer chain of the copolymer had substantially the same ratio of monomer units as the ratio of monomers charged in the glass bottle.

EXAMPLE 32

Substantially the same procedure as in Example 31 was repeated, except that TMEDA was changed to tetramethyl-diaminomethane (TMMDA), thereby obtaining a CHD-Ip-CHD triblock copolymer.

The number average molecular weight of the obtained triblock copolymer was 9,270 as measured by GPC. The $\overline{Mw}/\overline{Mn}$ ratio was 1.14.

The polymer chain structure of the copolymer was determined by $^1$H-NMR. It was confirmed that the polymer chain of the copolymer had substantially the same ratio of monomer units as the ratio of monomers charged in the glass bottle.

EXAMPLE 33

Substantially the same procedure as in Example 31 was repeated, except that TMEDA was changed to tetramethyl-1,3-propanediamine (TMPDA), thereby obtaining a CHD-Ip-CHD triblock copolymer.

The number average molecular weight of the obtained triblock copolymer was 9,040 as measured by GPC. The $\overline{Mw}/\overline{Mn}$ ratio was 1.21.

The polymer chain structure of the copolymer was determined by $^1$H-NMR. It was confirmed that the polymer chain of the copolymer had substantially the same ratio of monomer units as the ratio of monomers charged in the glass bottle.

EXAMPLE 34

Substantially the same procedure as in Example 31 was repeated, except that TMEDA was changed to tetramethyl-1,6-hexanediamine (TMHDA), thereby obtaining a CHD-Ip-CHD triblock copolymer.

The number average molecular weight of the obtained triblock copolymer was 9,500 as measured by GPC. The $\overline{Mw}/\overline{Mn}$ ratio was 1.11.

The polymer chain structure of the copolymer was determined by $^1$H-NMR. It was confirmed that the polymer chain of the copolymer had substantially the same ratio of monomer units as the ratio of monomers charged in the glass bottle.

EXAMPLE 35

A well dried 300 ml pressure-resistant glass bottle was purged with dried argon gas by a conventional method. 120.0 g of cyclohexane was charged in the glass bottle. While maintaining the temperature of the cyclohexane at room temperature, a 1.1M solution of s-BuLi in n-hexane was added to the cyclohexane in an amount of 3.0 mmol in terms of the amount of lithium atom. The resultant mixture was agitated for 10 minutes.

Subsequently, a 1.0M solution of TMEDA in cyclohexane was added to the above mixture so as to provide a Li (in s-BuLi)/TMEDA molar ratio of 4/2, and a reaction was conducted to thereby form a complex of s-BuLi with TMEDA. The resultant mixture containing the complex of s-BuLi with TMEDA was heated to and maintained at 40° C., to thereby obtain a complex solution.

To the obtained complex solution, which had a blue color, was added 1.5 mmol of m-diisopropenylbenzene (m-DIPB) to thereby obtain a mixture. After the blue color of the mixture, which indicates the presence of radicals, changed to orange, which indicates the absence of radicals, 21.0 g of Ip was added to the above mixture, and a polymerization reaction was conducted at 40° C. for 1 hour, to thereby form an Ip-containing copolymer.

To the resultant polymerization reaction mixture containing the Ip-containing copolymer was added 9.0 g of 1,3-CHD in an atmosphere of dried argon gas, and a polymerization reaction was further conducted at 40° C. for 2 hours to thereby form a CHD-Ip-CHD triblock copolymer.

To the resultant polymerization reaction mixture was added a 10 wt % solution of BHT in methanol, to thereby terminate the polymerization reaction. Then, a large amount of a mixed solvent of methanol and hydrochloric acid was added to the polymerization reaction mixture containing the CHD-Ip-CHD triblock copolymer, thereby separating the triblock copolymer. The separated triblock copolymer was washed with methanol and then, dried at 60° C. in vacuo, thereby obtaining an elastic form of the CHD-Ip-CHD triblock copolymer in a yield of 100 wt %.

The obtained CHD-Ip-CHD triblock copolymer had a number average molecular weight as high as 20,190 and an $\overline{Mw}/\overline{Mn}$ ratio of 1.44.

The polymer chain structure of the triblock copolymer was determined by $^1$H-NMR. It was confirmed that the polymer chain of the triblock copolymer had substantially the same ratio of monomer units as the ratio of monomers charged in the glass bottle.

EXAMPLE 36

A well dried 5-liter high-pressure autoclave having an electromagnetic induction agitator was purged with dried nitrogen gas by a conventional method.

In an atmosphere of dried nitrogen gas, 2,700 g of cyclohexane was charged in the autoclave. The temperature of the cyclohexane was maintained at room temperature.

Then, n-BuLi was added to the autoclave in an amount of 30.0 mmol in terms of the amount of lithium atom. To the resultant cyclohexane solution of n-BuLi was added 15.0 mmol of TMEDA, and a reaction was conducted to thereby form a complex of n-BuLi with TMEDA.

The temperature of the autoclave was elevated to 40° C. and then, 45 g of 1,3-CHD was charged in the autoclave, and a polymerization reaction was conducted at 40° C. for 1 hour.

Subsequently, 210 g of Ip was charged in the autoclave, and a polymerization reaction was further conducted at 40° C. for 1.5 hours, to thereby obtain a CHD-Ip diblock copolymer.

To the resultant polymerization reaction mixture containing the CHD-Ip diblock copolymer was added 45 g of 1,3-CHD, and a polymerization reaction was further conducted at 40° C. for 3 hours, to thereby obtain a CHD-Ip-CHD triblock copolymer.

The resultant polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 9,860. The $\overline{Mw}/\overline{Mn}$ ratio was 1.23.

EXAMPLE 37

A well dried 5-liter high-pressure autoclave having an electromagnetic induction agitator was purged with dried nitrogen gas by a conventional method.

In an atmosphere of dried nitrogen gas, 2,700 g of cyclohexane was charged in the autoclave. The temperature of the cyclohexane was maintained at room temperature.

Then, n-BuLi was added to the autoclave in an amount of 37.5 mmol in terms of the amount of lithium atom. To the resultant cyclohexane solution of n-BuLi was added 9.375 mmol of TMEDA, and a reaction was conducted to thereby form a complex of n-BuLi with TMEDA.

The temperature of the autoclave was elevated to 40° C. and then, 15 g of Ip was charged in the autoclave. Subsequently, 30 g of 1,3-CHD was charged in the autoclave, and a polymerization reaction was conducted at 40° C. for 1.5 hours, to thereby obtain an Ip-CHD diblock copolymer.

To the resultant polymerization reaction mixture was added 210 g of Ip, and a polymerization reaction was further conducted at 40° C. for 1.5 hours, to thereby obtain an Ip-CHD-Ip triblock copolymer.

To the resultant polymerization reaction mixture containing the Ip-CHD-Ip triblock copolymer was added 30 g of 1,3-CHD, and a polymerization reaction was further conducted at 40° C. for 2 hours, to thereby obtain an Ip-CHD-Ip-CHD tetrablock copolymer.

To the resultant polymerization reaction mixture containing the Ip-CHD-Ip-CHD tetrablock copolymer was added 15 g of Ip, and a polymerization reaction was further conducted at 40° C. for 30 minutes, to thereby obtain an Ip-CHD-Ip-CHD-Ip pentablock copolymer.

The resultant polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained pentablock copolymer was 8,350. The $\overline{Mw}/\overline{Mn}$ ratio was 1.22.

EXAMPLE 38

A well dried 5-liter high-pressure autoclave having an electromagnetic induction agitator was purged with dried nitrogen gas by a conventional method.

In an atmosphere of dried nitrogen gas, 2,700 g of cyclohexane was charged in the autoclave. The temperature of the cyclohexane was maintained at room temperature.

Then, n-BuLi was added to the autoclave in an amount of 30.0 mmol in terms of the amount of lithium atom. To the resultant cyclohexane solution of n-BuLi was added 15.0 mmol of TMEDA, and a reaction was conducted to thereby form a complex of n-BuLi with TMEDA.

The temperature of the autoclave was elevated to 40° C. and then, 15 g of 1,3-CHD was charged in the autoclave, and a polymerization reaction was conducted at 40° C. for 1 hour.

Subsequently, 270 g of Ip was charged in the autoclave, and a polymerization reaction was further conducted at 40° C. for 2 hours, to thereby obtain a CHD-Ip diblock copolymer.

To the resultant polymerization reaction mixture containing the CHD-Ip diblock copolymer was added 15 g of 1,3-CHD, and a polymerization reaction was further conducted at 40° C. for 3 hours, to thereby obtain a CHD-Ip-CHD triblock copolymer.

The resultant polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 11,900. The $\overline{Mw}/\overline{Mn}$ ratio was 1.12.

EXAMPLE 39

A well dried 5-liter high-pressure autoclave having an electromagnetic induction agitator was purged with dried nitrogen gas by a conventional method.

In an atmosphere of dried nitrogen gas, 1,500 g of cyclohexane was charged in the autoclave. The temperature of the cyclohexane was maintained at 70° C.

1,500 g of a 10 wt % cyclohexane solution of the triblock copolymer obtained in Example 38 was added to the autoclave. To the polymer solution was added a catalyst solution, which was prepared by adding titanocene dichloride (TC) and diisobutyl aluminum hydride (DIBAL-H) to cyclohexane (TC/DIBAL-H molar ratio 1/6), as a hydrogenation catalyst, in an amount of 100 ppm, in terms of the amount of titanium atom, based on the weight of the polymer.

The autoclave was purged with hydrogen gas. The temperature of the autoclave was elevated to 100° C. and then, a hydrogenation reaction was conducted under a hydrogen pressure of 8 kg/cm$^2$·G for 1 hour, thereby obtaining a CHD-hydrogenated Ip-CHD triblock copolymer.

Results of the measurement by $^1$H-NMR show that the degree of hydrogenation of the isoprene polymer block (Ip) was 96 mol % and the cyclohexadiene polymer block (CHD) was not hydrogenated.

EXAMPLE 40

A well dried 5-liter high-pressure autoclave having an electromagnetic induction agitator was purged with dried nitrogen gas by a conventional method.

In an atmosphere of dried nitrogen gas, 2,400 g of cyclohexane was charged in the autoclave. The temperature of the cyclohexane was maintained at room temperature.

Then, n-BuLi was added to the autoclave in an amount of 15.0 mmol in terms of the amount of lithium atom. To the resultant cyclohexane solution of n-BuLi was added 7.50 mmol of TMEDA to thereby form a complex, and the temperature of the autoclave was elevated to 40° C.

300 g of 1,3-CHD was charged in the autoclave, and a polymerization reaction was conducted at 40° C. for 20 minutes. After that period of time, the conversion of 1,3-CHD was 47.8 mol % as measured by gas chromatography.

Subsequently, 300 g of isoprene (Ip) was charged in the autoclave, and a polymerization reaction was further conducted at 40° C. for 5 hours.

Upon addition of Ip to the polymerization reaction system of 1,3-CHD, interruption of the polymerization reaction of 1,3-CHD occurred because a polymerization reaction of Ip proceeded in preference to a polymerization reaction of 1,3-CHD. Upon consumption of nearly all of the Ip monomers added, a polymerization reaction of 1,3-CHD started again. As a result, a CHD-Ip-CHD triblock copolymer was obtained.

The resultant polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 41,900. The $\overline{Mw}/\overline{Mn}$ ratio was 1.43.

The tensile strength (TS) of the obtained triblock copolymer was 25.8 MPa. The tensile elongation (TE) was 159%. The flexural strength (FS) was 22.0 MPa and the flexural modulus (FM) was 2,900 MPa.

The Izod impact strength was N.B. (no break).

EXAMPLE 41

A well dried 5-liter high-pressure autoclave having an electromagnetic induction agitator was purged with dried nitrogen gas by a conventional method.

In an atmosphere of dried nitrogen gas, 1,800 g of cyclohexane was charged in the autoclave. The temperature of the cyclohexane was maintained at room temperature.

Then, n-BuLi was added to the autoclave in an amount of 10.0 mmol in terms of the amount of lithium atom. To the resultant cyclohexane solution of n-BuLi was added 5.0 mmol of TMEDA to thereby form a complex, and the temperature of the autoclave was elevated to 40° C.

200 g of 1,3-CHD was charged in the autoclave, and a polymerization reaction was conducted at 40° C. for 20 minutes. After that period of time, the conversion of 1,3-CHD was 48.7 mol % as measured by gas chromatography.

Subsequently, 400 g of Ip was charged in the autoclave, and a polymerization reaction was further conducted at 40° C. for 6 hours.

Upon addition of Ip to the polymerization reaction system of 1,3-CHD, interruption of the polymerization reaction of 1,3-CHD occurred because a polymerization reaction of Ip proceeded in preference to a polymerization reaction of 1,3-CHD. Upon consumption of nearly all of the Ip monomers added, a polymerization reaction of 1,3-CHD started again. As a result, a CHD-Ip-CHD triblock copolymer was obtained.

The resultant polymerization reaction mixture was diluted with 1000 g of cyclohexane, and heated to 70° C. The diluted polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 61,800. The $\overline{Mw}/\overline{Mn}$ ratio was 1.48. The glass transition temperature (Tg) of the CHD polymer block of the copolymer was 137° C. as measured in accordance with the DSC method.

The tensile strength (TS) of the obtained triblock copolymer was 19.0 MPa. The tensile elongation (TE) was 700%.

EXAMPLE 42

A well dried 5-liter high-pressure autoclave having an electromagnetic induction agitator was purged with dried nitrogen gas by a conventional method.

In an atmosphere of dried nitrogen gas, 2,400 g of cyclohexane was charged in the autoclave. The temperature of the cyclohexane was maintained at room temperature.

Then, n-BuLi was added to the autoclave in an amount of 15.0 mmol in terms of the amount of lithium atom. To the resultant cyclohexane solution of n-BuLi was added 7.50 mmol of TMEDA to thereby form a complex, and the temperature of the autoclave was elevated to 40° C.

300 g of 1,3-CHD was charged in the autoclave, and a polymerization reaction was conducted at 40° C. for 20 minutes. After that period of time, the conversion of 1,3-CHD was 47.9 mol % as measured by gas chromatography.

Subsequently, 300 g of St was charged in the autoclave, and a polymerization reaction was further conducted at 40° C. for 5 hours.

Upon addition of St to the polymerization reaction system of 1,3-CHD, interruption of the polymerization reaction of 1,3-CHD occurred because a polymerization reaction of St proceeded in preference to a polymerization reaction of 1,3-CHD. Upon consumption of nearly all of the St monomers added, a polymerization reaction of 1,3-CHD started again. As a result, a CHD-St-CHD triblock copolymer was obtained., The resultant polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 41,100. The $\overline{Mw}/\overline{Mn}$ ratio was 1.44.

The flexural strength (FS) of the obtained triblock copolymer was 32.5 MPa and the flexural modulus (FM) was 2,910 MPa.

The heat distortion temperature (1.82MPa) was 87° C.

EXAMPLE 43

A well dried 5-liter high-pressure autoclave having an electromagnetic induction agitator was purged with dried nitrogen gas by a conventional method.

In an atmosphere of dried nitrogen gas, 2,400 g of cyclohexane was charged in the autoclave. The temperature of the cyclohexane was maintained at room temperature.

Then, n-BuLi was added to the autoclave in an amount of 15.0 mmol in terms of the amount of lithium atom. To the resultant cyclohexane solution of n-BuLi was added 7.50 mmol of TMEDA to thereby form a complex, and the temperature of the autoclave was elevated to 40° C.

300 g of 1,3-CHD was mixed with 300 g of St. The resultant mixture was charged in the autoclave, and a polymerization reaction was conducted at 40° C. for 7 hours. After that period of time, the conversion of 1,3-CHD was 97.4 mol % as measured by gas chromatography.

In the polymerization reaction system in which both 1,3-CHD and St were present, a polymerization reaction of St proceeded in preference to a polymerization reaction of 1,3-CHD. Upon consumption of nearly all of the St monomers present, a polymerization reaction of 1,3-CHD started. As a result, a St-CHD diblock copolymer was obtained.

The resultant polymerization reaction mixture was heated to 70° C., and transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained diblock copolymer was 41,080. The $\overline{Mw}/\overline{Mn}$ ratio was 1.39.

The flexural strength (FS) of the obtained diblock copolymer was 17.9 MPa and the flexural modulus (FM) was 5,330 MPa.

The heat distortion temperature (1.82 MPa) was 72° C.

EXAMPLE 44

A well dried 5-liter high-pressure autoclave having an electromagnetic induction agitator was purged with dried nitrogen gas by a conventional method.

In an atmosphere of dried nitrogen gas, 2,400 g of cyclohexane was charged in the autoclave. The temperature of the cyclohexane was maintained at room temperature.

Then, n-BuLi was added to the autoclave in an amount of 10.0 mmol in terms of the amount of lithium atom. To the resultant cyclohexane solution of n-BuLi was added 5.0 mmol of TMEDA to thereby form a complex and the temperature of the autoclave was elevated to 40° C.

100 g of 1,3-CHD was charged in the autoclave, and a polymerization reaction was conducted at 40° C. for 2 hours, to thereby obtain a CHD homopolymer (polymer 1).

Subsequently, 400 g of St was charged in the autoclave, and a polymerization reaction was further conducted at 40° C. for 3 hours, to thereby obtain a CHD-St diblock copolymer (polymer 2).

Further, 100 g of 1,3-CHD was charged in the autoclave, and a polymerization reaction was further conducted at 40° C. for 5 hours, to thereby obtain a CHD-St-CHD triblock copolymer (polymer 3).

The resultant polymerization reaction mixture was heated to 70° C., and transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The respective number average molecular weights of the obtained polymers 1, 2 and 3 were 10,800, 50,200 and 61,400. The respective $\overline{Mw}/\overline{Mn}$ ratios were 1.08, 1.14 and 1.45.

The tensile strength (TS) of the obtained polymer 3 was 18.3 MPa. The tensile elongation (TE) was 2%. The flexural strength (FS) was 45.7 MPa and the flexural modulus (FM) was 3,202 MPa.

The heat distortion temperature (1.82 MPa) of the polymer 3 was 76° C.

EXAMPLE 45

A well dried 5-liter high-pressure autoclave having an electromagnetic induction agitator was purged with dried nitrogen gas by a conventional method.

In an atmosphere of dried nitrogen gas, 2,700 g of cyclohexane was charged in the autoclave. The temperature of the cyclohexane was maintained at room temperature.

Then, n-BuLi was added to the autoclave in an amount of 30.0 mmol in terms of the amount of lithium atom. To the resultant cyclohexane solution of n-BuLi was added 15.0 mmol of TMEDA to thereby form a complex, and the temperature of the autoclave was elevated to 40° C.

45 g of 1,3-CHD was charged in the autoclave, and a polymerization reaction was conducted at 40° C. for 1 hour.

Subsequently, 700 g of a 30 wt % solution of Bd in cyclohexane (Bd: 210 g) was charged in the autoclave, and a polymerization reaction was further conducted at 40° C. for 1 hour, to thereby form a CHD-Bd diblock copolymer.

To the resultant polymerization reaction mixture containing the CHD-Bd diblock copolymer was added 45 g of 1,3-CHD, and a polymerization reaction was further conducted at 40° C. for 3 hours, to thereby form a CHD-Bd-CHD triblock copolymer.

The resultant polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 10,300. The $\overline{Mw}/\overline{Mn}$ ratio was 1.07.

EXAMPLE 46

A polymerization reaction was conducted in substantially the same manner as in Example 45, except that s-BuLi was used instead of n-BuLi and 1,4-diazabicyclo[2.2.2]octane (DABCO) was used instead of TMEDA. The number average molecular weight of the obtained triblock copolymer was 9,600. The $\overline{Mw}/\overline{Mn}$ ratio was 1.11.

EXAMPLE 47

A polymerization reaction was conducted in substantially the same manner as in Example 45, except that TMMDA was used instead of TMEDA.

The number average molecular weight of the obtained triblock copolymer was 9,700. The $\overline{Mw}/\overline{Mn}$ ratio was 1.13.

EXAMPLE 48

A polymerization reaction was conducted in substantially the same manner as in Example 45, except that TMPDA was used instead of TMEDA.

The number average molecular weight of the obtained triblock copolymer was 9,200. The $\overline{Mw}/\overline{Mn}$ ratio was 1.16.

EXAMPLE 49

A polymerization reaction was conducted in substantially the same manner as in Example 45, except that TMHDA was used instead of TMEDA.

The number average molecular weight of the obtained triblock copolymer was 9,940. The $\overline{Mw}/\overline{Mn}$ ratio was 1.09.

EXAMPLE 50

A well dried 5-liter high-pressure autoclave having an electromagnetic induction agitator was purged with dried nitrogen gas by a conventional method.

In an atmosphere of dried nitrogen gas, 1,333 g of cyclohexane was charged in the autoclave. The temperature of the cyclohexane was maintained at room temperature.

Then, n-BuLi was added to the autoclave in an amount of 10.0 mmol in terms of the amount of lithium atom. To the resultant cyclohexane solution of n-BuLi was added 2.5 mmol of TMEDA to thereby form a complex, and the temperature of the autoclave was elevated to 40° C.

100 g of 1,3-CHD was charged in the autoclave, and a polymerization reaction was conducted at 40° C. for 2 hours, to thereby form a CHD homopolymer.

Subsequently, 667 g of a 30 wt % solution of Bd in cyclohexane (Bd: 200 g) was charged in the autoclave, and a polymerization reaction was further conducted at 40° C. for 2 hours, to thereby form a CHD-Bd diblock copolymer.

To the resultant polymerization reaction mixture containing the CHD-Bd diblock copolymer was added 100 g of 1,3-CHD, and a polymerization reaction was further conducted at 40° C. for 5 hours, to thereby form a CHD-Bd-CHD triblock copolymer.

The resultant polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 40,500. The $\overline{Mw}/\overline{Mn}$ ratio was 1.19. The 1,2-vinyl bond content in the Bd polymer block was 62 mol %.

The tensile strength (TS) of the obtained triblock copolymer was 14.0 MPa. The tensile elongation (TE) was 128%. The flexural strength (FS) was 14.9 MPa and the flexural modulus (FM) was 2,945 MPa.

The Izod impact strength was N.B. (no break).

EXAMPLE 51

A well dried 5-liter high-pressure autoclave having an electromagnetic induction agitator was purged with dried nitrogen gas by a conventional method.

In an atmosphere of dried nitrogen gas, 1,467 g of cyclohexane was charged in the autoclave. The temperature of the cyclohexane was maintained at room temperature.

Then, n-BuLi was added to the autoclave in an amount of 10.0 mmol in terms of the amount of lithium atom. To the resultant cyclohexane solution of n-BuLi was added 5.0 mmol of TMEDA to thereby form a complex, and the temperature of the autoclave was elevated to 40° C.

100 g of 1,3-CHD was charged in the autoclave, and a polymerization reaction was conducted at 40° C. for 2 hours, to thereby form a CHD homopolymer.

Subsequently, 1,333 g of a 30 wt % solution of Bd in cyclohexane (Bd: 400 g) was charged in the autoclave, and a polymerization reaction was further conducted at 40° C. for 2 hours, to thereby form a CHD-Bd diblock copolymer.

To the resultant polymerization reaction mixture containing the CHD-Bd diblock copolymer was added 100 g of 1,3-CHD, and a polymerization reaction was further conducted at 40° C. for 5 hours, to thereby form a CHD-Bd-CHD triblock copolymer.

The resultant polymerization reaction mixture was heated to 70° C., and transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 62,500. The $\overline{Mw}/\overline{Mn}$ ratio was 1.19. The 1,2-vinyl bond content in the Bd polymer block was 68 mol %.

The tensile strength (TS) of the obtained triblock copolymer was 19.1 MPa. The tensile elongation (TE) was 800%.

EXAMPLE 52

A well dried 5-liter high-pressure autoclave having an electromagnetic induction agitator was purged with dried nitrogen gas by a conventional method.

In an atmosphere of dried nitrogen gas, 1,467 g of cyclohexane was charged in the autoclave. The temperature of the cyclohexane was maintained at room temperature.

Then, n-BuLi was added to the autoclave in an amount of 20.0 mmol in terms of the amount of lithium atom. To the resultant cyclohexane solution of n-BuLi was added 5.0 mmol of TMEDA to thereby form a complex, and the temperature of the autoclave was elevated to 40° C.

200 g of 1,3-CHD was charged in the autoclave, and a polymerization reaction was conducted at 40° C. for 2 hours, to thereby form a CHD homopolymer.

Subsequently, 1,333 g of a 30 wt % solution of Bd in cyclohexane (Bd: 400 g) was charged in the autoclave, and a polymerization reaction was further conducted at 40° C. for 2 hours, to thereby form a CHD-Bd diblock copolymer.

To the resultant polymerization reaction mixture containing the CHD-Bd diblock copolymer was added 10 mmol of dimethyl dichlorosilane ($Me_2SiCl_2$), and a coupling reaction was conducted at 65° C. for 1 hour, to thereby form a CHD-Bd-CHD triblock copolymer.

The number average molecular weight of the obtained triblock copolymer was 72,900. The $\overline{Mw}/\overline{Mn}$ ratio was 1.61.

The tensile strength (TS) of the obtained triblock copolymer was 17.2 MPa. The tensile elongation (TE) was 500%.

EXAMPLE 53

A well dried 5-liter high-pressure autoclave having an electromagnetic induction agitator was purged with dried nitrogen gas by a conventional method.

In an atmosphere of dried nitrogen gas, 1,947 g of cyclohexane was charged in the autoclave. The temperature of the cyclohexane was maintained at room temperature.

Then, n-BuLi was added to the autoclave in an amount of 4.0 mmol in terms of the amount of lithium atom. To the resultant cyclohexane solution of n-BuLi was added 2.0 mmol of TMEDA, and the resultant mixture was agitated at room temperature for 10 minutes. The temperature of the autoclave was elevated to 40° C.

60 g of 1,3-CHD was charged in the autoclave, and a polymerization reaction was conducted at 40° C. for 2 hours, to thereby form a CHD homopolymer (Step 1).

Subsequently, 933 g of a 30 wt % solution of Bd in cyclohexane (Bd: 280 g) was charged in the autoclave, and a polymerization reaction was further conducted at 40° C. for 2 hours, to thereby form a CHD-Bd diblock copolymer (Step 2).

To the resultant polymerization reaction mixture containing the CHD-Bd diblock copolymer was added 60 g of 1,3-CHD, and a polymerization reaction was further conducted at 40° C. for 5 hours to thereby form a CHD-Bd-CHD triblock copolymer (Step 3).

The temperature of the autoclave was elevated to 70° C. and then, the resultant polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained triblock copolymer was 96,700. The $\overline{Mw}/\overline{Mn}$ ratio was 1.05. The 1,2-vinyl bond content in the Bd polymer block was 67 mol %.

The tensile strength (TS) of the obtained triblock copolymer was 18.5 MPa. The tensile elongation (TE) was 900%.

The surface hardness (JIS A hardness) was 64. The softening temperature (the temperature at penetration of a 100 μm needle) was 123° C.

The viscoelasticity spectra of the obtained polymer was measured. Results thereof clearly show that the CHD polymer block and the Bd polymer block formed a microdomain structure. Further, the results show that the inflection point on the higher temperature side of tan δ (ascribed to the CHD polymer block) was 137° C., and the inflection point on the lower temperature side of tan δ (ascribed to the Bd polymer block) was −18° C.

EXAMPLE 54

A well dried 5-liter high-pressure autoclave having an electromagnetic induction agitator was purged with dried nitrogen gas by a conventional method.

In an atmosphere of dried nitrogen gas, 1,500 g of cyclohexane was charged in the autoclave. The temperature of the cyclohexane was maintained at 70° C.

1,500 g of a 10 wt % cyclohexane solution of the triblock copolymer obtained in Example 45 was added to the autoclave. To the resultant polymer solution was added a catalyst solution, which was prepared by adding titanocene dichloride (TC) and n-BuLi to cyclohexane (TC/n-BuLi molar ratio: 1/1), as a hydrogenation catalyst, in an amount of 100 ppm, in terms of the amount of titanium atom, based on the weight of the polymer.

The autoclave was purged with hydrogen gas. The temperature of the autoclave was elevated to 75° C. and then, a hydrogenation reaction was conducted under a hydrogen pressure of 8 kg/cm²·G for 30 minutes.

After completion of the hydrogenation reaction, removal of the solvent was conducted by a conventional method, thereby obtaining a CHD-hydrogenated Bd-CHD triblock copolymer.

Results of the measurement by ¹H-NMR show that the degree of hydrogenation of the Bd polymer block was 100 mol %, and CHD polymer block was not hydrogenated.

The number average molecular weight of the obtained triblock copolymer was 10,600. The $\overline{Mw}/\overline{Mn}$ ratio was 1.09.

EXAMPLE 55

A well dried 5-liter high-pressure autoclave having an electromagnetic induction agitator was purged with dried nitrogen gas by a conventional method.

In an atmosphere of dried nitrogen gas, 1,947 g of cyclohexane was charged in the autoclave. The temperature of the cyclohexane was maintained at room temperature.

Then, n-BuLi was added to the autoclave in an amount of 5.0 mmol in terms of the amount of lithium atom. To the resultant cyclohexane solution of n-BuLi was added 2.50 mmol of TMEDA to thereby form a complex, and the temperature of the autoclave was elevated to 30° C.

60 g of 1,3-CHD was charged in the autoclave, and a polymerization reaction was conducted at 30° C. for 4 hours, to thereby form a CHD homopolymer.

Subsequently, 933 g of a 30 wt % solution of Bd in cyclohexane (Bd: 280 g) was charged in the autoclave, and a polymerization reaction was further conducted at 45° C. for 1 hour, to thereby form a CHD-Bd diblock copolymer.

To the resultant polymerization reaction mixture containing the CHD-Bd diblock copolymer was added 60 g of 1,3-CHD, and a polymerization reaction was further conducted at 30° C. for 4 hours, to thereby form a CHD-Bd-CHD triblock copolymer.

The resultant polymerization reaction mixture was transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

To the resultant polymer solution was added a catalyst solution, which was prepared by adding titanocene dichloride (TC) and n-BuLi to cyclohexane (TC/n-BuLi molar ratio: 1/1), as a hydrogenation catalyst, in an amount of 250 ppm, in terms of the amount of titanium atom, based on the weight of the polymer.

The autoclave was purged with hydrogen gas. The temperature of the autoclave was elevated to 75° C. and then, a hydrogenation reaction was conducted under a hydrogen pressure of 10 kg/cm²·G for 30 minutes.

After that period of time, the autoclave was cooled to room temperature, and the pressure in the autoclave was lowered to atmospheric pressure. The autoclave was purged with nitrogen gas, and n-BuLi was treated by adding methanol to the resultant reaction mixture.

To the reaction mixture was added Irganox B215 (0037HX)(manufactured and sold by CIBA GEIGY, Switzerland) as a stabilizer and then, removal of the solvent was conducted by a conventional method, thereby obtaining an elastic form of a CHD-hydrogenated Bd-CHD triblock copolymer.

Results of the measurement by ¹H-NMR show that the degree of hydrogenation of the CHD polymer block was 0 mol %. With respect to the 1,2-vinyl bond, 1,4-cis bond and 1,4-trans bond of the Bd polymer block, the degree of hydrogenation was 100 mol %.

The number average molecular weight of the obtained triblock copolymer was 80,200. The $\overline{Mw}/\overline{Mn}$ ratio was 1.08.

The tensile strength (TS) of the obtained triblock copolymer was 17.2 MPa. The tensile elongation (TE) was 840%.

The surface hardness (JIS A hardness) was 62. The softening temperature (the temperature at penetration of a 100 μm needle) was 133° C.

The viscoelasticity spectra of the obtained polymer was measured. Results thereof clearly show that the CHD polymer block and the hydrogenated Bd polymer block formed a microdomain structure. Further, the results show that the inflection point on the higher temperature side of tan δ (ascribed to the CHD polymer block) was 144° C. and, the inflection point on the lower temperature side of tan δ (ascribed to the hydrogenated Bd polymer block) was -32° C.

EXAMPLE 56

A well dried 5-liter high-pressure autoclave having an electromagnetic induction agitator was purged with dried nitrogen gas by a conventional method.

In an atmosphere of dried nitrogen gas, 2,400 g of cyclohexane was charged in the autoclave. The temperature of the cyclohexane was maintained at room temperature.

Then, n-BuLi was added to the autoclave in an amount of 15.0 mmol in terms of the amount of lithium atom. To the resultant cyclohexane solution of n-BuLi was added 7.5 mmol of TMEDA, and the resultant mixture was agitated at room temperature for 10 minutes. Further, the temperature of the autoclave was elevated to 40° C. and then, the above-obtained mixture was agitated for 10 minutes.

The autoclave was purged with ethylene (Et) gas. A polymerization reaction was conducted under an ethylene pressure of 40 kg/cm$^2$·G at 40° C. for 1 hour.

Then, the ethylene gas was evacuated and replaced by dried nitrogen gas. 200 g of 1,3-CHD, 200 g of Ip and 200 g of St were mixed together. The resultant mixture was charged in the autoclave, and a polymerization reaction was conducted at 35° C. for 10 hours. After that period of time, the conversion of 1,3-CHD was 96.8 mol % as measured by gas chromatography.

In the polymerization reaction system in which 1,3-CHD, Ip and St were present, a polymerization reaction of St proceeded in preference to a polymerization reaction of 1,3-CHD and a polymerization reaction of Ip. Upon consumption of nearly all of the St monomers present, a polymerization reaction of Ip started, because a polymerization reaction of Ip proceeded in preference to a polymerization reaction of 1,3-CHD. Upon consumption of nearly all of the Ip monomers present, a polymerization reaction of 1,3-CHD started. As a result, an Et-St-Ip-CHD tetrablock copolymer was obtained.

Further, 100 g of MMA was charged in the autoclave, and a polymerization reaction was further conducted for 3 hours. As a result, an Et-St-Ip-CHD-MMA pentablock copolymer was obtained.

The resultant polymerization reaction mixture was heated to 70° C., and transferred by pressure to another 5-liter high-pressure autoclave having an electromagnetic induction agitator, which autoclave had been well dried by a conventional method. Dehydrated n-heptanol was added to the polymerization reaction mixture in an equimolar amount to the amount of lithium atoms present in the polymerization reaction mixture, to thereby terminate the polymerization reaction.

The number average molecular weight of the obtained pentablock copolymer was 44,900. The $\overline{Mw}/\overline{Mn}$ ratio was 1.64. The composition (in terms of wt %) of the pentablock copolymer was 3.5(Et)/29.6(St)/28.4(Ip)/27.8(CHD)/10.7 (MMA), as measured by $^1$H-NMR.

EXAMPLE 57

A well dried 100 ml Schlenk tube was purged with dried argon gas by a conventional method. 20.0 g of cyclohexane, 1.5 g of 1,3-CHD and 1.5 g of 1,3-cyclooctadiene (1,3-COD) were charged in the Schlenk tube. While maintaining the temperature of the resultant solution at room temperature, the complex No. 2 obtained in Example 2 was added to the solution in an amount of 0.06 mmol in terms of the amount of lithium atom. Subsequently, a polymerization reaction was conducted at room temperature for 8 hours in an atmosphere of dried argon gas.

To the resultant polymerization reaction mixture was added a 10 wt % solution of BHT in methanol, to thereby terminate the polymerization reaction. Then, a large amount of a mixed solvent of methanol and hydrochloric acid was added to the polymerization reaction mixture, thereby separating a polymer formed therein. The separated polymer was washed with methanol and then, dried at 80° C. in vacuo to thereby obtain a white mass of the CHD-COD diblock copolymer in a yield of 87 wt %.

The number average molecular weight of the obtained CHD-COD diblock copolymer was 43,400. The $\overline{Mw}/\overline{Mn}$ ratio was 1.38.

EXAMPLE 58

A well dried 100 ml Schlenk tube was purged with dried argon gas by a conventional method. 20.0 g of cyclohexane and 0.06 mmol of n-BuLi were charged in the Schlenk tube, and the temperature of the resultant solution was maintained at room temperature.

To the resultant solution were added 0.03 mmol of TMEDA, 1.5 g of St, and 1.5 g of 1,3-CHD, and a polymerization reaction was conducted in an atmosphere of dried argon gas for 6 hours, thereby obtaining a St-CHD diblock copolymer.

To the resultant polymerization reaction mixture was added a 10 wt % solution of BHT in methanol, to thereby terminate the polymerization reaction. Then, a large amount of a mixed solvent of methanol and hydrochloric acid was added to the polymerization reaction mixture containing the St-CHD diblock copolymer to thereby separate the diblock copolymer. The separated diblock copolymer was washed with methanol and then, dried at 80° C. in vacuo to thereby obtain a white mass of the St-CHD diblock copolymer in a yield of 82 wt %.

The number average molecular weight of the obtained St-CHD diblock copolymer was 38,400. The $\overline{Mw}/\overline{Mn}$ ratio was 1.54.

EXAMPLE 59

A well dried 100 ml Schlenk tube was purged with dried argon gas by a conventional method.

1.0 g of the polymer obtained in Example 7 was added to the Schlenk tube. 40 ml of 1,2,4-trichlorobenzene was charged in the Schlenk tube, and the resultant mixture was heated to 80° C., to thereby dissolve the polymer in 1,2,4-trichlorobenzene.

While maintaining the temperature of the resultant solution at 80° C., 3.5 g of N-bromosuccinic acid imide was gradually added to the solution in an atmosphere of dried argon gas. Subsequently, a reaction was conducted at 80° C. for 2 hours.

From the resultant polymerization reaction mixture, insoluble matters were removed by filtration. Then, the filtrate containing the polymer was put in a large amount of methanol to thereby separate the polymer. The separated polymer was washed with methanol and then, dried at 80° C. in vacuo to thereby obtain a brominated polymer.

The amount of bromium added to the polymer was 51.7 wt %, as measured by elemental analysis. Results of the measurement by $^1$H-NMR show that halogenation of a cyclohexene at double-bond did not occur, but that a carbon atom located at allylic position was substituted by a bromium atom.

EXAMPLE 60

A well dried 100 ml Schlenk tube was purged with dried argon gas by a conventional method.

1.0 g of the polymer obtained in Example 55 was added to the Schlenk tube. 40 ml of 1,2,4-trichlorobenzene was charged in the Schlenk tube, and the resultant mixture was heated to 80° C., to thereby dissolve the polymer in 1,2,4-trichlorobenzene.

While maintaining the temperature of the resultant solution at 80° C., 2.0 g of N-bromosuccinic acid imide was gradually added to the solution in an atmosphere of dried argon gas. Subsequently, a reaction was conducted at 80° C. for 2 hours.

From the resultant polymerization reaction mixture, insoluble matters were removed by filtration. Then, the filtrate containing the polymer was put in a large amount of methanol to thereby separate the polymer. The separated polymer was washed with methanol and then, dried at 80° C. in vacuo to thereby obtain a brominated polymer.

The amount of bromium added to the polymer was 19.1 wt %, as measured by elemental analysis. Results of the measurement by $^1$H-NMR show that halogenation of a cyclohexene at double-bonds did not occur, but that a carbon atom located at allylic position was substituted by a bromium atom.

Industrial applicability

The novel cyclic conjugated diene polymer of the present invention has not only excellent thermal properties in respect of, for example, a melting temperature, a glass transition temperature and a heat distortion temperature, but also excellent mechanical properties, such as high tensile modulus and high flexural modulus. Further, the cyclic conjugated diene polymer of the present invention has not only a high molecular weight sufficient for the polymer to be used as a molded article, but also can be provided in the form of a copolymer of a cyclic conjugated diene monomer with a comonomer copolymerizable with the cyclic conjugated diene monomer, wherein the content of the comonomer and the configuration of the copolymer can be appropriately selected so that the copolymer can have desired thermal and mechanical properties. Therefore, the novel cyclic conjugated diene polymer can be advantageously used in various fields as industrially important materials, such as plastics, thermoplastic elastomers, and the like.

The novel polymerization catalyst used in the method of the present invention has not only a high activity to polymerize a cyclic conjugated diene monomer, so that the polymer can be produced in high yield using the catalyst in a relatively small amount, but also can be used for synthesis of a high molecular weight polymer and copolymer which have never been produced using conventional catalysts. The polymerization catalyst of the present invention is also useful as a living anionic polymerization catalyst for obtaining polymers having desired structures, so that the catalyst can also be widely used for producing conventional polymers by living anionic polymerization.

I claim:

1. A cyclic conjugated diene polymer comprising a main chain represented by the following formula (I):

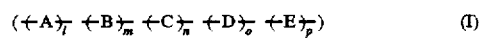     (I)

wherein A to E are monomer units constituting said main chain in which monomer units A to E are arranged in any order, and l to p are, respectively, weight percentages of monomer units A to E, based on the total weight of monomer units A to E;

wherein:

A is selected from the class consisting of cyclic conjugated diene monomer units each being independently represented by the following formula (III):

     (III)

wherein each $R^2$ independently represents a hydrogen atom, a halogen atom, a $C_1$–$C_{20}$ alkyl group, a $C_2$–$C_{20}$ unsaturated aliphatic hydrocarbon group, a $C_5$–$C_{20}$ aryl group, a $C_3$–$C_{20}$ cycloalkyl group, a $C_4$–$C_{20}$ cyclodienyl group or a 5 to 10-membered heterocyclic group having at least one nitrogen, oxygen or sulfur atom as a heteroatom, B is selected from the class consisting of chain conjugated diene monomer units, C is selected from the class consisting of vinyl aromatic monomer units, D is selected from the class consisting of polar monomer units, and E is selected from the class consisting of an ethylene monomer unit and α-olefin monomer units; and wherein:

l to p satisfy the following requirements:

$l+m+n+o+p=100$, $0.5 \leq l \leq 100$, $0 \leq m < 100$, $0 \leq n < 100$, $0 \leq o < 100$, and $0 \leq p < 100$, with the proviso that when l=100 and said A monomer units are comprised of cyclic conjugated diene monomer units which are the same, said cyclic conjugated diene polymer has a number average molecular weight of from 40,000 to 5,000,000, that when l=100 and said A monomer units are comprised of cyclic conjugated diene monomer units which are different, said cyclic conjugated diene polymer has a number average molecular weight of from 25,000 to 5,000,000, and that when 0.5≦l<100, said cyclic conjugated diene polymer is a block copolymer which contains at least one polymer block consisting of at least two A monomer units, and has a number average molecular weight of from 500 to 5,000,000.

2. The cyclic conjugated diene polymer according to claim 1, wherein l=100, and wherein said A monomer units are comprised of cyclic conjugated diene monomer units which are the same or different.

3. The cyclic conjugated diene polymer according to claim 1, wherein 0.5≦l<100, and wherein said A monomer units are comprised of cyclic conjugated diene monomer units which are the same or different.

4. The cyclic conjugated diene polymer according to claim 1, which is an at least-tri-block copolymer.

5. The cyclic conjugated diene polymer according to claim 1, which is a block copolymer further containing at least two polymer blocks each containing at least one A monomer unit.

6. The cyclic conjugated diene polymer according to claim 1, which is a block copolymer having at least two polymer blocks each consisting of at least two A monomer units.

7. The cyclic conjugated diene polymer according to claim 1, which is an at least-di-block copolymer comprising at least one polymer block consisting of at least two A monomer units, and at least one polymer block consisting of monomer units of at least one type selected from the group consisting of said B to said E.

8. The cyclic conjugated diene polymer according to claim 1, which is an at least-di-block copolymer comprising at least one α polymer block consisting of at least two A monomer units, and at least one β polymer block comprised mainly of monomer units of at least one type selected from said B and said E, wherein the weight ratio of said α block to said β block is from 1/99 to 99/1.

9. The cyclic conjugated diene polymer according to claim 1, which is an at least-tri-block copolymer comprising at least two Y blocks each consisting of at least two A monomer units, and at least one Z block comprised mainly of monomer units of at least one type selected from said B, said C and said E, wherein the weight ratio of said at least two Y blocks to said at least one Z block is from 1/99 to 99/1.

10. The cyclic conjugated diene polymer according to claim 1, which is a triblock copolymer comprising two Y blocks each consisting of at least two A monomer units, and one Z block comprised mainly of monomer units of at least one type selected from said B, said C and said E.

11. The cyclic conjugated diene polymer according to claim 9, wherein said at least-tri-block copolymer has a configuration represented by a formula selected from the group consisting of Y—(Z—Y)$_q$, (Y—Z)$_r$, Z—(Y—Z)$_r$, [(Z—Y)$_q$]$_r$, [(Y—Z)$_q$]$_r$, [(Z—Y)$_q$—Z]$_r$, and [(Y—Z)$_q$—Y]$_r$, in which Y and Z are as defined above, q is an integer of 1 or more, and r is an integer of 2 or more.

12. A cyclic conjugated diene polymer according to claim 1, wherein said A monomer unit is a 1,3-cyclohexadiene monomer unit or a derivative thereof.

13. The cyclic conjugated diene polymer according to claim 1, wherein said A monomer unit is a 1,3-cyclohexadiene monomer unit.

14. A method for producing a cyclic conjugated diene polymer comprising a main chain represented by the following formula (I):

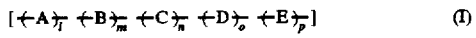

wherein A to E are monomer units constituting said main chain in which monomer units A to E are arranged in any order, and l to p are, respectively, weight percentages of monomer units A to E, based on the total weight of monomer units A to E;

wherein:

A is selected from the class consisting of cyclic conjugated diene monomer units, B is selected from the class consisting of chain conjugated diene monomer units, C is selected from the class consisting of vinyl aromatic monomer units, D is selected from the class consisting of polar monomer units, and E is selected from the class consisting of an ethylene monomer unit and α-olefin monomer units; and wherein:

l to p satisfy the following requirements:

$l+m+n+o+p=100$, $0.5 \leq l < 100$, $0 \leq m < 100$, $0 \leq n < 100$, $0 \leq o < 100$, and $0 \leq p < 100$, which comprises polymerizing at least one cyclic conjugated diene monomer, or at least one cyclic conjugated diene monomer and at least one comonomer copolymerizable therewith in the presence of a catalyst comprised of a complex of at least one organometallic compound containing a metal belonging to Group IA of the Periodic Table with at least one complexing agent, said at least one comonomer being selected from the class consisting of chain conjugated diene monomers, vinyl aromatic monomers, polar monomers, an ethylene monomer, and α-olefin monomers.

15. The method according to claim 14, wherein said metal belonging to Group IA of the Periodic Table is present in said complex in the form of an association of 2 metal atoms or more.

16. The method according to claim 14, wherein said metal belonging to Group IA of the Periodic Table is present in said complex in the form of an association of 4 metal atoms or more.

17. The method according to claim 14, wherein said at least one complexing agent comprises an amine.

18. The method according to claim 14, wherein said at least one complexing agent is an aliphatic amine.

19. The method according to claim 14, wherein said at least one complexing agent is a diamine.

20. The method according to claim 14, wherein said at least one complexing agent is an aliphatic diamine.

21. The method according to claim 14, wherein said at least one complexing agent is a tertiary amine.

22. The method according to claim 19, wherein said diamine is at least one member selected from the group consisting of tetramethylethylenediamine (TMEDA) and 1,4-diazabicyclo[2.2.2]-octane (DABCO).

23. The method according to claim 14, wherein said at least one organometallic compound containing a metal belonging to Group IA of the Periodic Table is an organolithium compound.

24. The method according to claim 14, wherein said at least one organometallic compound containing a metal belonging to Group IA of the Periodic Table is an organolithium compound selected from the group consisting of normal butyllithium (n-BuLi), secondary butyllithium (s-BuLi) and tertiary butyllithium (t-BuLi), and said at least one complexing agent is selected from the group consisting of tetramethylethylenediamine (TMEDA) and 1,4-diazabicyclo[2.2.2]-octane (DABCO).

25. The method according to claim 14, wherein said polymerization is a homopolymerization of one cyclic conjugated diene monomer, thereby producing a cyclic conjugated diene homopolymer.

26. The method according to claim 14, wherein said polymerization is a copolymerization of at least two cyclic conjugated diene monomers or a copolymerization of at least one cyclic conjugated diene monomer and at least one comonomer, thereby producing a cyclic conjugated diene copolymer.

27. The method according to claim 26, wherein said cyclic conjugated diene copolymer is a random copolymer.

28. The method according to claim 26, wherein cyclic conjugated diene copolymer is an alternating copolymer.

29. The method according to claim 26, wherein said cyclic conjugated diene copolymer is a block copolymer.

30. The method according to claim 26, wherein said cyclic conjugated diene copolymer is an at least-di-block copolymer.

31. The method according to claim 26, wherein said cyclic conjugated diene copolymer is an at least-tri-block copolymer.

32. The method according to claim 26, wherein said cyclic conjugated diene copolymer is a triblock copolymer.

33. The method according to claim 14, wherein said complex is formed prior to the polymerization of said at least one cyclic conjugated diene monomer.

* * * * *